US007428743B2

(12) United States Patent
Kumeda et al.

(10) Patent No.: US 7,428,743 B2
(45) Date of Patent: Sep. 23, 2008

(54) IN-VEHICLE PLAYER

(75) Inventors: Kazuyuki Kumeda, Kanagawa (JP); Yoshiteru Taka, Kanagawa (JP); Kazuyuki Takizawa, Chiba (JP); Hisao Takahashi, Saitama (JP); Norio Iwabuchi, Saitama (JP); Takushi Matsushita, Saitama (JP)

(73) Assignees: Sony Corporation, Tokyo (JP); FUKOKU Co., Ltd., Saitama (JP)

( * ) Notice: Subject to any disclaimer, the term of this patent is extended or adjusted under 35 U.S.C. 154(b) by 542 days.

(21) Appl. No.: 11/099,510

(22) Filed: Apr. 6, 2005

(65) Prior Publication Data

US 2005/0230567 A1 Oct. 20, 2005

(30) Foreign Application Priority Data

Apr. 16, 2004 (JP) ............................. 2004-122209

(51) Int. Cl.
*G11B 33/08* (2006.01)
(52) U.S. Cl. ..................................... 720/692
(58) Field of Classification Search ................. 720/694, 720/693, 692, 688, 684, 679
See application file for complete search history.

(56) References Cited

U.S. PATENT DOCUMENTS

| 3,824,472 | A | * | 7/1974 | Engel et al. ............... 455/343.1 |
| 4,553,231 | A | | 11/1985 | d'Alayer de Costemore d'Arc |
| 4,630,160 | A | | 12/1986 | Murayama |
| 4,807,292 | A | * | 2/1989 | Sorscher ...................... 381/86 |
| 5,364,059 | A | | 11/1994 | Kinoshita et al. |
| 5,379,990 | A | * | 1/1995 | Ando et al. ..................... 267/34 |
| 5,745,471 | A | * | 4/1998 | Son et al. ...................... 720/694 |
| 5,770,133 | A | * | 6/1998 | Boutaghou ................... 264/135 |
| 6,496,362 | B2 | * | 12/2002 | Osterhout et al. ........... 361/685 |
| 6,567,265 | B1 | * | 5/2003 | Yamamura et al. .......... 361/685 |
| 6,655,668 | B1 | | 12/2003 | Wakeen et al. |
| 6,671,124 | B2 | * | 12/2003 | Guion et al. .............. 360/97.02 |
| 2002/0001155 | A1 | | 1/2002 | Takahashi et al. |
| 2004/0190193 | A1 | * | 9/2004 | Kuwajima ................ 360/97.01 |

FOREIGN PATENT DOCUMENTS

| EP | 0 715 308 A2 | 6/1996 |
| JP | 03-234944 | 10/1991 |
| JP | 09-251765 | 9/1997 |
| JP | 2002-245769 | 8/2002 |

* cited by examiner

*Primary Examiner*—Angel A Castro
(74) *Attorney, Agent, or Firm*—Oblon, Spivak, McClelland, Maier & Neustadt, P.C.

(57) ABSTRACT

An in-vehicle player which is mounted in a dashboard in a passenger room of a vehicle comprises: an outer housing to be assembled in a mount space provided in the dashboard; a device body contained in the outer housing; and a cushion member interposed between the outer housing and two side surfaces of the device body, wherein the cushion member is made of viscous elastic material, the cushion member has an end surface which is substantially parallel to a shearing direction thereof and stuck to a mount surface of the device body by viscosity thereof, and the cushion member has another end surface which is substantially parallel to the shearing direction and stuck to a mount surface of the outer housing by viscosity thereof, thereby to attach the cushion member to be elastically deformable in the shearing direction between the outer housing and the two side surfaces of the device body.

14 Claims, 42 Drawing Sheets

DISC INSERT DIRECTION

IN-VEHICLE PLAYER

CROSS REFERENCES TO RELATED APPLICATIONS

The present invention contains subject matter related to Japanese Patent Application JP 2004-122209 filed in the Japanese Patent Office on Apr. 16, 2004, the entire contents of which being incorporated herein by reference.

BACKGROUND OF THE INVENTION

1. Field of the Invention

The present invention relates to an in-vehicle player set on a dashboard in a vehicle compartment.

2. Description of Related Art

For example, car audio systems and car navigation systems have been being widely spreading as in-vehicle players which plays back music and information such as audio and images. These in-vehicle players work to play back information recorded on disc-type recording media such as compact discs (CD), digital versatile discs (DVD), mini discs (MD), or tape-type recording media such as cassette tapes. In recent years, in-vehicle players capable of recording information into hard disc drives (HDD) or exchanging information via memory cards and the like have appeared.

These in-vehicle players each are generally set on a dashboard (or called consol panels or center panels) provided in front of driver's and navigator's seats between these seats in the passenger compartment. Therefore, the dashboard has a mount-space for incorporating such an in-vehicle player having dimensions according to a definite standard of, for example, 1DIN or 2DIN.

Another in-vehicle player is a disc changer capable of choosing and playing back an arbitrary disc among plural discs. In case of this disc changer, plural discs are set in advance in magazine cases, and the magazine cases each are set in a device body. Therefore, the device body is relatively large and must be set in advance at a position apart from the passenger compartment, for example, in a trunk. Components thereof that are necessary for operation are set in the passenger compartment, in general. In this case, however, the discs cannot be exchanged from inside of the passenger compartment. To exchange discs in magazine cases, the magazine cases must once be detached from the device body, resulting in troublesome handling.

Hence, a small-size disc changer has been proposed. This disc changer enables exchange of discs within a passenger compartment by containing the disc changer in a mount space in the center panel as described above, without using magazine cases (see, for example, Japanese Patent Application Laid-Open Publication No. 2002-245769).

Meanwhile, these in-vehicle players suffer from violent violations and impacts which are unique to in-vehicle environments, e.g., vertical vibrations transmitted from road surfaces during driving of vehicles, forward and backward vibrations due to acceleration and deceleration of vehicles, etc. Also, the in-vehicle players each has to be set in a limited mount space in a dashboard as described above, and therefore have to be severely restricted in height dimension.

Consequently, these in-vehicle players have a very strong possibility that discs or the like are brought into contact with internal mechanisms due to vibrations transmitted from vehicles and are thereby damaged. Therefore, these in-vehicle players are provided with a countermeasure against vibrations to constrain influences of vibrations transmitted from vehicles to player bodies.

For example, in a disc changer disclosed in the Publication No. 2002-245769, a liquid-sealing damper 402 is provided between an outer housing 400 and two sides of a device body 401 contained in the outer housing 400, to prevent transmission of vibrations therebetween, as shown in FIG. 1. The liquid-sealing damper 402 is made of an elastic material such as rubber enclosing internally a liquid 402a such as a silicon oil. Provided on the two sides of the device body 401 are stirrer shafts 403 for stirring the liquid 402a enclosed inside the damper 402. The liquid-sealing damper 402 damps vibrations transmitted to the device body 401 from the outer housing 400 incorporated in the mount-space of the dashboard, by utilizing resistance of viscosity of the liquid 402a when the stirrer shafts 403 stir the liquid 402a.

However, if this liquid-sealing damper 402 is used, the inner liquid 402a may leak and hence requires a sealing structure to prevent leakage of the liquid. As a result, the manufacturing process is complicated, and the damper itself has a larger size. In addition, since the stirrer shafts 403 are required to stir the liquid 402a, the number of components increases to raise manufacturing costs. Further, accurate position alignment between the stirrer shafts 403 and the liquid-sealing damper is needed when the device body 401 is set into the outer housing 400.

Known publications related to the present invention are, for example, Japanese Patent Application Laid-Open Publication Nos. H9-251765 and H3-234944.

Japanese Patent Application Laid-Open Publication Nos. H9-251765 and H3-234944 describe that a viscous elastic material is used as a cushion member. However, it is not taken in consideration to be used in the in-vehicle environments. Thus, it is difficult to damp vibrations and impacts transmitted from the vehicle to the device body 1. Further, Japanese Patent Application Laid-Open Publication Nos. H9-251765 and H3-234944 do not describe the direct utilization of the viscosity of the viscous elastic material when attaching the cushion member.

SUMMARY OF THE INVENTION

The present invention hence has been proposed in view of the situation of related techniques as described above and it is desirable to provide an in-vehicle player capable of suppressing influences of vibrations and impacts transmitted from a vehicle and capable of further downsizing and cost down.

To achieve the above object, an in-vehicle player according to the present invention is mounted in a dashboard in a passenger room of a vehicle, and comprises: an outer housing to be assembled in a mount space provided in the dashboard; a device body contained in the outer housing; and a cushion member interposed between the outer housing and two side surfaces of the device body, wherein the cushion member is made of viscous elastic material, the cushion member has an end surface which is substantially parallel to a shearing direction thereof and stuck to a mount surface of the device body by viscosity thereof, and the cushion member has another end surface which is substantially parallel to the shearing direction and stuck to a mount surface of the outer housing by viscosity thereof, thereby to attach the cushion member to be elastically deformable in the shearing direction between the outer housing and the two side surfaces of the device body.

As described above, in the in-vehicle player according to the present invention, elastic deformation of the cushion member inserted between the outer housing and the two side surfaces of the device body can be utilized to damp appropriately vibrations and impacts transmitted through the outer housing to the device body.

In addition, the viscous elastic material forming the cushion member can be stuck directly to the mount surfaces of the device body and the outer housing. Therefore, assembly work to attach the cushion member between the outer housing and the two side surfaces of the device body is easy. In addition, the viscosity of the cushion member can be maintained for a long period. Therefore, the cushion member can be stably maintained between the outer housing and the two side surfaces of the device body. Further, the cushion member can be downsized.

Accordingly, in the in-vehicle player, influences of vibrations and impacts transmitted from the vehicle are suppressed. As a result, operational reliability of the device body during driving of the vehicle can be improved greatly, and further downsizing and cost reduction can be achieved.

BRIEF DESCRIPTION OF THE DRAWINGS

FIGS. 24A and 24B are views showing the structure of the pickup device wherein FIG. 24A is a side view of the pair of chuck levers viewed from the lengthwise direction and FIG. 24B is a side view of the pair of chuck levers viewed from base ends thereof;

FIGS. 26A and 26B are transparent side views showing the structure of a transmission switch mechanism wherein FIG. 26A shows a state before switching and FIG. 26B is a state after switching;

FIGS. 30A and 30B are side views showing positions of a main part of a positioning pin of a lower arm wherein FIG. 30A shows a position in the load/unload mode and FIG. 30B shows a position in the playback mode;

FIGS. 31A, 31B, and 31C are side views for explaining an operation of the hold switch mechanism wherein FIG. 31A shows a state before switching, FIG. 31B shows a state immediately before switching, and FIG. 31C shows a state after switching;

FIGS. 37A and 37B are views showing a state in which a disc is inserted through a disc load/unload slot wherein FIG. 37A is a transparent plan view of the device body and FIG. 37B is a transparent side view of the device body;

FIGS. 40A and 40B are side views showing a position of the operation device in the playback mode wherein FIG. 40A shows a case of playing back a sixth disc and FIG. 40B is a case of playing back a first disc;

DETAILED DESCRIPTION OF THE PREFERRED EMBODIMENTS

An in-vehicle player to which the present invention is applied will now be described in details with reference to the drawings.

Figure 2:
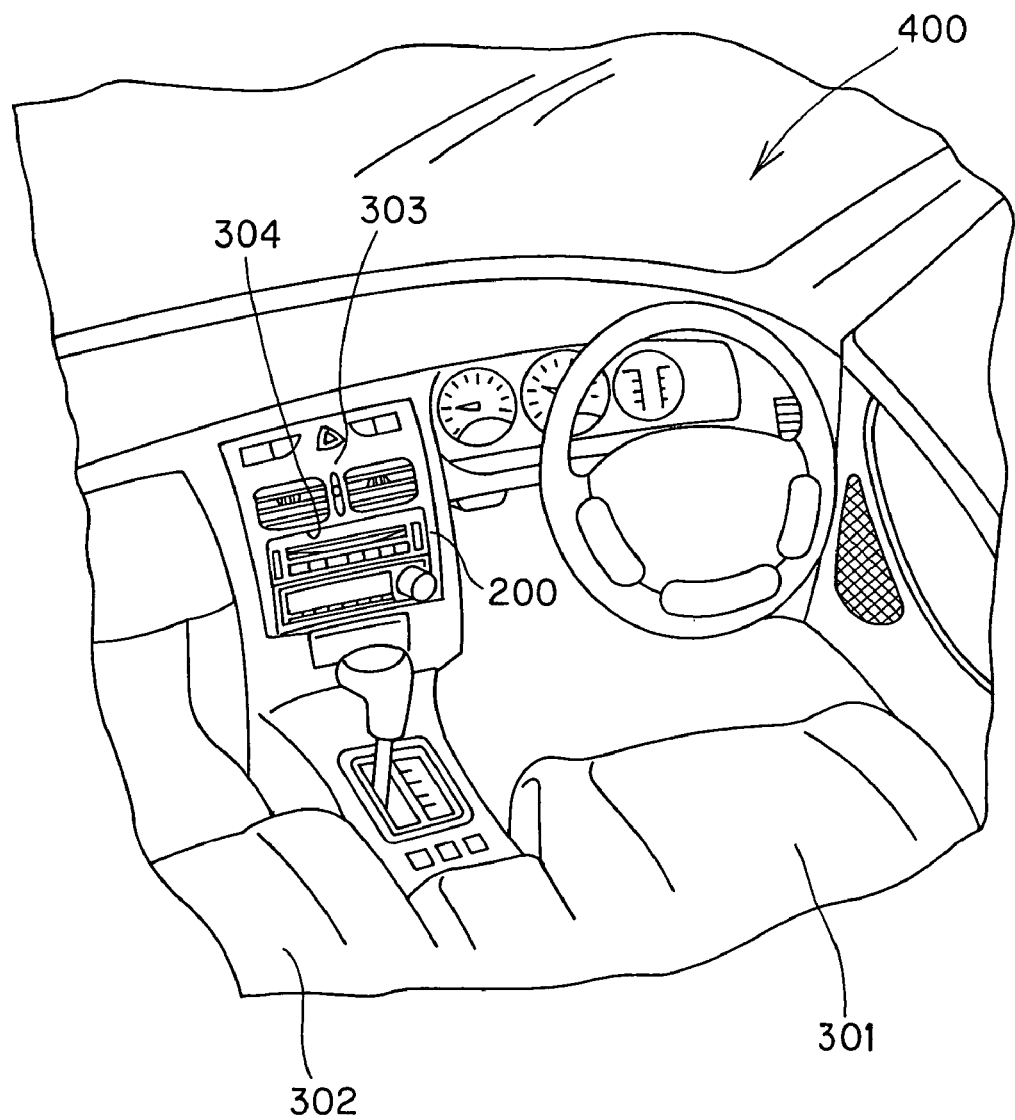
FIG. 2 is a view showing an outer appearance in which a disc changer to which the present invention is applied is set in a dashboard.

The in-vehicle player to which the present invention is applied is, for example, a small-size disc changer 200 set in a dashboard (or called a console panel or center panel) 303 provided in front of a driver's seat 301 and a navigator's seat 302 between these seats in a passenger room 300 as shown in FIG. 2.

Figure 3:
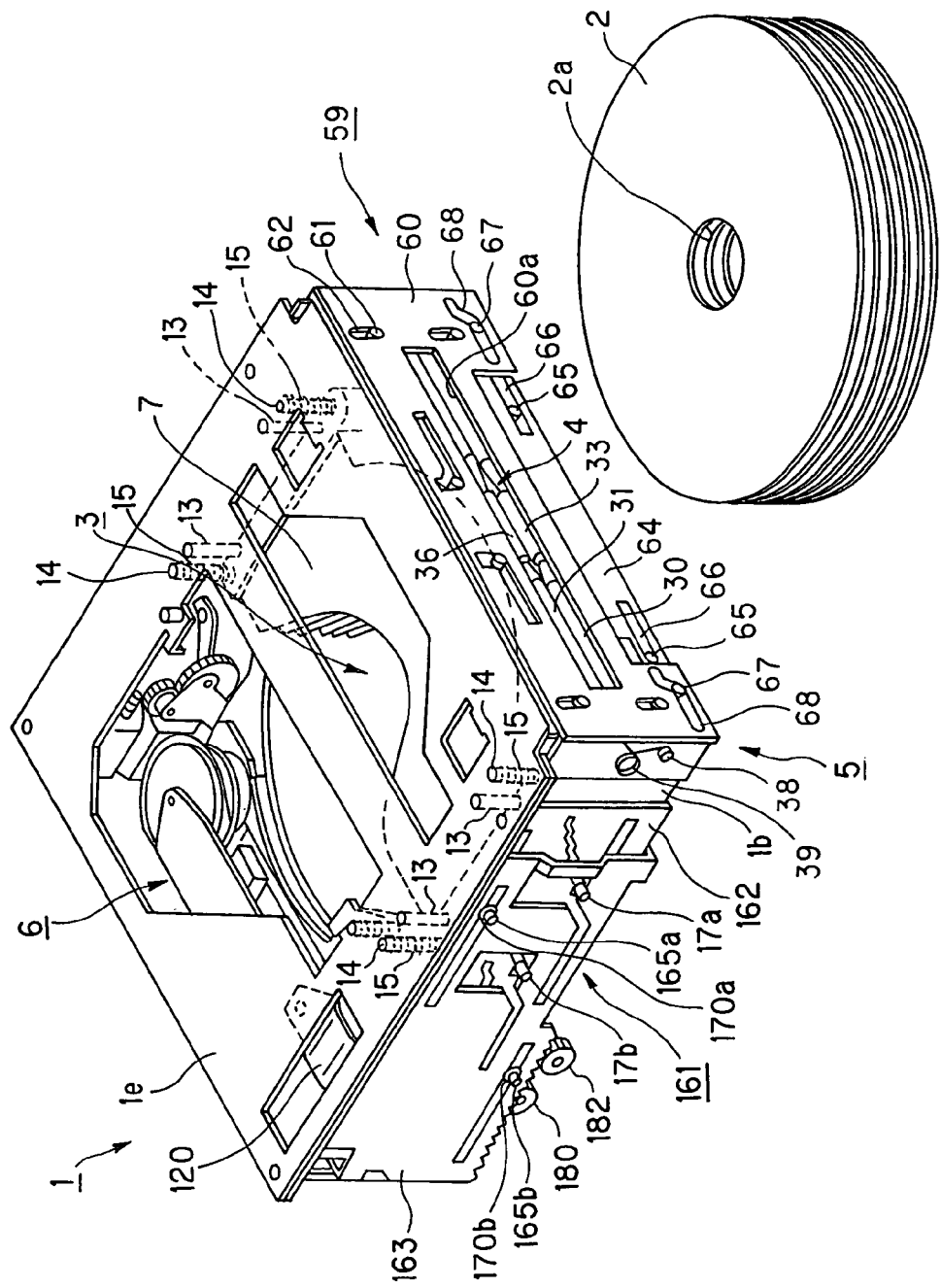
FIG. 3 is a perspective view showing an outer appearance of a device body forming part of the disc changer.
Figure 4:
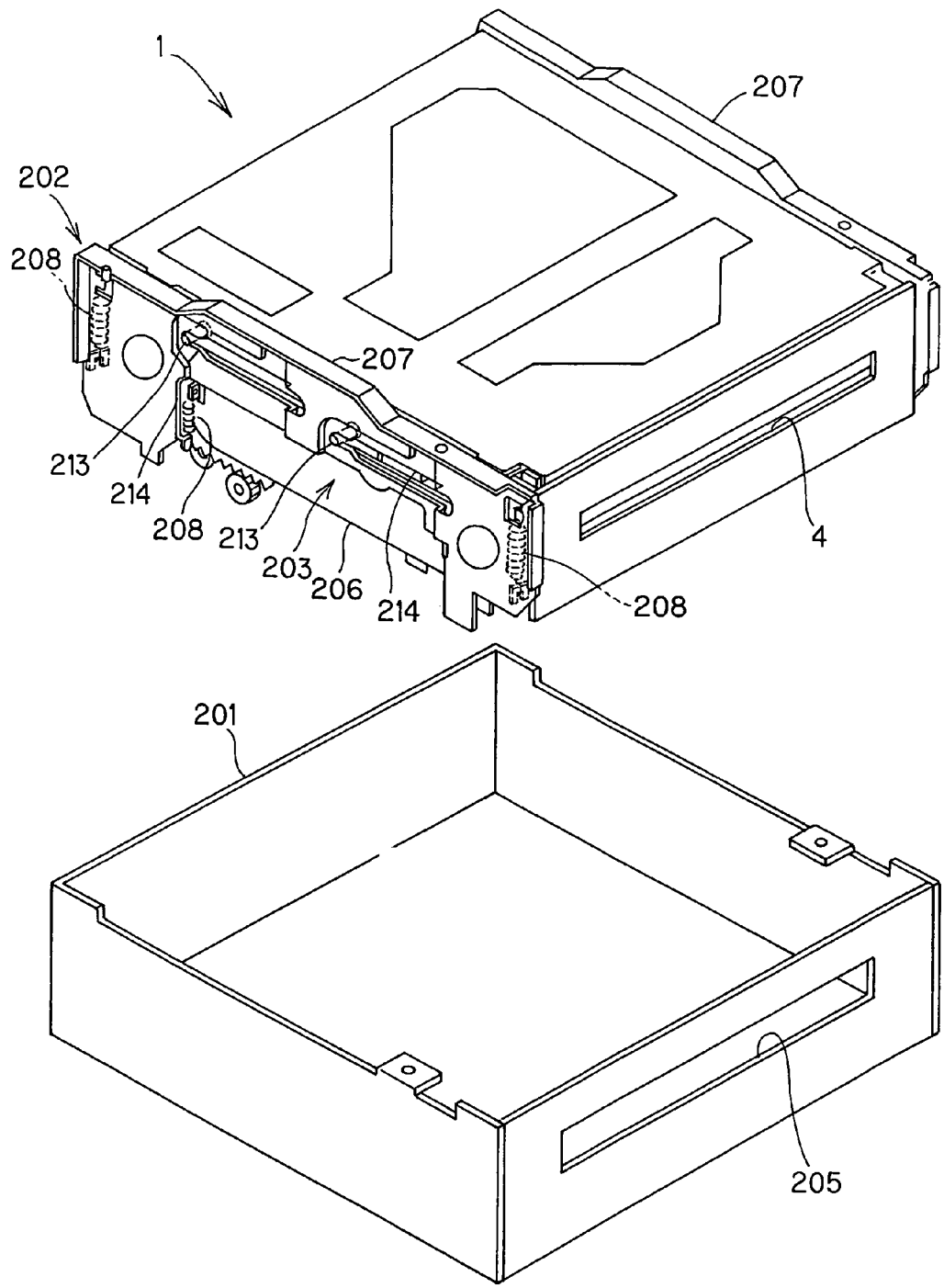
FIG. 4 is an exploded perspective view showing the device body and an outer housing.

In the disc changer 200, as shown in FIG. 3, six compact discs (CD hereinafter referred to simply as discs) 2 can be contained together in a device body 1 designed to fit a definite standard dimensions called a 1DIN size. An arbitrary one can be selected and played back among the discs 2 contained. Accordingly, discs 2 can be exchanged inside the passenger room 300 thus to provide improved conveniences.

Meanwhile, the dashboard 303 is provided with a mount space 304 having dimensions according to a definite standard such as 1DIN or 2DIN, to incorporate the disc changer 200. Further, the disc changer 200 is assembled and set in the mount space 304 through an opening provided in the front side of the dashboard 303. Also, in the front side, there is provided an operation panel 200a having operation buttons exposed through the opening of the dashboard 303.

During driving, the disc changer 200 undergoes violent vibrations and impacts which are unique to in-vehicle environments, e.g., vertical vibrations transmitted from road surfaces, forward and backward vibrations due to acceleration and deceleration of the vehicle. Therefore, the disc changer 200 is provided with a countermeasure against vibrations to suppress influences of vibrations transmitted to the device body 1 from the vehicle.

A specific vibration-proof structure of the disc changer 200 will now be described.

The disc changer 200 has an outer housing 201 assembled in the mount space 304 of the dashboard 303 with the device body 1 contained inside, a suspension mechanism 202 which supports the device body 1 from the outer housing 201, a lock mechanism 203 which fixes the device body 1 to the outer housing 201 when loading/unloading discs 2, and cushion members 204 interposed between two sides of the device body 1 and the outer housing 201.

The outer housing 201 is made of plate metal, the entire of which is substantially shaped like a box in match with the device body 1 to be contained. On the front side of the outer housing 201, a laterally long opening 205 is formed corresponding to a disc load/unload slot 4 of the device body 1, which will be described later. The outer housing 201 has a structure in which an opening in the top surface of the housing is covered with a top plate also made of plate metal and fixed by screws. The top plate, however, is omitted from the figures.

Figure 7:
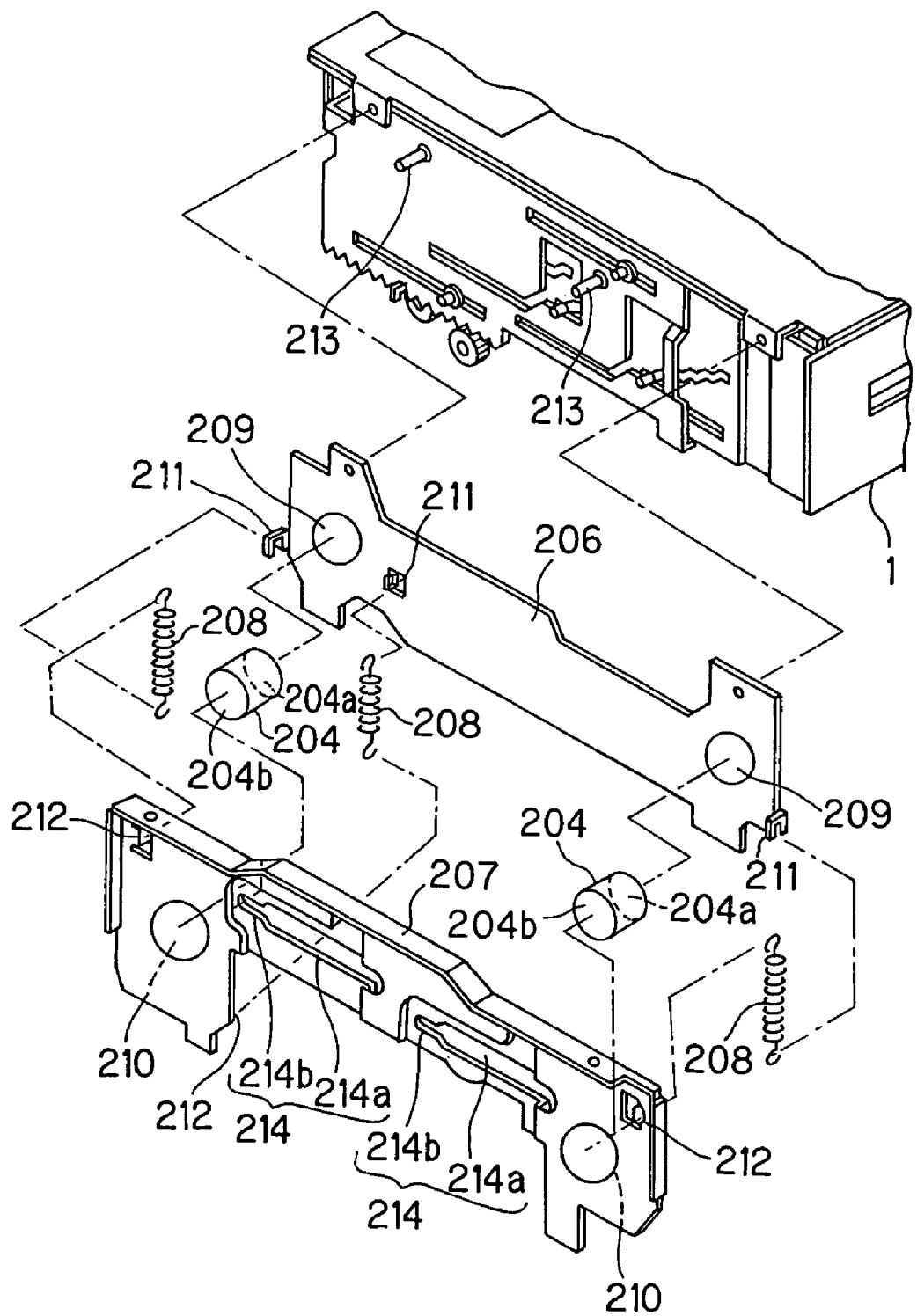
FIG. 7 is an exploded perspective view showing a vibration-proof structure of the disc changer.

The suspension mechanism 202, as shown in FIG. 7, has a pair of inner frames 206 secured to both side surfaces of the device body 1, a pair of outer frames 207 secured to the outer housing 201 and positioned outside the inner frames 206, and plural coil springs 208 tensioned between the inner frames 206 and the outer frames 207.

The inner frames 206 are made of plate metal and have shapes substantially corresponding to the side surfaces of the device body 1. These frames are secured to side surfaces of the device body 1 by screws. On the surfaces of the inner frames 206 facing the outer frames 207, respectively, a pair of positioning recesses 209 which constitute mount surfaces (adhesive surfaces) of the device body 1 are provided in line in the longitudinal direction.

The outer frames 207 are also made of plate metal and have shapes corresponding to the side surfaces of the outer housing 201. These frames are secured to inner side surfaces of the outer housing 201 by screws. On the surfaces of the outer frames 207 which face the inner frames 206, respectively, a pair of positioning recesses 210 which constitute mount surfaces (adhesive surfaces) of the outer housing 201 are provided in line in the longitudinal direction.

Each of plural coil springs 208 is hooked at one end on a hook piece 211 provided on the inner frames 206, as well as at another end on a hook piece 212 provided on the outer frames 207. Thus, inside the outer housing 201, four corners on both sides of the device body 1 are hung on (or floating over) the outer housing 201.

The lock mechanism 203 has a pair of front and rear lock pins 213 protruded outwards from both side surfaces of the device body 1, and a pair of front and rear guide slits 214 to be engaged with the lock pins 213, on the side of the outer housing 201. Of these members, the lock pins 213 are secured to outer sliders 163 of the device body 1 which will be described later and can be slid back and forth together with the outer sliders 163. The guide slits 214 are grooves formed in the outer frames 207 and each have an unlock groove 214a in the front side, which is wider than the diameter of the lock pins 213, and a lock groove 214b on the rear side, which is formed to have a substantially equal width to the diameter of the lock pins 213.

Figure 8:
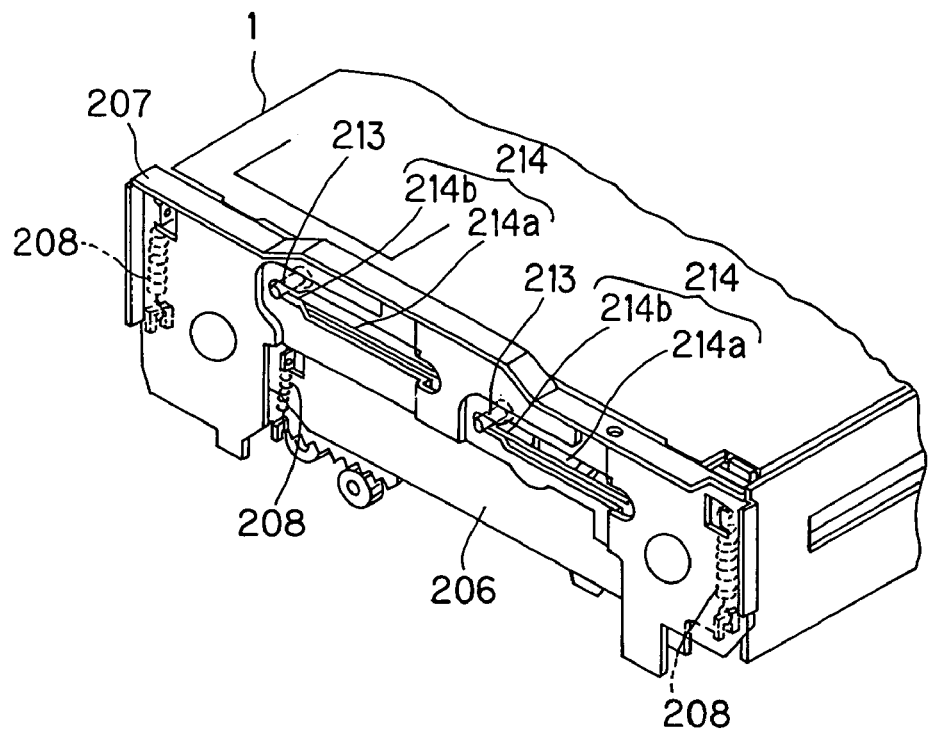
FIG. 8 is a perspective view showing a state in which the device body is locked to the outer housing.
Figure 9:
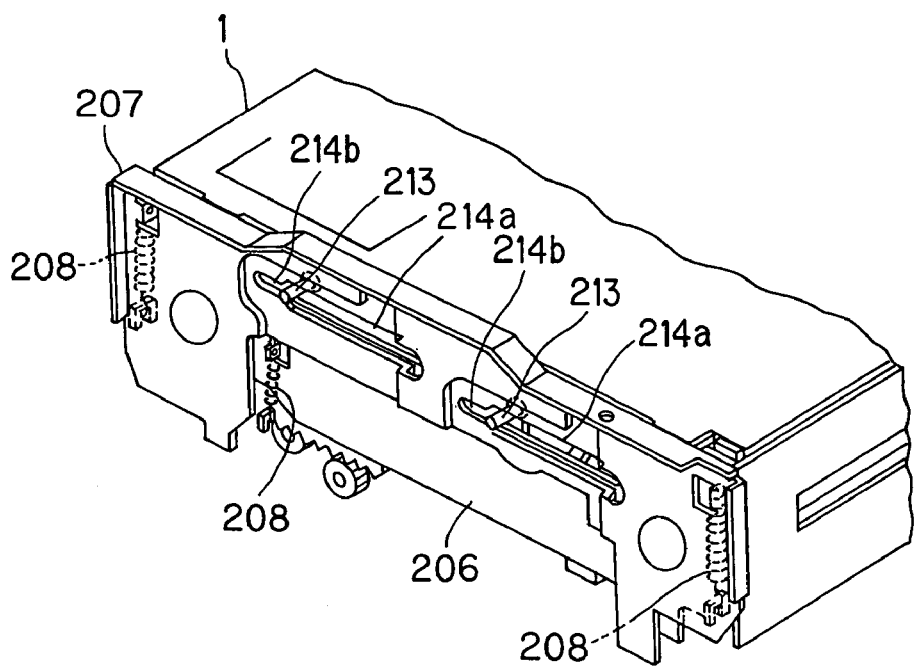
FIG. 9 is a perspective view showing a state in which the device body is unlocked to the outer housing.

In this lock mechanism 203, when loading/unloading discs 2 as shown in FIG. 8, the lock pins 213 are positioned to the lock grooves 214b to reduce play between the lock pins 213 and the guide slits 214. The device body 1 is thereby locked to the outer housing 201. Except the case of loading/unloading discs 2, the lock pins 213 are positioned at the unlock grooves 214a, as shown in FIG. 9, to allow the lock pins 213 play within the guide slits 214, so that the device body 1 is unlocked to the outer housing 201.

Thus, in the disc changer 1, the device body 1 is locked to the outer housing 201 when loading/unloading discs 2. Accordingly, loading/unloading operations of discs 2 as will be described later can be carried out stably. Except for operations of loading/unloading discs 2, the device body 1 is unlocked to outer housing 201, to prevent vibrations from being transmitted to the device body 1 from outside. Simultaneously, internal vibrations and noise generated during operation of the device body 1 can be prevented from being transmitted to the outside.

Figure 5:
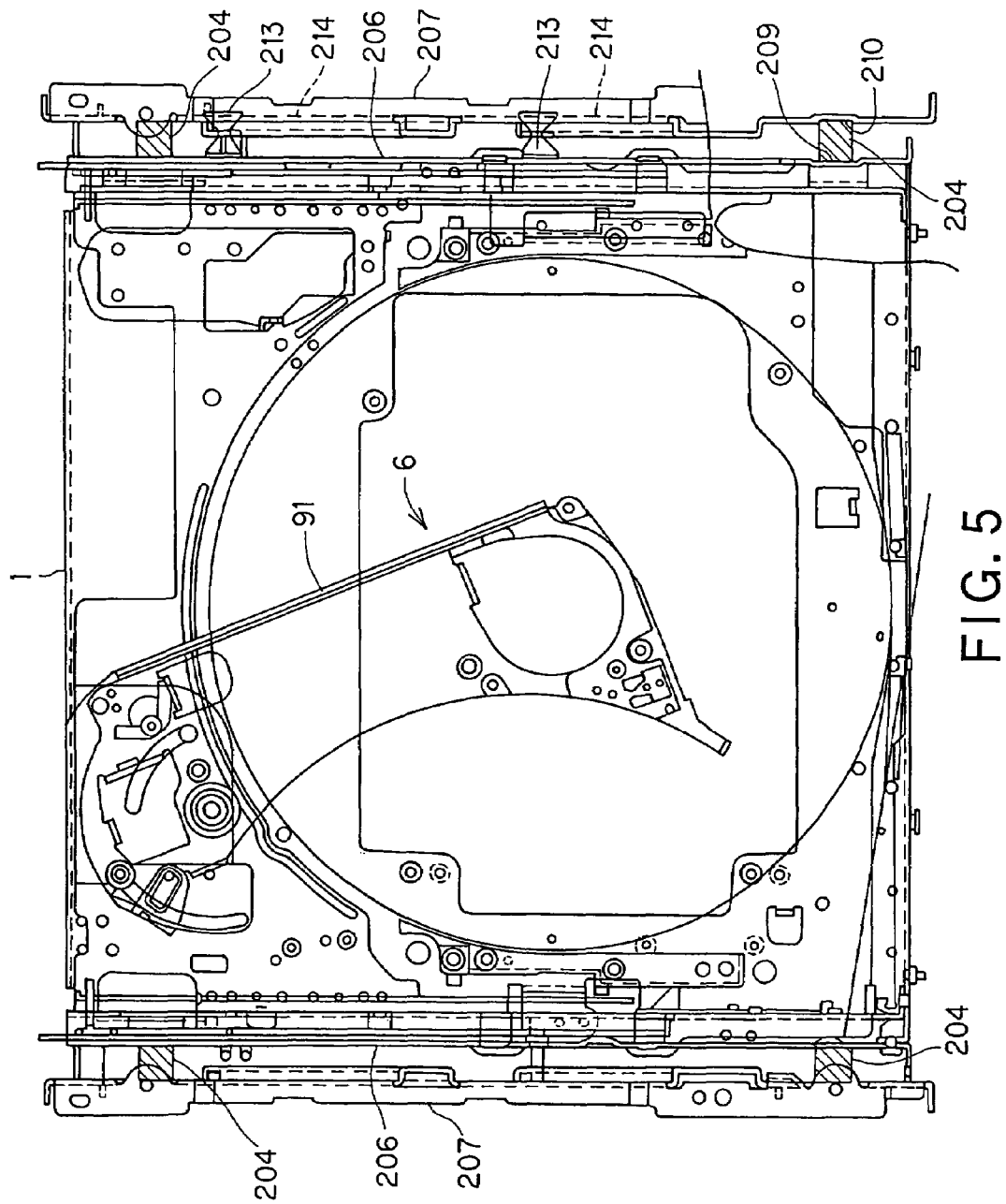
FIG. 5 is a plan view showing a state in which the device body is contained in the outer housing.
Figure 6:
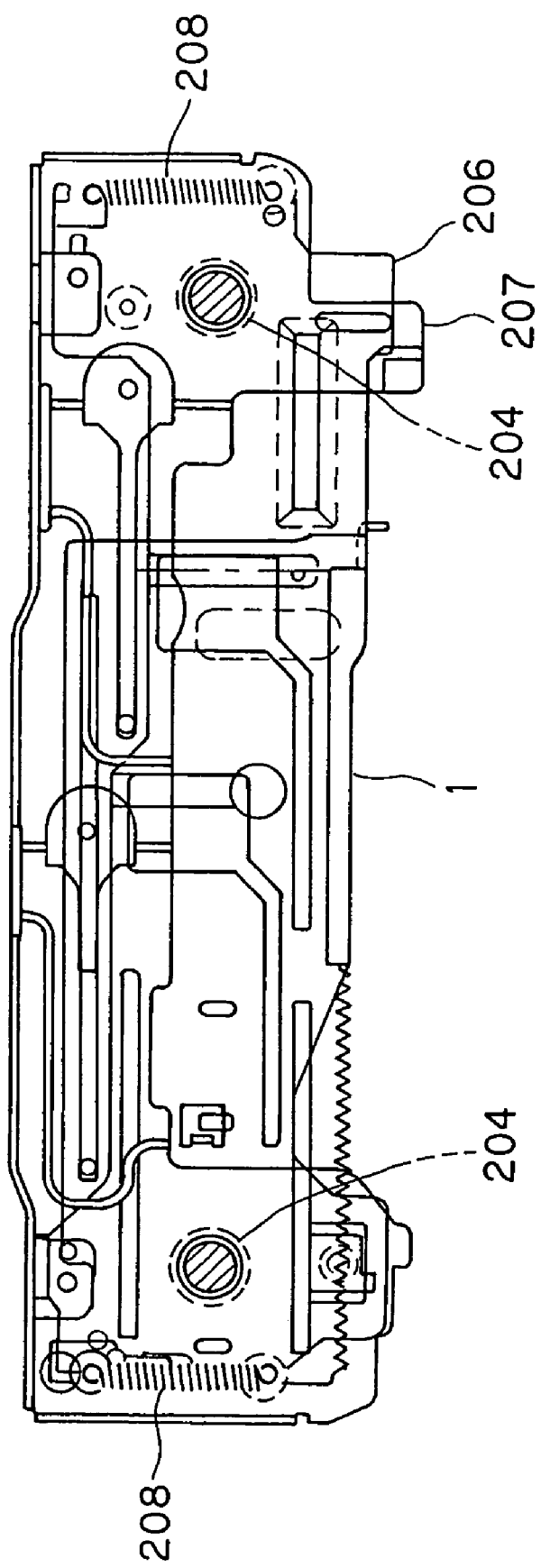
FIG. 6 is a side view showing a state in which the device body is contained in the outer housing.
Figure 10:
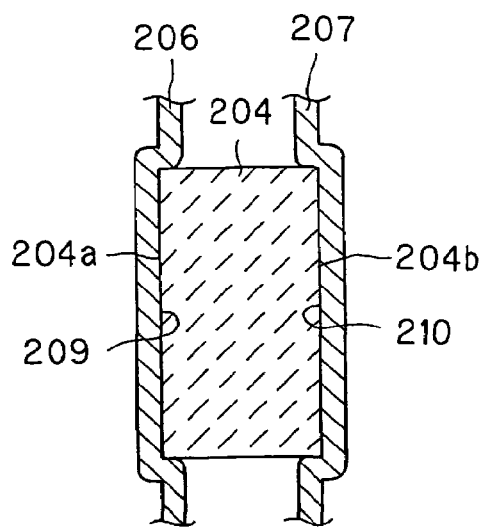
FIG. 10 is a cross-sectional view showing a mount structure of a cushion member.

As shown in FIGS. 5, 7, and 10, the cushion members 204 each are made of a viscous material shaped substantially like a column. End surfaces 204a of the cushion members which are substantially parallel to their own shearing directions (or radial directions) are respectively stuck to the positioning recesses 209 of the inner frames 206. The other surfaces 204b thereof which are also substantially parallel to their own shearing directions are respectively stuck to the positioning recesses 210 of the outer frames 207. As a result, the cushion members 204 are installed, kept elastically deformable in their shearing directions between the inner frames 206 and outer frames 207 which face each other. Naturally, the cushion members 204 are elastically deformable also in their compressible directions but have only a smaller spring constant in their shearing directions than in their compressible directions.

Vibrations transmitted to the device body 1 from the vehicle through the outer housing 201 incorporated in the mount space 304 in the dashboard 303 are influenced more by the vertical vibrations and impacts transmitted from road surfaces during driving and forward and backward vibrations and impacts due to acceleration and deceleration of the vehicle, rather than by rolling during cornering of the vehicle.

Hence, the cushion members 204 each are positioned between the device body 1 and the outer housing 201 such that shearing direction corresponds to the gravity direction in order to effect damping of vibrations suitable for the in-vehicle environments. More specifically, the cushion members 204 aggressively utilize elastic deformation in the shearing direction of viscous elastic material, to enable appropriate damping of vibrations and impacts transmitted from the vehicle to the device body 1 through the outer housing 201 assembled in the mount space 304 in the dashboard 303. In addition, these cushion members 204 can prevent increase in height dimensions in case where the cushion members are positioned between the device body 1 and the outer housing 201 such that their compressible directions correspond to the gravity direction.

Vibration damping characteristics of the viscous elastic material forming the cushion members 204 are so set as to damp vibrations transmitted from the vehicle and having frequencies which cause the device body 1 to resonate. The frequencies at which the device body 1 resonates are about 50 to 100 Hz.

Specifically, the viscous elastic material may be, for example, butyle-based rubber such as NR (natural rubber), IIR (isobutylene-isoprene rubber), SBR (styrene butadiene rubber), or NBR (acrylonitrilebutadiene rubber), EPDM (ethylene propylene dien copolymer rubber), silicon rubber, acryl-based resins, fluorine-based resins, or the like.

Hardness of the viscous elastic material should desirably be set within a range of rubber hardness JIS A of 5 to 45 degrees (according to JIS K 6301) in order to effect damping of vibrations and impacts transmitted from the vehicle to the device body 1. Also, the hardness should desirably be within a range of rubber hardness ASKER C of 20 to 70 degrees (according to SRIS 0101).

This enables setting of a loss coefficient tan δ of the cushion members 204 to at least 0.4 or higher. By approximating the loss coefficient tan δ to 1 at frequencies near 50 to 100 Hz, vibration damping characteristics suitable for in-vehicle environments can be obtained. In the present embodiment, the loss coefficient tan δ is about 0.5 to 0.8 at frequencies near 50 Hz, and the loss coefficient tan δ is about 0.7 to 1.0 at frequencies near 100 Hz.

This viscosity of the elastic material should desirably be within a range of 5 to 1,000 gf/cm2 in order that the cushion members 204 might not fall off of the adhesion surfaces of the positioning recesses 209 and 210 due to dead weights but should be detachable from the adhesion surfaces.

As a result of this, the cushion members 204 can be let stick directly to the mount surfaces as described previously, without using adhesive agents or tapes. Besides, the cushion members 204 can be attached repeatedly even after the cushion members 204 are detached to serve maintenance work or the like.

In the vibration-proof structure of the disc changer 200 as described above, vibrations and impacts transmitted from the vehicle to the device body 1 through the outer housing 201 assembled in the mount space 304 in the dashboard 303 can be damped appropriately by using elastic deformation in shearing directions of the cushion members 204 which are provided between both sides of the device body 1 and the outer housing 201. Accordingly, it is possible to avoid the risk that the discs 2 contact internal mechanisms and are thereby damaged when the disc changer 200 is used mounted on a vehicle.

The viscous elastic material forming the cushion members 204 can be let directly stick to mount surfaces on the device body 1 and the outer housing owing to its viscosity. Therefore, assembling work is easy when attaching the cushion members 204 to between the two side surfaces of the device body 1 and the outer housing 201. Since the viscosity can be maintained for a long time, the cushion members 204 can be stably maintained between the two side surfaces of the device body 1 and the outer housing 201.

Figure 1:
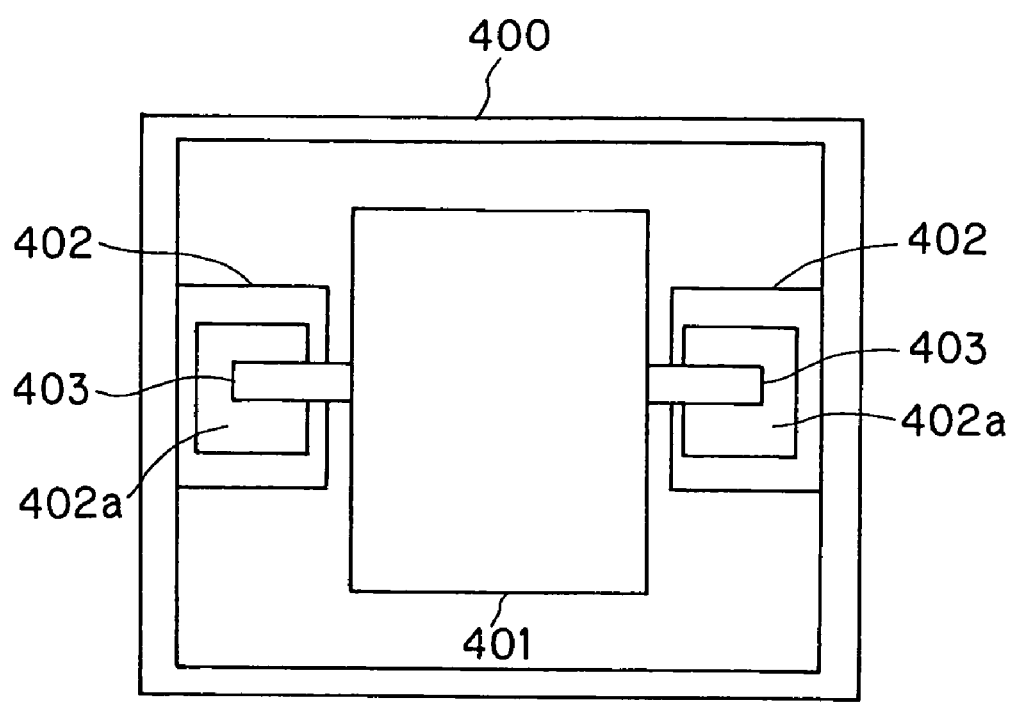
FIG. 1 is a schematic view showing a vibration-proof structure of a conventional disc changer.

Further, the cushion members 204 have no risk of liquid leakage as incurred in the liquid-sealing damper 402 shown in FIG. 1 mentioned previously and necessitate no stirrer shafts 403. Thus, the structure is simplified, and the cushion members 204 can be down-sized.

Accordingly, in the disc changer 200, operational reliability of the device body 1 during driving of the vehicle can be improved greatly by suppressing influences of vibrations and the like transmitted from the vehicle. In addition, further down-sizing and cost reduction can be achieved.

The shape of the cushion members 204 is not limited to the columnar shape as described above and can have an arbitrary shape in compliance with vibration damping characteristics thereof. The number and layout of the cushion members 204 can be arbitrarily set so as to obtain optimal vibration characteristics.

Figure 11:
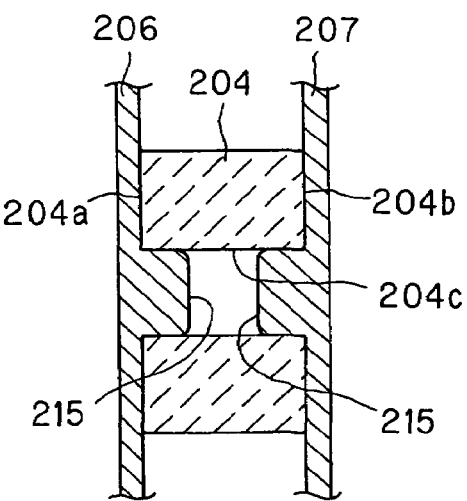
FIG. 11 is a cross-sectional view showing a first modification of the mount structure of the cushion member.

For example, the structure may be arranged like a modification as shown in FIG. 11. That is, positioning protrusions 215 are provided on the above-described adhesion surfaces of the inner frames 206 and the outer frames 207. With these positioning protrusions 215 engaged in holes 204c which penetrate the substantial center portions of the cushion members 204 in their shearing directions, the two end surfaces 204a and 204b of the cushion members 204 are stuck to the mount surfaces of the inner frames 206 and the outer frames 207.

Figure 12:
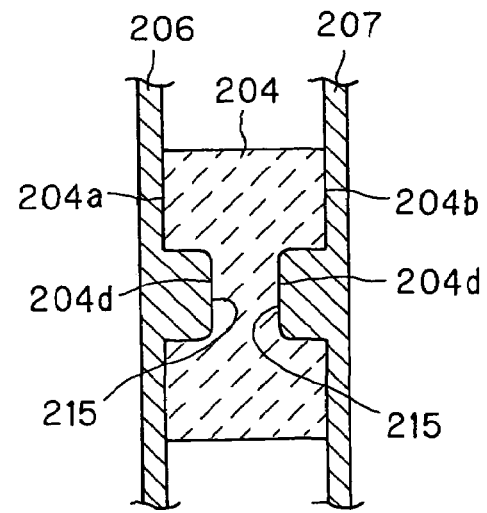
FIG. 12 is a cross-sectional view showing a second modification of the mount structure of the cushion member.

Alternatively, the structure may be arranged like another modification as shown in FIG. 12. That is, positioning protrusions 215 are provided on the above-described mount surfaces of the inner frames 206 and the outer frames 207. With the positioning protrusions 215 engaged in recesses 204d provided at substantial center portions of the two end surfaces 204a and 204b of the cushion members 204, the two end surfaces 204a and 204b of the cushion members 204 are stuck to the mount surfaces of the inner frames 206 and the outer frames 207.

Further, the structure may be arranged in a structure in which the positioning recesses 209 and 210 and the positioning protrusions 215 are provided on the mount surfaces of only the inner frames 206 or the outer frames 207. Alternatively, the positioning recesses 209 and 210 and the positioning protrusions 215 may be combined with each other.

Described next will be a specific structure of the device body 1 which forms part of the disc changer 200.

Figure 13:
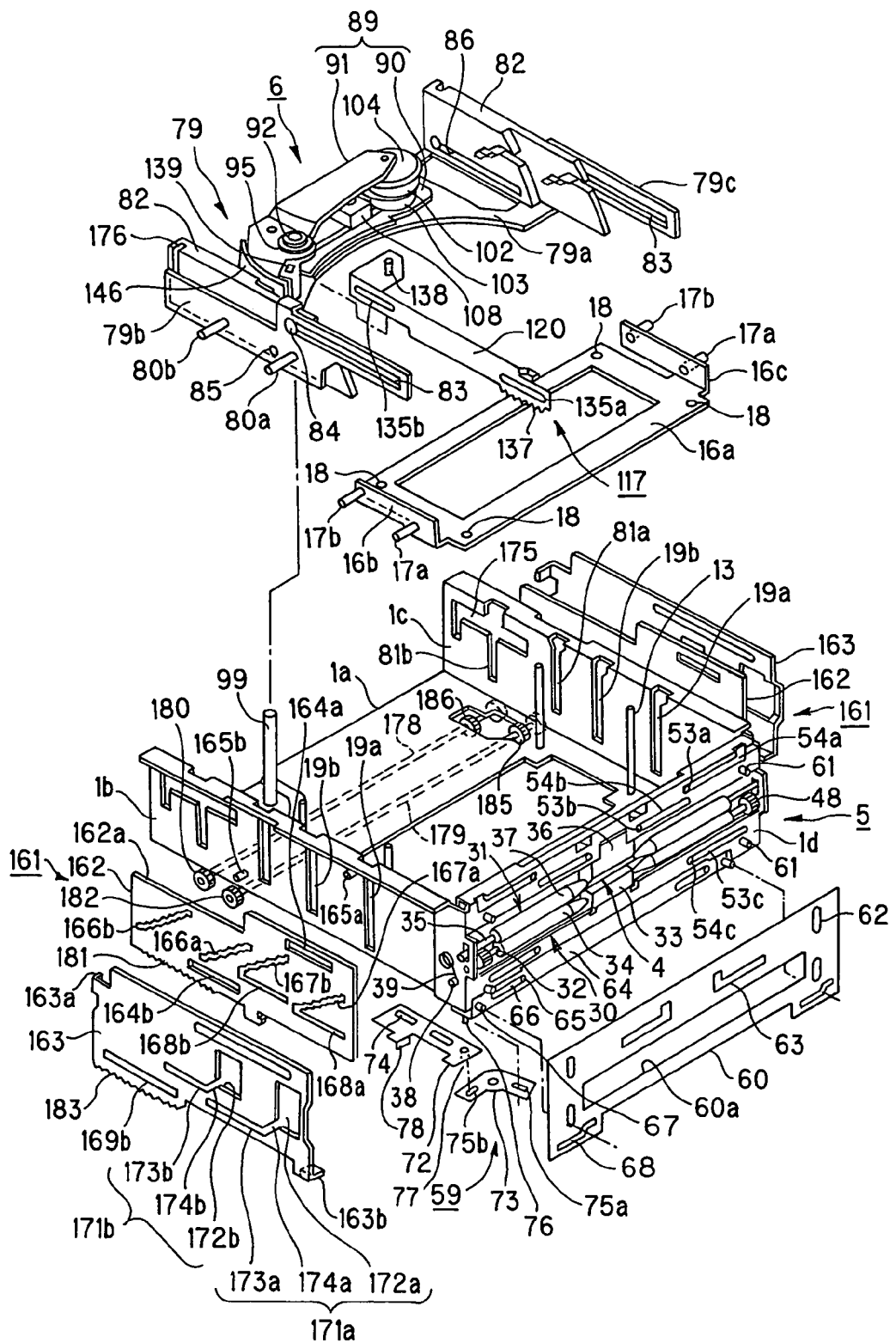
FIG. 13 is an exploded perspective view showing the inner structure of the device body.

The device body 1 forming part of the disc changer 200 has a substantially box-like housing as a whole as shown in FIGS. 3 and 13. This housing has a substantially rectangular bottom plate 1a, a pair of side plates 1b and 1c provided standing vertically on two side edges of the bottom plate 1a and formed integrally with the bottom plate 1a, a front plate 1d installed along the front side edges of the bottom plate 1a and the side plates 1b and 1c, and a top plate 1e facing the bottom plate 1a and installed along the top edges of the side plates 1b and 1c and the front plate 1d, with the rear side of the device body 1 opened.

Inside the housing, the device body 1 includes a disc container part 3, a disc loader/unloader 5 which loads/unloads discs 2 into/from the disc container part 3 through a disc load/unload slot 4 provided in the front plate 1d, and a pickup device 6 as a recorder/player which selects one of discs 2 contained in the disc container part 3 and reproduces signals.

Figure 14A:
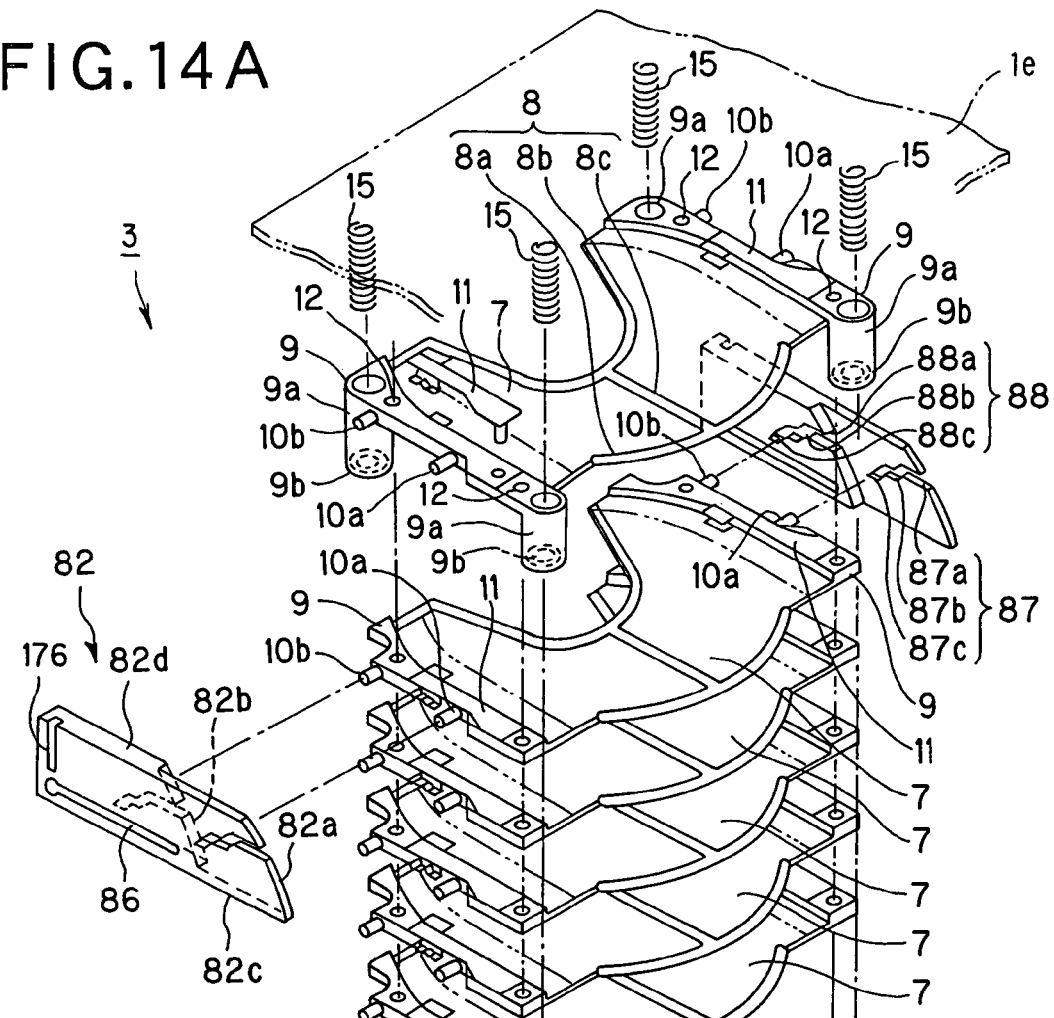
FIG. 14A is an exploded perspective view showing the structure of a disc container part and FIG. 14B is a perspective view of a main part of the uppermost tray partially cut away.

As shown in FIGS. 3 and 14A, the disc container part 3 is provided such that six trays 7 on which discs 2 are set are stacked in the front side of the housing exposed to the disc load/unload slot 4.

As shown in FIGS. 14A, 14B, 15, and 16, the trays 7 are made of resin material mixed with metal material or metal powder of aluminum, stainless steel, or the like. Each tray 7 is formed, as a whole, in a substantially plate-like shape having thickness $T_1$ of 0.3 mm or so, for example. The tray 7 also has a shape notched from the back side to a position where a center hole 2a is exposed, and has inclined surfaces along which the front edge part is tapered to be thinner toward the disc load/unload slot 4.

On both surfaces of each tray 7 which face a disc 2, a resin layer 8 is formed, for example, with thickness $T_2$ of about 0.1 to 0.2 mm by printing, in order to prevent damages on the disc 2. This resin layer 8 is constituted by a first resin part 8a formed along the front edge part, a second resin part 8b formed along the rear edge part, a third resin part 8c formed to connect the first resin part 8a and the second resin part 8b by a center part.

Figure 17:
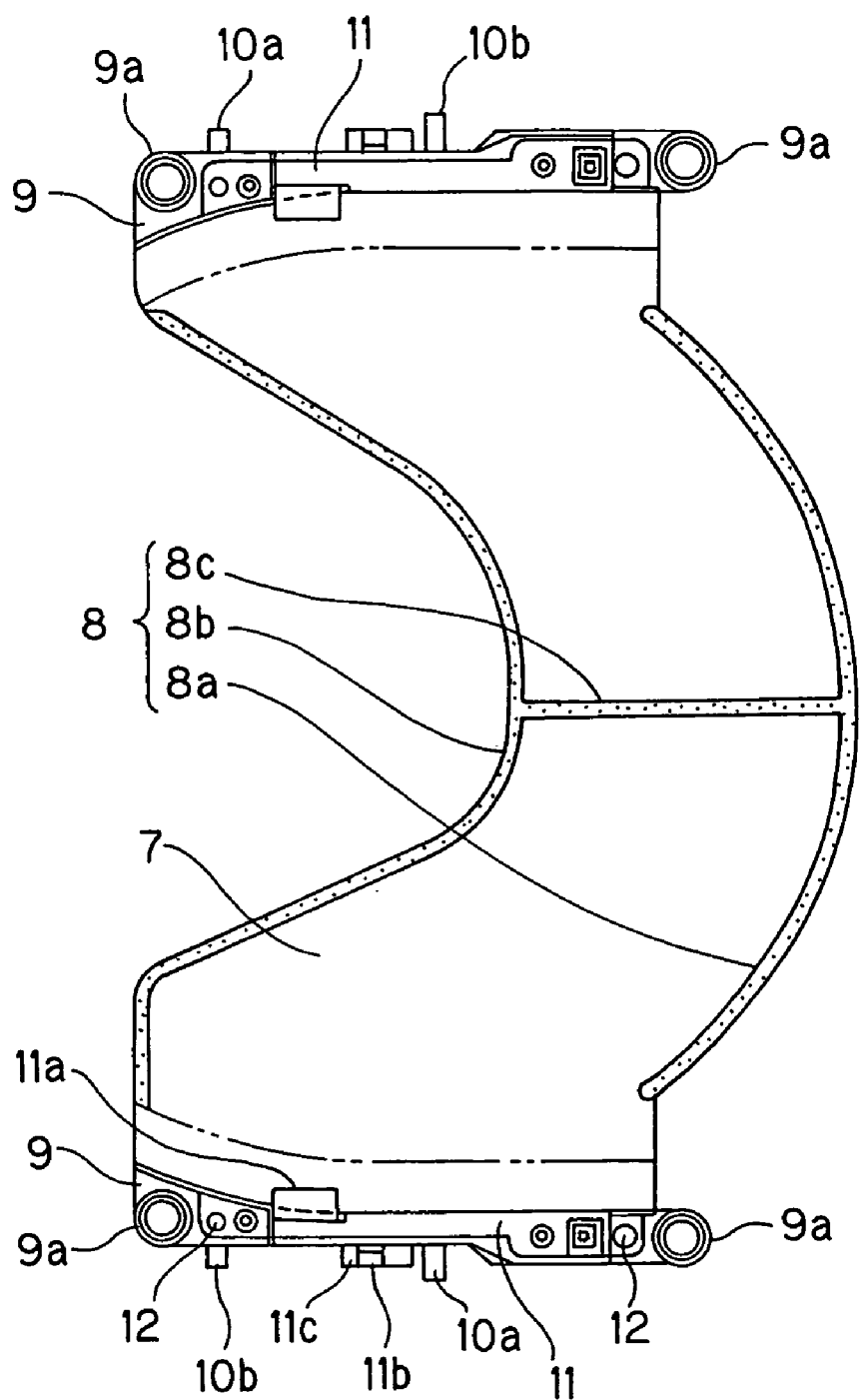
FIG. 17 is a plan view showing the tray equipped with a pair of resin members.

On both sides of each tray 7, as shown in FIGS. 14A and 17, a pair of resin members 9 are provided along the contour of the disc 2 to be set. The pair of resin members 9 have substantially equal thickness to the disc 2 to be set on the tray 7. A pair of pins 10a and 10b arranged substantially in parallel with the major surface of the tray 7 are formed and protruded from each of surfaces of the resin members 9 that face the side plates 1a and 1b, toward each of the side plates 1b and 1c. Of each pair of pins 10a and 10b, the length of the pin 10a in the front side is longer than the other pin 10b in the rear side.

The pair of resin members 9 are equipped with plate springs 11 cantilevered along the upper surfaces of the resin members 9. These plate springs 11 each have a fixed end in the front side in the lengthwise direction, and also have another end as a free end at which a press piece 11a is formed and protruded toward the disc 2 to be set on the tray 7. When a disc 2 is set on a tray 7, the plate spring 11 sandwiches the disc 2 between the press piece 11a and the tray 7. Also at said another end of each plate spring 11, bent pieces 11b and 11c are provided and bent toward the side plates 1b and 1c.

A pair of penetration holes 12 positioned in the front and rear sides in the lengthwise direction and penetrating the tray 7 are cut in each of the pair of resin members 9. Meanwhile, four guide pillars 13 to be inserted in the penetration holes 12 are installed on the disc container part 3, connecting the bottom plate 1a and the top plate 1d. The six trays 7 are stacked with the four guide pillars 13 inserted in their respective penetration holes 12, and are supported to be movable along the guide pillars 13.

Figure 14B:
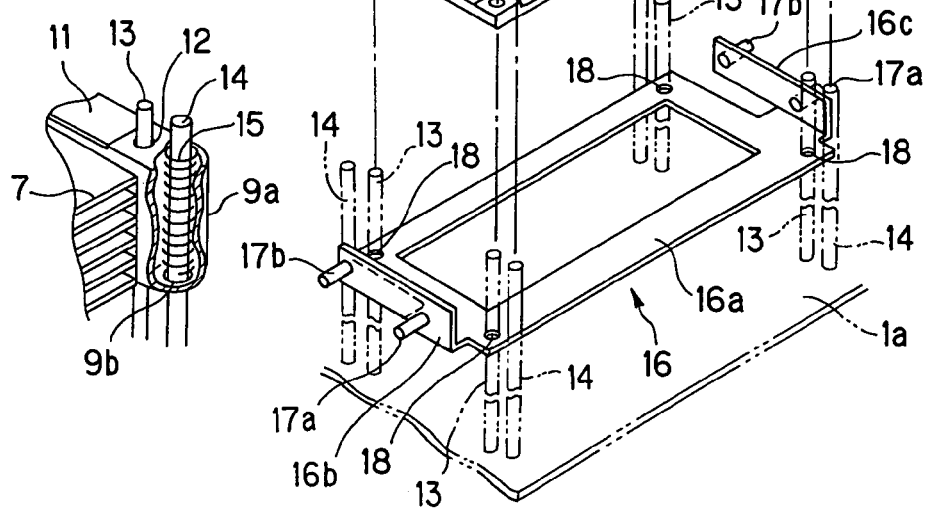
Figure 15:
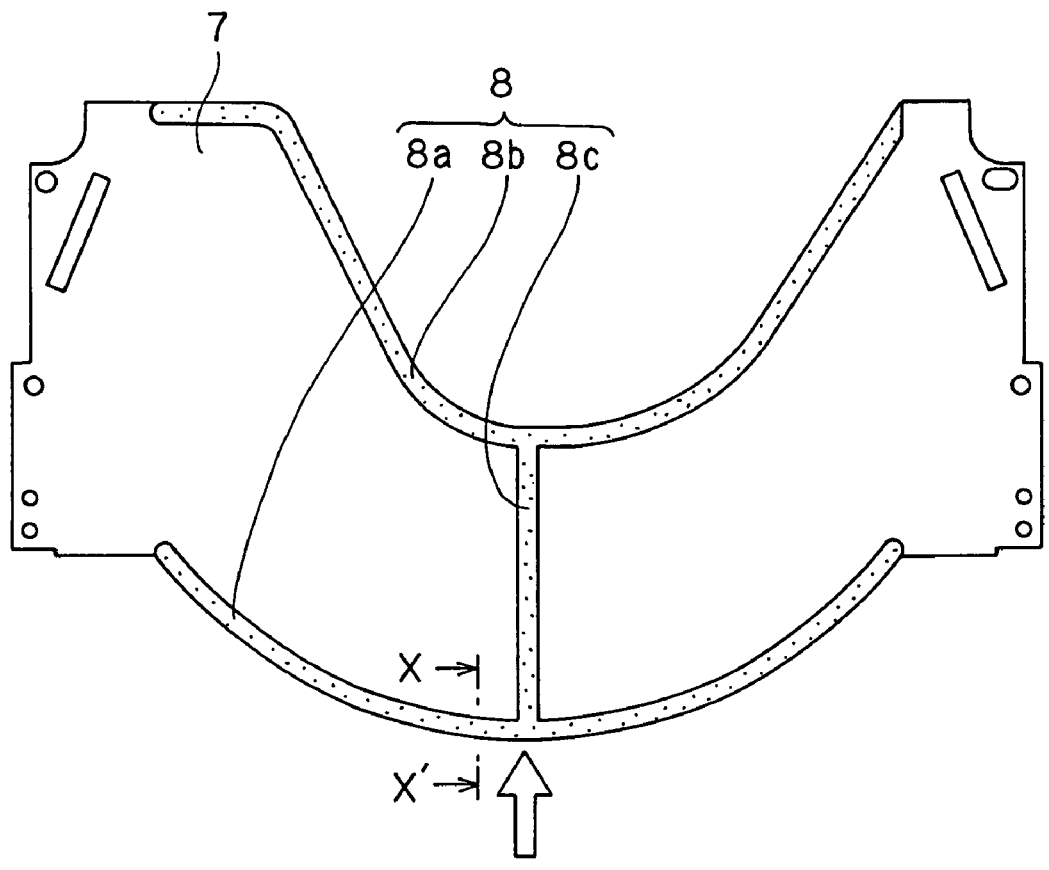
FIG. 15 is a plan view showing a tray.
Figure 16:
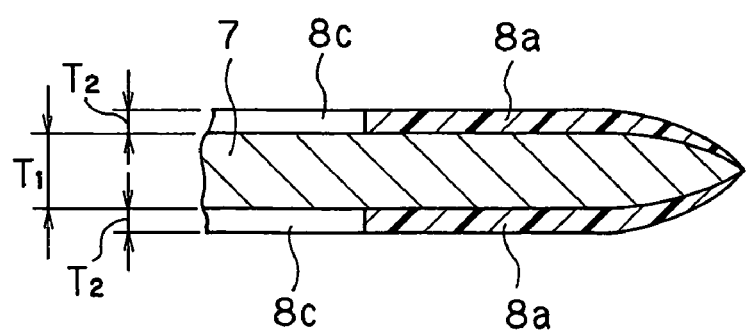
FIG. 16 is a cross-sectional view cut along the line X-X' in FIG. 15.

The pair of resin members 9 attached to the uppermost tray 7 have substantially cylindrical spring receivers 9a protruded downward and positioned at both ends in the lengthwise direction, i.e., in the front and rear sides beyond the penetration holes 12 cut in the pair of resin members 9. As shown in FIGS. 3, 14A and 14B, coil springs 15 are inserted in the spring receivers 9a from openings thereof at upper ends. To hold the coil springs 15 inside, only insertion holes 9b to allow insertion of guide pillars 14 are formed in the bottoms of the spring receivers 9a. Meanwhile, the disc container part 3 is equipped with four guide pillars 14 connecting the bottom plate 1a and the top plate 1d.

In the uppermost tray 7, the coil springs 15 are inserted in the spring receivers 9a but slightly stick out therefrom. The four guide pillars 14 are inserted in the spring receivers 9a in which the coil springs 15 are inserted. Then, the springs are compressed and energized downward along the guide pillars 14.

Since the disc container part 3 is constructed as described above, a relatively long coil spring 15 can be used. Therefore, if compression of the coil springs 15 become great, loads required to compress the coil springs 15 can be small.

In the disc container part 3, as shown in FIG. 14A, a disc elevation table 16 is provided and positioned below the lowermost tray 7. The disc elevation table 16 has a substantially rectangular horizontal plate 16a, and vertical plates 16b and 16c bent upward from both side edges of the horizontal plate 16a. On each of surfaces of the vertical plates 16b and 16c that face the side plates 1a and 1b, a pair of pins 17a and 17b arranged substantially in parallel with the major surface of the tray 7 are formed, and the pins are protruded toward the side plates 1b and 1c. Penetration holes 18 are cut in the disc elevation table 16 and positioned at respective corners of the horizontal plate 16a. The four guide pillars 13 described previously are inserted in the penetration holes 18, thereby supporting the disc elevation table 16 to be freely movable, together with the six trays 7 described above, along the guide pillars 13.

Meanwhile, a pair of vertical slits 19a and 19b corresponding to the pair of pins 17a and 17b of the disc elevation table 16 movable along the guide pillars 13 are cut in each of the side plates 1b and 1c. The disc elevation table 16 inserts each pair of pins 17a and 17b in the vertical slits 19a and 19b cut in each of the side plates 1b and 1c, to make the pins protruded to the outside of the housing. Therefore, as the disc elevation table 16 moves vertically, each pair of pins 17a and 17b slides inside the vertical slits 19a and 19b.

In the disc container part 3, the stacked six trays 7 are mounted on the disc elevation table 16. The coil springs 15 inserted in the four guide pillars 14 are engaged in the spring receivers 9a of the uppermost tray 7, thereby energizing the disc elevation table 16 and the six trays 7 toward the bottom plate 1a.

Figure 18:
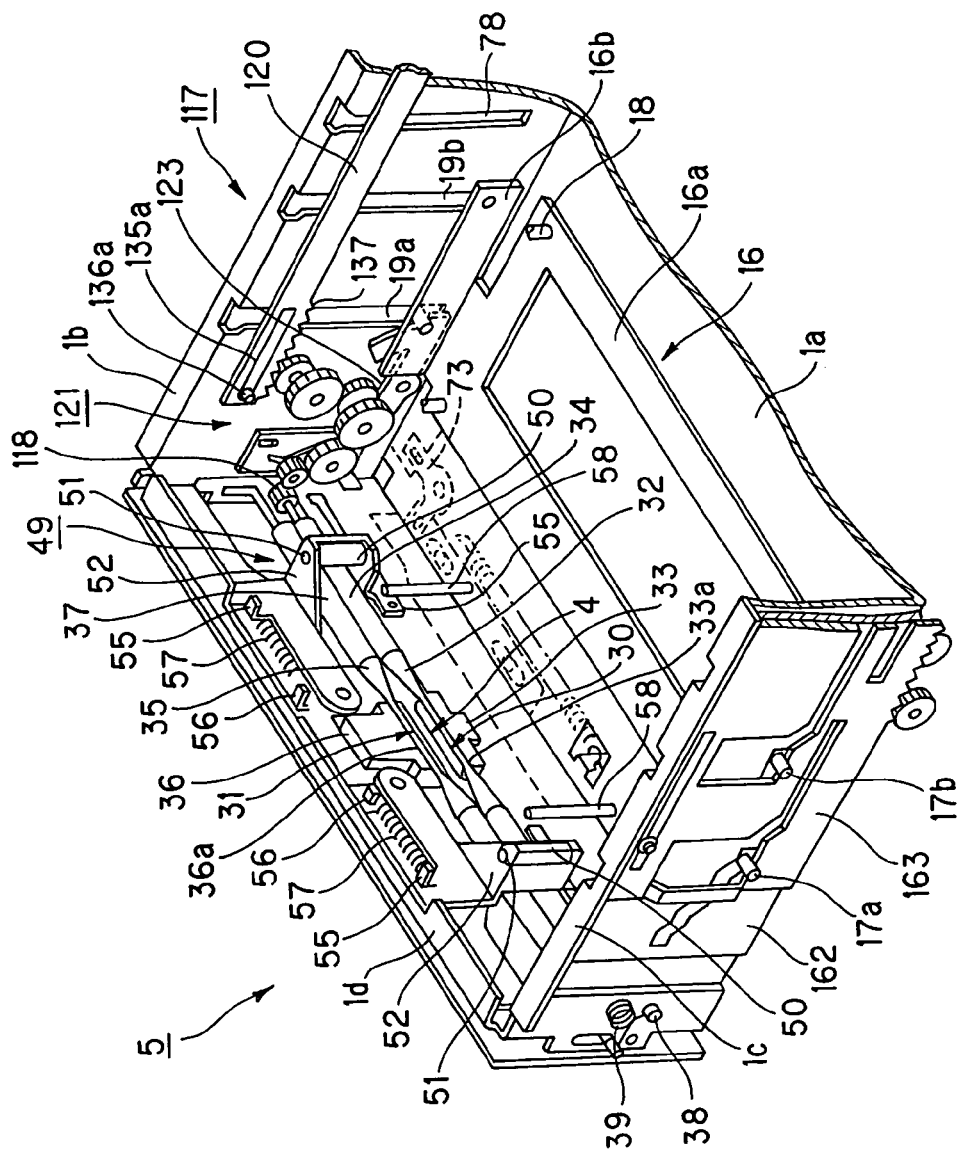
FIG. 18 is a perspective view of a main part of a disc loader/unloader viewed from the inside of the housing.

As shown in FIGS. 3, 13, and 18, the disc loader/unloader 5 is provided on the front plate 1d in which the disc load/unload slot 4 is formed. The disc loader/unloader 5 has paired drive roller 30 and slave roller 31 opposed to each other along the disc load/unload slot 4.

Of the rollers, the drive roller 30 has a spindle shaft 32 whose two ends are pivoted rotatably and whose center part is supported by a drive bearing 33. Rubber rollers 34 are provided to cover the circumferential surface of the spindle shaft 32 between the pivoted ends and the supported center part of the spindle shaft. More specifically, in the drive roller 30, the diameter of the spindle shaft 32 sequentially decreases toward the drive bearing 33 between the part supported by the drive bearing 33 and the parts covered with the rubber rollers 34. The drive bearing 33 is made of resins, and a groove 33a is formed along the spindle shaft 32 in the back side thereof. The center part of the spindle shaft 32 is rotatably engaged in the groove 33a. Stopper rings (not shown) constrain sliding of the rubber rollers 34 in directions toward the center of the shaft.

Meanwhile, the slave roller 31 has a spindle shaft 35 whose two ends are rotatably pivoted and whose center part is supported by a slave bearing 36. Resin rollers 37 are provided to cover the circumferential surface of the spindle shaft 35 between the pivoted ends and the supported center part. More specifically, in the slave roller 31, the diameter of the spindle shaft 35 sequentially decreases toward the slave bearing 31 between the part supported by the slave bearing 36 and the parts covered with the resin rollers 37. The slave bearing 36 is made of resins, and a groove 36a is formed along the spindle shaft 35 in the back side thereof. The center part of the spindle shaft 35 is rotatably engaged in the groove 36a. Stopper rings (not shown) constrain sliding of the resin rollers 37 in directions toward the center of the shaft.

Two ends of the spindle shaft 35 of the slave roller 31 are inserted in slits cut in side surface parts of the front plate 1d. The slave bearing 36 can slide in a vertical direction as a pair of guide grooves (not shown) and a pair of guide protrusions are engaged with each other. As a result, the slave roller 31 can be brought into contact and apart from the drive roller 30.

Further, the slave roller 31 is provided with circumferential grooves (not shown) at two ends of the spindle shaft 35 while spring hook pins 38 are provided and protruded from side surface parts of the front plate 1d. Two ends of each twist coil spring 39 are engaged with one of the circumferential grooves and one of the spring hook pins 38, thereby being energized toward the drive roller 30.

Figure 19:
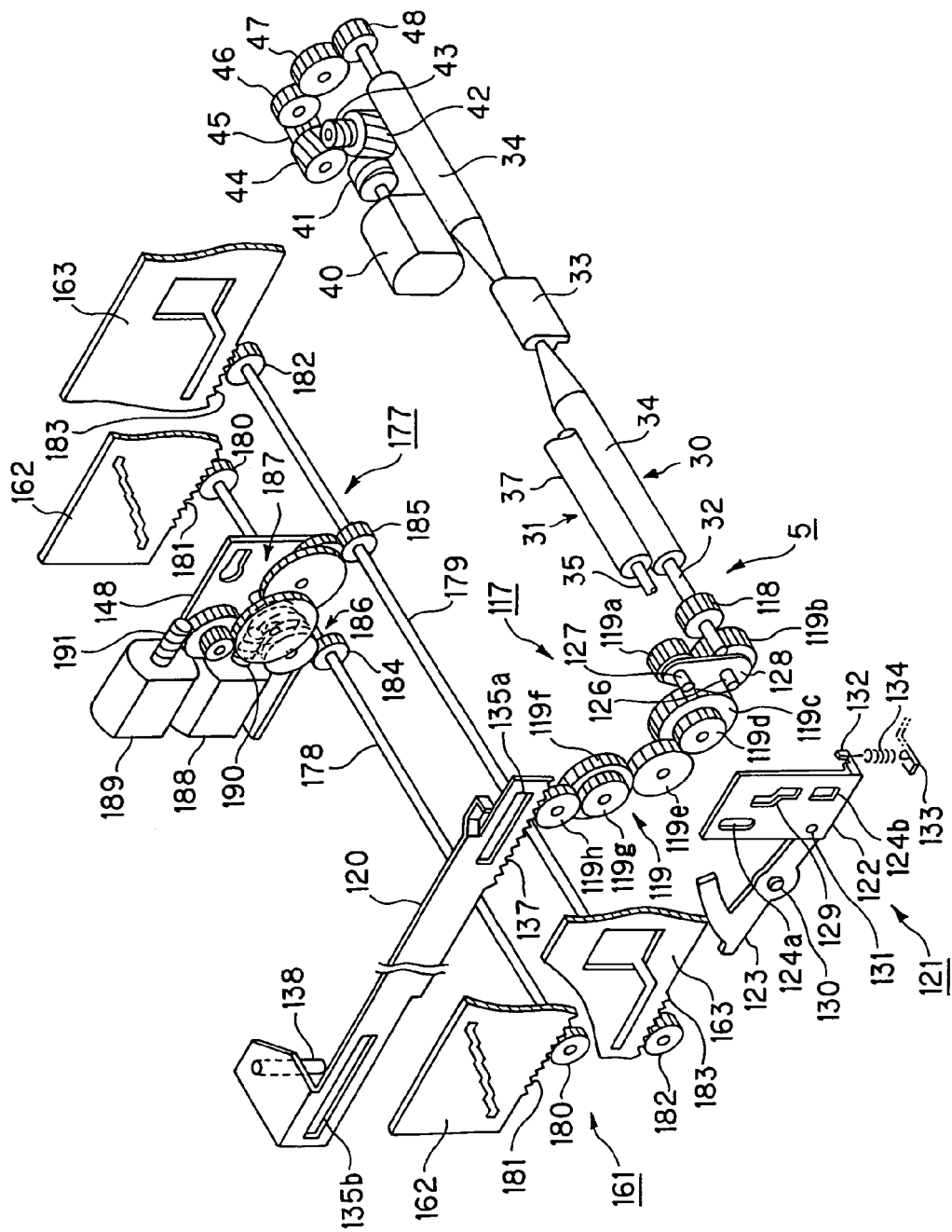
FIG. 19 is a perspective view showing a drive section of the device body.

As shown in FIGS. 18 and 19, the drive roller 30 is rotated and driven by the drive motor 40. More specifically, the drive roller 30 has a worm gear 41 attached to a spindle shaft of the drive motor 40, a gear 42 engaged with the worm gear 41, a worm gear 43 pivoted together with the gear 42, a gear 44 engaged with the worm gear 43, a gear 45 pivoted integrally with the gear 42, gears 46 and 47 engaged mutually with the gear 45. A gear 48 attached to an end of the spindle shaft 32 of the drive roller 30 is engaged with the gear 47, thereby rotating and driving the drive roller 30 by the drive motor 40.

Further, the disc loader/unloader 5 rotates the drive roller 30, sandwiching a disc 2 between the pair of drive roller 30 and slave roller 31, thereby to load or unload the disc 2 through the disc load/unload slot 4.

As shown in FIGS. 13 and 18, the disc loader/unloader 5 has a disc push-in mechanism 49 which automatically pushes in the disc 2 further by a predetermined distance amount (several millimeters) into the housing after completion of insertion of the disc 2.

This disc push-in mechanism 49 has a pair of vertical rollers 50 behind the paired drive roller 30 and slave roller 31, and the vertical rollers are perpendicular to the paired drive roller 30 and slave roller 31.

The pair of vertical rollers 50 are formed by shaping resins into a substantially columnar shape, and has at its two ends spindle shafts 51 which are axially supported to be rotatable by support members 52. The support members 52 are attached to the front plate 1d, kept movable in a horizontal direction. More specifically, guide pins 53a, 53b, and 53c are provided and protruded on surfaces while three guide holes 54a, 54b, and 54c corresponding to the three guide pins 53a, 53b, and 53c which move in the horizontal direction are cut in the front plate 1d. The support members 52 are attached to the front plate 1d, kept movable in the horizontal direction, by undetachably inserting the guide pins 53a, 53b, and 53c in the guide holes 54a, 54b, and 54c.

In order to energize the pair of vertical rollers 50 in a direction in which these rollers move close to each other, coil springs 57 are tensioned between spring hooks 55 provided on the support members 52 and spring hooks 56 provided on the front plate 1d.

In the disc push-in mechanism 49, positioning of a disc 2 is performed with the disc 2 sandwiched between the pair of vertical rollers 50. On the other side, positioning of a disc 2 existing below the pair of vertical rollers 50 is performed with a pair of positioning rods 58 standing on the bottom plate 1a. Further, positioning of a disc 2 existing above the pair of vertical rollers 50 is performed by a pair of positioning rods (not shown) but standing on the top plate 1e and positioned on extension lines of the pair of positioning rods 58.

Figure 20:
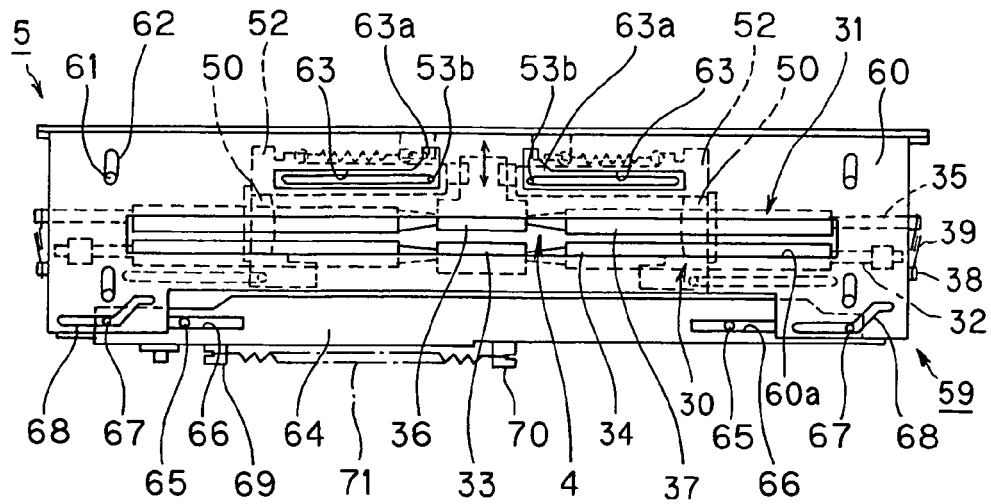
FIG. 20 is a front view of the disc loader/unloader viewed from the front side of the housing.

The disc loader/unloader 5 has a shutter mechanism 59 which is provided on the front plate 1d and opens/closes the disc load/unload slot 4, as shown in FIGS. 3, 13, and 20.

The shutter mechanism 59 has a substantially rectangular shutter 60 in which an opening 60a corresponding to the disc load/unload slot 4 is formed. The shutter 60 is attached to the front plate 1d, kept vertically movable. The shutter mechanism 59 raises the shutter 60 to align the opening 60a of the shutter 60 with the disc load/unload slot 4. The disc load/unload slot 4 is then opened. On the other side, the shutter mechanism 59 moves down the shutter 60 to close the disc load/unload slot 4.

More specifically, guide pins 61 are protruded from respective corners of the surface of the front plate 1d which faces the shutter 60 of the front plate 1d. On the other side, guide holes 62 corresponding to the guide pins 61 are vertically cut in the shutter 60. The guide pins 61 of the front plate 1d are inserted in the guide holes 62 of the shutter 60, and stopper rings (not shown) are engaged on the top ends of the guide pins 61.

Further, guide holes 63 to allow insertion of the guide pins 53b protruded from the support members 52 described previously are cut in the shutter 60. The length of the guide pins 53b is greater than the lengths of the other guide pins 53a and 53c, so that the guide pins 53b are inserted in the guide holes of the shutter 60.

The guide holes 63 allows the shutter 60 to be vertically movable with the guide pings 53b inserted. The guide holes 63 each are substantially L-shaped to allow the inserted guide pins 53b to be horizontally movable. As a result, only when the shutter 60 moves up to open the disc load/unload slot 4, the support members 52 are horizontally movable. Notches 63a are formed at the guide holes 63, to allow elevation of the shutter 60 in case where the gap between the pair of vertical rollers 50 is widened to unload forcedly a disc 2 due to some reasons.

The shutter mechanism 59 further has a lateral slide plate 64 having a L-shaped cross section, which is movable in the direction (lateral direction) along the front plate 1d. The lateral slide plate 64 is installed along edges of the bottom plate 1a and the front plate 1d.

More specifically, a pair of guide pins 65 are protruded from each of surfaces of the bottom plate 1a and the front plate 1d that face the lateral slide plate 64. Guide holes 66 corresponding to the pair of guide pins 65 are laterally cut in the lateral slide plate 64. The guide pins 65 of the bottom plate 1a and the front plate 1d are inserted in the guide holes 66 of the lateral slide plate 64. Stopper rings (not shown) are engaged on top ends of the guide pins 65.

A pair of slide pins 67 are protruded from a surface of the lateral slide plate 64 that face the shutter 60. On the other side, a pair of cam holes 68 corresponding to the pair of slide pins 67 are cut in the shutter 60, to have a predetermined shape. The slide pins 67 of the lateral slide plate 64 are inserted in the cam holes 68 of the shutter 60. Stopper rings (not shown) are engaged on top ends of the slide pins 67.

A spring hook 69 is protruded downward from the lateral slide plate 64, positioned at an end side (left side) of the lower surface. On the other side, a spring hook 70 is protruded downward from the bottom plate 1a, positioned at a substantial center of the lower surface. A coil spring 71 is tensioned between the spring hook 69 of the lateral slide plate 64 and the spring hook 70 of the bottom plate 1a. As a result, the lateral slide plate 64 is energized toward the other end side (right side), so that the pair of slide pins 67 are positioned at right ends in the cam holes 68. The cam holes 68 cut in the shutter 60 each have a bent shape in which the right end is higher than the left end. Therefore, the shutter 60 is energized downward to close the disc load/unload slot 4.

The shutter mechanism 59, as shown in FIGS. 13 and 18, has a longitudinal slide plate 72 on an end side (left side) of the bottom plate 1a, and a substantially L-shaped connection lever 73. The longitudinal slide plate 72 is movable in directions (forward and backward directions) along the side plate 1b and 1c. The connection lever 73 connects the longitudinal slide plate 72 and the lateral slide plate 64.

More specifically, a pair of guide holes 74 are longitudinally cut in the longitudinal slide plate 72. A pair of rivet guide pins (not shown) to be inserted in the guide holes 74 are fixed to the bottom plate 1a.

The connection lever 73 is attached to the lower surface of the bottom plate 1a, to be rotatable about a center part thereof by a fixed shaft 74. The connection lever 73 has two ends in which slits 75a and 75b are formed. On the other side, a pin 76 to be engaged, with play, in the slit 75a of the connection lever 73 is protruded from the lateral slide plate 64, positioned at an end of the corresponding close to the connection lever 73. A pin 77 to be engaged, with play, in the slit 75b of the connection lever 73 is protruded from the longitudinal slide plate 72, positioned at an end of the corresponding close to the connection lever 73. Further, the longitudinal slide plate 72 is provided with a bent part 78 bent downward.

Figure 21:
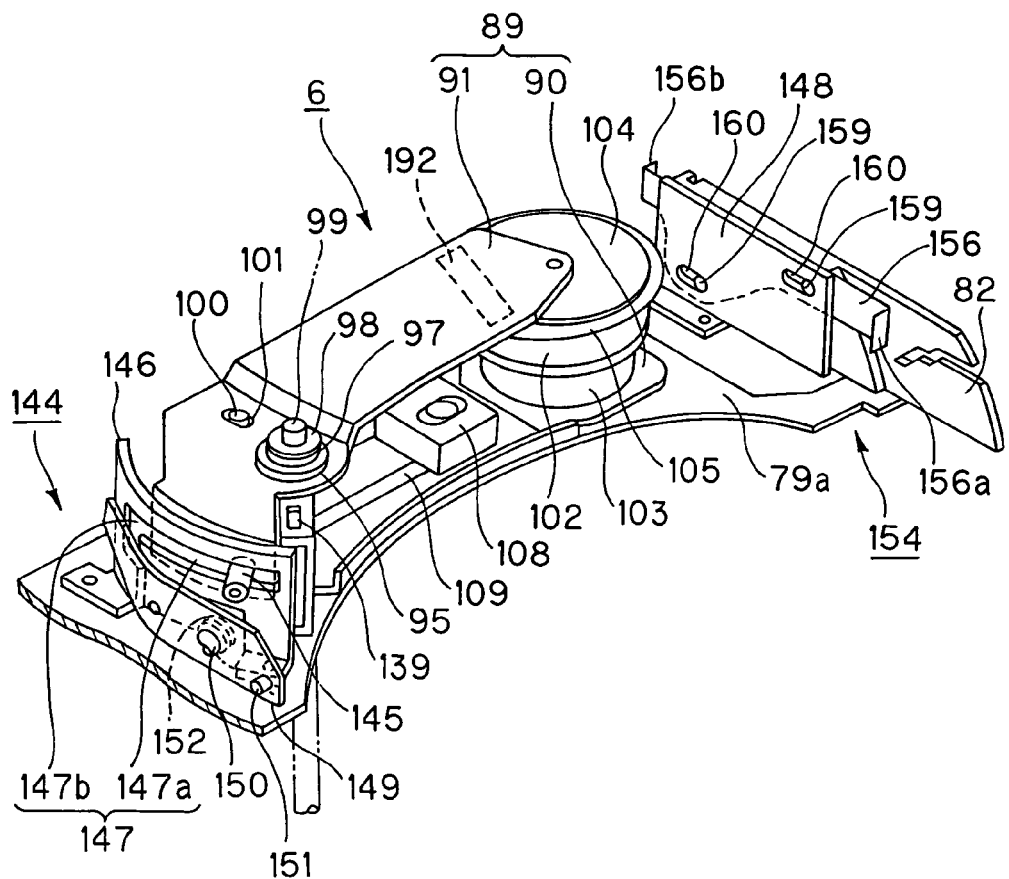
FIG. 21 is a perspective view showing an outer appearance of a pickup device.

The pickup device 6, as shown in FIGS. 13 and 21, is mounted on a pickup elevation table 79 provided in the rear side of the disc container part 3. The pickup elevation table 79 serves to move up and down the pickup device 6. The pickup elevation table 79 is constructed by integrally molding a substantially rectangular horizontal plate 79a whose front side exposed to the disc container part 3 is notched, and vertical plates 79b and 79c provided standing up on two side edges of the horizontal plate 79a.

A pair of pins 80a and 80b arranged substantially in parallel with the major surfaces of trays 7 are formed on and protruded from each of the vertical plates 79b and 79c toward the side plates 1b and 1b, positioned on surfaces facing the side plates 1a and 1b. On the other side, a pair of vertical slits 81a and 81b corresponding to the pair of pins 80a and 80b of the pickup elevation table 79 are cut in each of the side plates 1b and 1c. The pickup elevation table 79 inserts the pairs of pins 80a and 80b into the vertical slits 81a and 81b cut in the side plates 1b and 1c, and the pins 80a and 80b are protruded to the outside of the housing. Therefore, as the pickup elevation table 79 moves up vertically, each pair of pins 80a and 80b slide vertically in the vertical slits 81a and 81b.

The vertical plates 79a and 79b are provided with a pair of separation cams 82 made of resins, positioned at surfaces facing the side plates 1b and 1c.

As shown in FIGS. 13 and 14A, the pair of separation cams 82 slide in forward and backward directions, thereby to form spaces above and below a tray 7 on which a selected disc (hereinafter referred to as a selected disc) 2 is set hereinafter referred to as a selected tray), among the six trays 7 stacked in the disc container part 3 as described previously, while holding the selected tray 7.

More specifically, guide holes 83 are longitudinally cut in the vertical plates 79b and 79c of the pickup elevation table 79, respectively. Rivet guide pins 84 to be inserted in the guide holes 83 are fixed to the pair of separation cams 82, respectively. The rivet guide pins 84 of the pair of separation cams 82 then slide inside the guide holes 83 of the vertical plates 79b and 79c.

Further, guide pins 85 are provided and protruded from surface of the vertical plates 79b and 79c that face the pair of separation cams 82, toward the pair of the separation cams 82. On the other side, guide grooves 86 corresponding to the guide pins 85 are formed longitudinally in the pair of separation cams 82. The guide pins 85 of the vertical plates 79a and 79b slide inside the guide grooves 86 of the pair of separation cams 82.

Figures 22A, 22B:
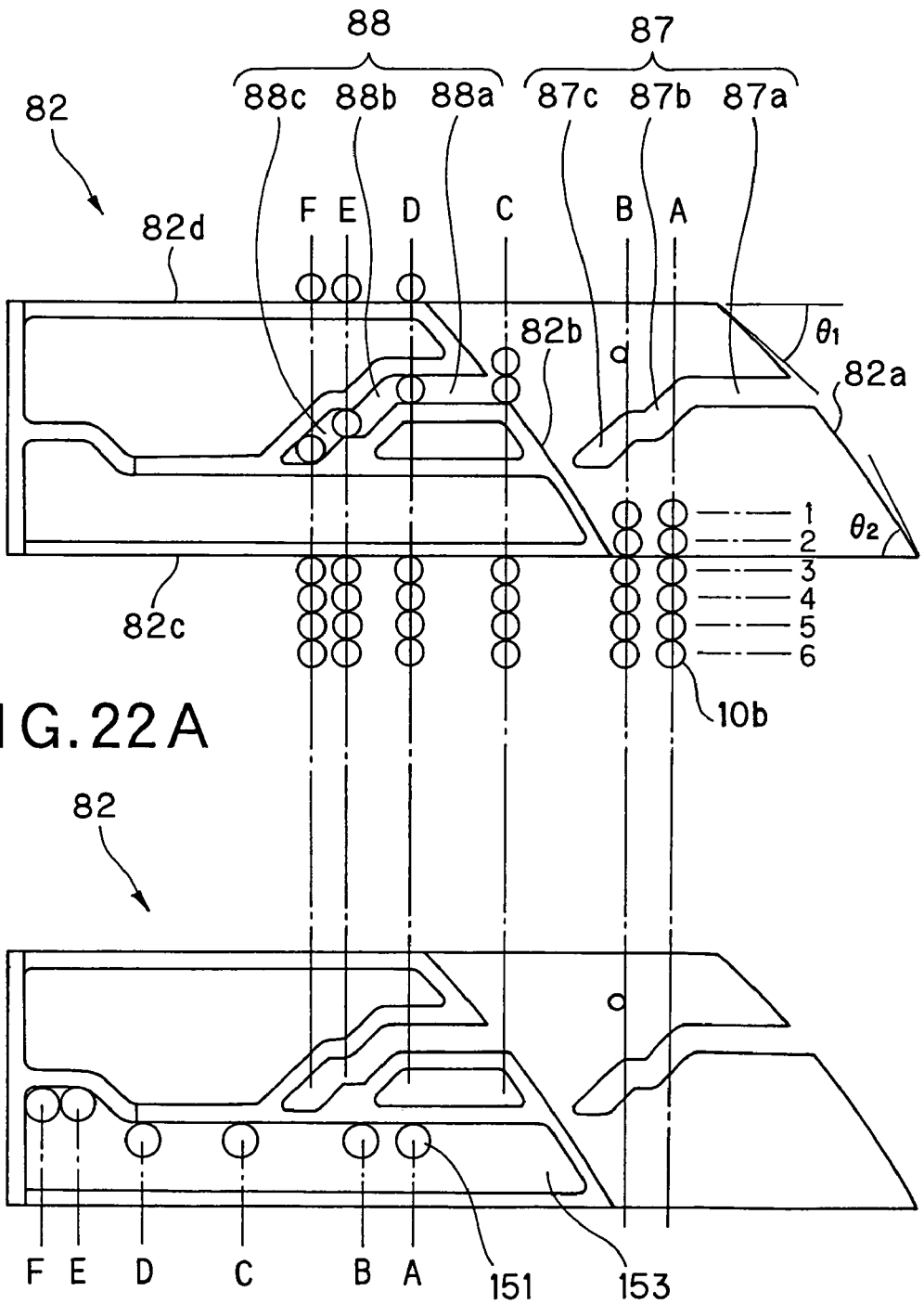
FIGS. 22A and 22B are side views showing the structure of separation cams wherein the FIG. 22A is a view for explaining an operation of forming spaces above and below a selected tray and FIG. 22B is a view for explaining an operation of a hold switch mechanism.

The pair of separation cams 82 each are made of a plate member having a substantially rectangular shape as a whole as shown in FIGS. 14A and 22A. Also, the cams each are shaped as follows. A surface 82a which faces the pin 10a in the front side, of the pair of pins 10a and 10b provided on each of two sides of each tray 7 as described previously, is formed to be protruded more forward by the distance between the pair of pins 10a and 10b than another surface 82b which faces the pin 10b in the rear side.

Slits 87 and 88 in which the pair of pins 10a and 10b are inserted are formed in the surfaces 82a and 82b that face the pair of pins 10a and 10b. These slits 87 and 88 are notched continuously from the center portions of the surfaces 82a and 82b facing the pair of pins 10a and 10b to intermediate parts in the lengthwise direction, thereby forming first engage/insert parts 87a and 88a, second engage/insert parts 87b and 88b positioned by one step lower than the first engage/insert parts 87a and 88a, and third engage/insert parts 87c and 88c positioned by one step lower than the second engage/insert parts 87b and 88b.

Also, the surfaces 82a and 82b that face the pair of pins 10a and 10b are formed as inclined surfaces whose lower ends are positioned in the front side of the upper ends. (Hereinafter, the surfaces 82a and 82b that face the pair of pins 10a and 10b will be referred to as inclined surfaces 82a and 82b.)

With respect to the inclined surfaces 82a and 82b, for example, $\theta1=\theta2=45°$ is originally set where $\theta1$ is the inclination angle of such an inclined surface that is positioned above the slits 87 and 88, and as $\theta2$ is the inclination angle of such an inclined surface that is positioned below the slits 87 and 88, as shown in FIG. 22.

However, in this case, a tray 7 is pushed up along the inclined surfaces while compressing the coil springs 15 engaged in the spring receivers 9a of the uppermost tray 7 as described previously. Hence, the higher the tray 7 is pushed up along the inclined surfaces, the greater the load necessary to compress the coil springs 15 is. In other words, in the very first stage of pushing up the tray 7 along the inclined surfaces, the load necessary to compress the coil springs 15 is small.

Therefore, in the present embodiment, for example, the inclination angle $\theta1=45°$ while the inclination angle $\theta2=60°$. Inclined surfaces positioned higher than the slits 87 and 88 as well as inclined surfaces positioned lower than the slits 87 and 88 are formed in a smoothly arced shape. As a result, the pair of pins 10a and 10b provided in two sides of each tray 7 can be pushed up smoothly along the inclined surfaces 82a and 82b The pickup device 6, as shown in FIG. 21, has a pair of chuck levers 89 as disc holder members which hold rotatably the selected disc 2 while sandwiching the selected disc 2.

The pair of chuck levers 89 have a lower arm 90 and an upper arm 91 and also have base ends rotatably secured to the pickup elevation table 79.

Figure 23:
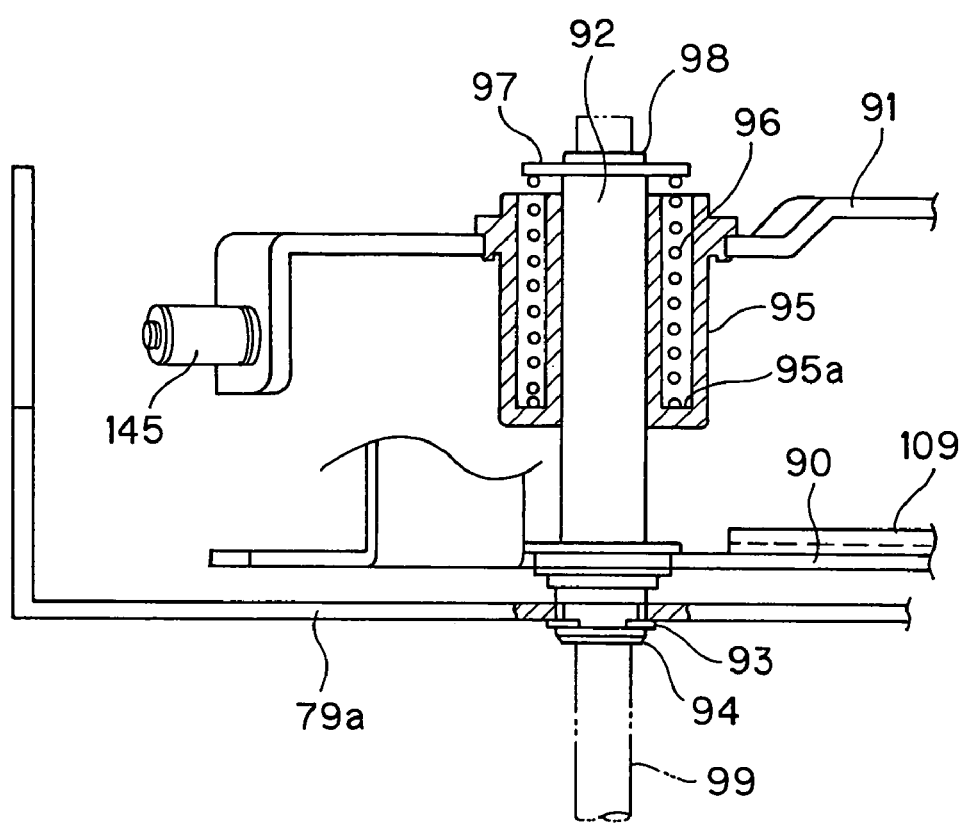
FIG. 23 is a cross-sectional view showing a main part of base ends of a pair of chuck levers.

More specifically, as shown in FIG. 23, a hollow shaft 92 which penetrates the lower arm 90 and the upper arm 91 is rotatably installed at the base ends of the pair of chuck levers 89, with the hollow shaft 92 penetrating the horizontal plate 79a of the pickup elevation table 79. A flat seat metal 93 and a stopper ring 94 are engaged on the lower end of the hollow shaft 92, thereby constraining sliding in directions toward the center of the shaft.

The lower arm 90 is fixed to the hollow shaft 92 while the upper arm 91 is fixed to a sleeve 95 in which the hollow shaft 92 is inserted. This sleeve 95 is made of, for example, copper alloy, and an outer circumferential groove 95a is formed along the outer circumferential surface of the hollow shaft 92. A coil spring 96 is engaged in the outer circumferential groove 95a, and an upper end opening of the sleeve 95 is sealed by the a flat seat metal 97 and a stopper ring 98 which are engaged on an upper end of the hollow shaft 92.

In the hollow shaft 92, a pillar 99 standing on the bottom plate 1a is inserted, to improve positioning accuracy of the pair of chuck levers 89.

About the hollow shaft 92 set as a center shaft, the lower arm 90 and the upper arm 91 are rotated, kept substantially parallel and facing each other. Therefore, a slide pin 100 standing from the lower arm 90 toward the upper arm 91 is inserted slidably in a slide hole 101 cut in the upper arm 91.

Figure 24A:
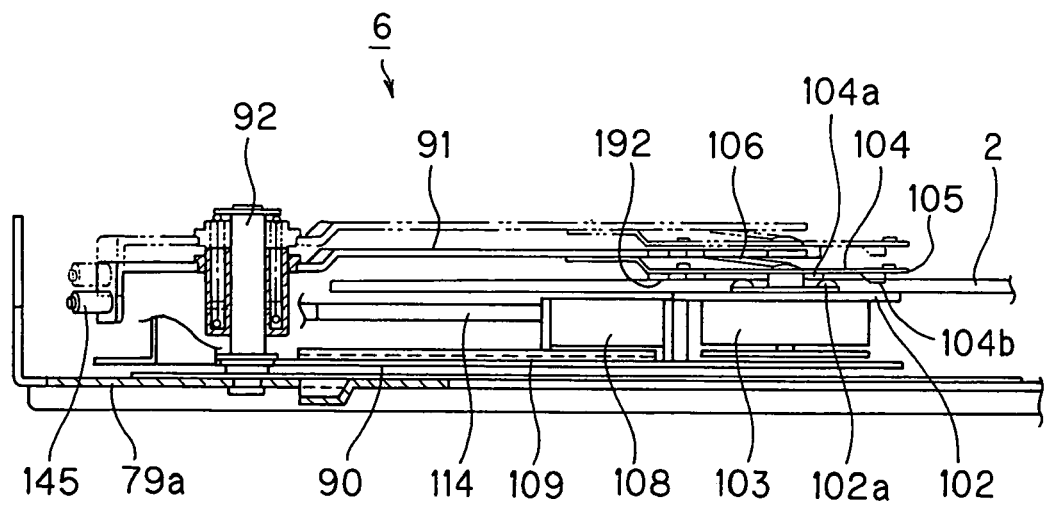
Figure 24B:
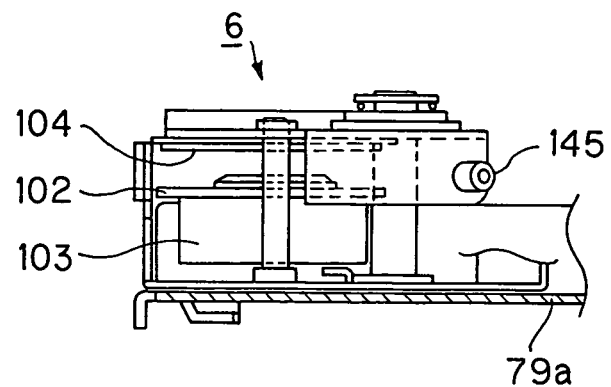

At top ends of the pair of chuck levers 89, as shown in FIGS. 21, 24A and 24B, a substantially disc-like turntable 102 on which a disc 2 is set and a spindle motor 103 which rotates and drives the turntable 102 are provided at the top end of the lower arm 90, to hold rotatably the disc 2. The turntable 102 has a center part which is fixed to a spindle of the spindle motor 103. The turntable 102 together with the spindle motor 103 is installed on the surface of the lower arm 90 that faces the upper arm 91.

On the other side, at the top end of the upper arm 91, there are provided a substantially disc-like chuck plate 104 made of resins which is conjugated with the turntable 102 to sandwich the disc 2, a support plate 105 which rotatably supports the outer circumferential edge of the chuck plate 104, and a plate spring 106 which energizes the chuck plate 104 toward the support plate 105 between the support plate 105 and the upper arm 91.

More specifically, the support plate 105 has a shape which is bent like steps between a base end cantilevered by the upper arm 91 and a top end in which a hole to be engaged with the chuck plate 104 is cut. With the top end facing the upper arm 91 at a predetermined interval, the base end is fixed to a surface of the upper arm 91 which faces the disc. The chuck plate 104 is engaged in the hole of the support plate 104, so that the support plate 104 rotatably supports the outer circumferential edge of the chuck plate 104. Further, the plate spring 106 provided between the support plate 105 and the upper arm 91 energizes the chuck plate 104 toward the support plate 105.

In the pair of chuck levers 89, the turntable 102 of the lower arm 90 and the chuck plate 104 of the upper arm 91 are opposed to each other. Each of the turntable 102 and the chuck plate 104 is engaged in the center hole 2a of the disc, and respectively have a pair of engage protrusions 102a and 104a which can be engaged with each other. Further, the chuck plate 104 is provided with a substantially circular-ring-like protrusion 104b on the outer circumference of the engage protrusion 104a. The protrusion 104b presses the disc 2 against the energizing force of the plate spring 106.

Since this pickup device 6 is constructed in a structure as described above, a selected disc 2 is rotatably held, sandwiched between the pair of chuck levers 89, and the disc 2 sandwiched between the pair of chuck levers 89 is rotated and driven by the spindle motor 103.

Figure 28:
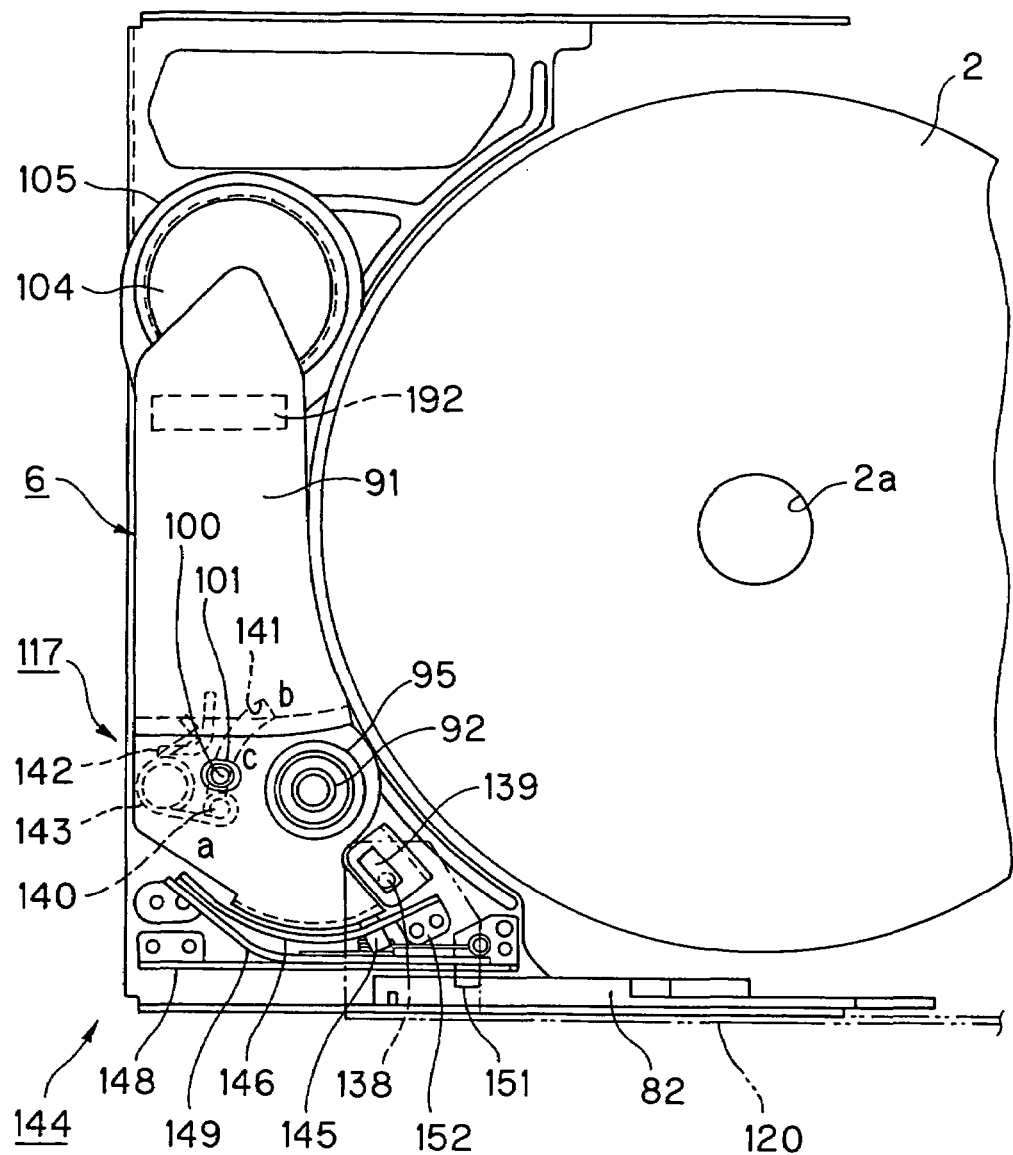
FIG. 28 is a plan view showing a position of the chuck levers in a state of the load/unload mode.
Figure 29:
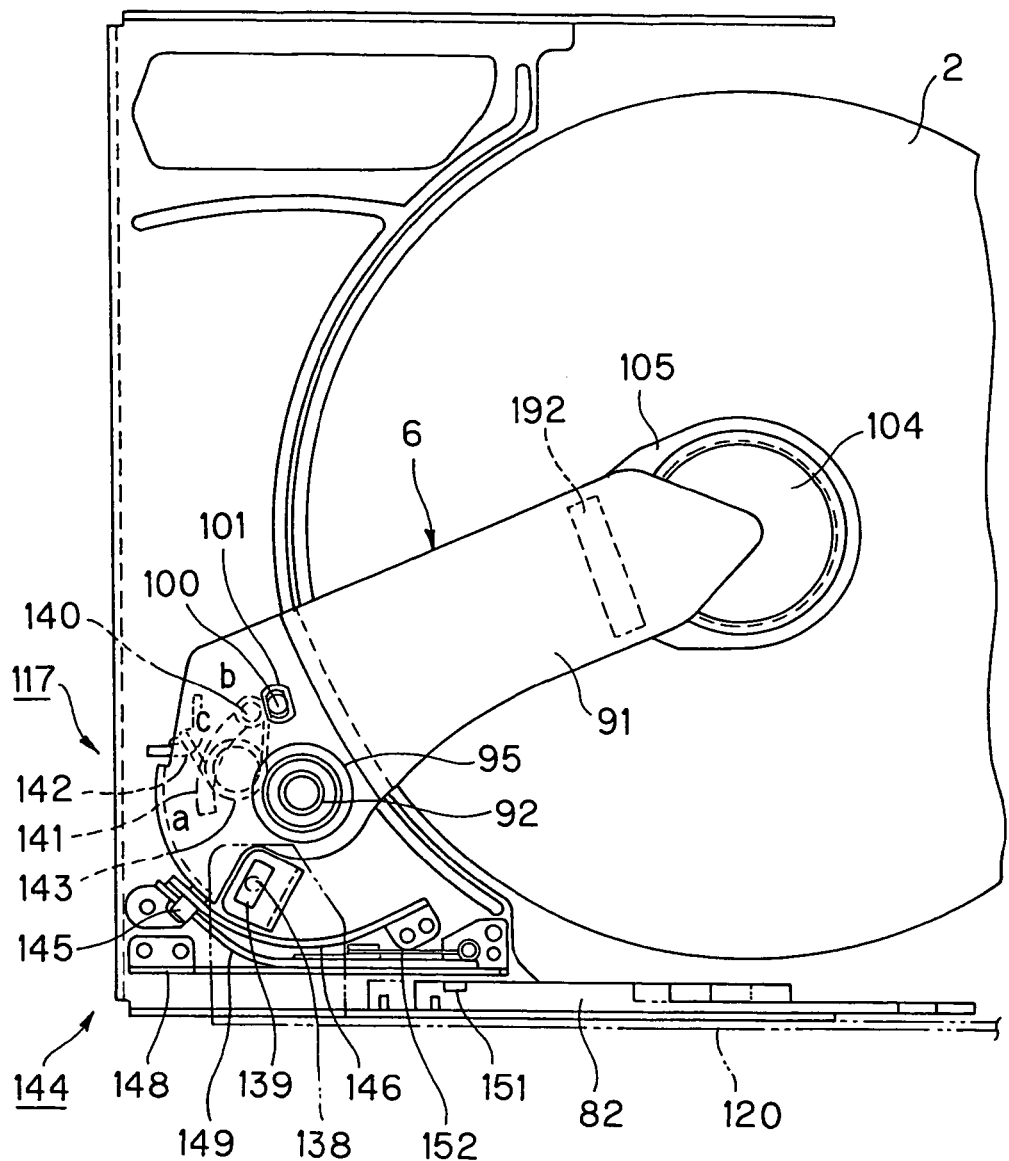
FIG. 29 is a plan view showing a position of the chuck levers in a state of the playback mode.
Figure 30A:
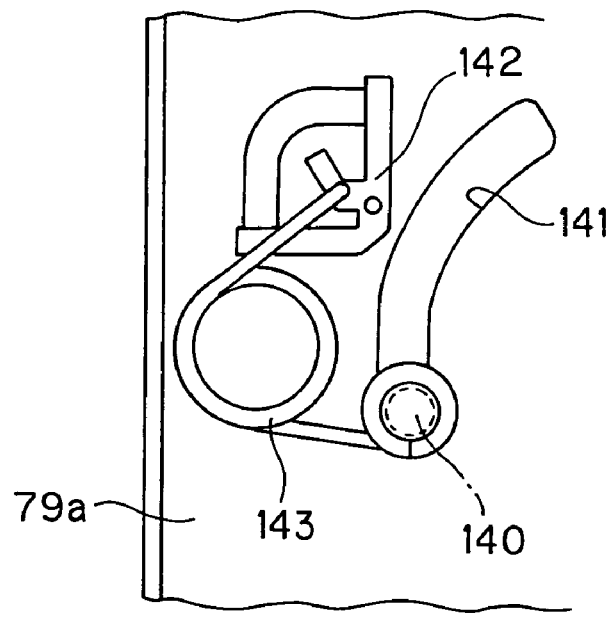
Figure 30B:
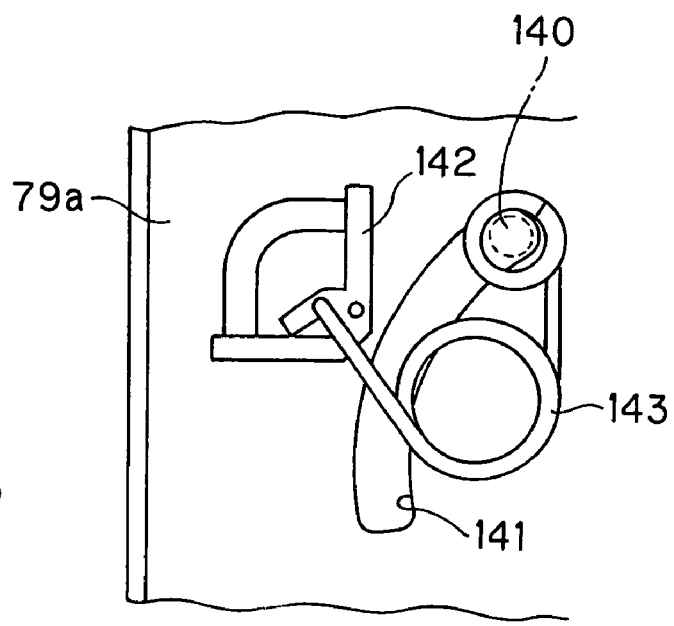

At positions of the pair of chuck levers 89 where these levers contact the disc 2, as shown in FIGS. 28 and 29, a resin layer 192 softer than the disc 2 is formed by printing, to prevent the disc 2 sandwiched between the pair of chuck levers 89 from contacting and damaging the chuck levers 89 due to vibrations of the vehicle or the like.

Also, the pickup device 6 has a pickup unit 108, as shown in FIGS. 21, 24A, 24B, and 25. The pickup unit 108 irradiates a laser beam converged on a signal recording surface of a disc 2 by an objective lens 107, and reads returning light reflected and returning from the signal recording surface, on a surface of the lower arm 90 that faces the upper arm 91, thereby to play back signals.

This pickup unit 108 is movable along a radial direction of the disc 2 by a guide rail 109 integrally molded with the lower arm 90.

More specifically, a drive motor 110 positioned in the side opposite to the turntable 102 of the lower arm 90, a worm gear 111 attached to the spindle of the drive motor 110, a worm wheel 112 toothed with the worm gear 111, a gear 113 pivoted together with the worm wheel 112, a gear 115a attached to the gear 113 and an end of a screw shaft 114 are toothed with each other. The screw shaft 114 is provided in parallel with the guide rail 109, and has another end pivoted by a bearing member 115b. The screw shaft 114 is screwed in a female screw part 116 of the pickup unit 108. The mechanism is arranged such that as the drive motor 110 is driven to rotate, the pickup unit 108 reciprocally moves in the radial direction of the disc 2 along the guide rail 109.

Further, as shown in FIGS. 13, 18, and 19, the pickup device 6 has a rotation mechanism 117 which rotates the pair of chuck levers 89 by the driving force of the drive motor 40 described previously.

More specifically, the rotation mechanism 117 has a gear 118 attached to said another end of the spindle 32 of the drive roller 30 described previously, along the inner surface of the side plate 1b, a series of gears 119a to 119h toothed with the gear 118, and a slide bar 120 toothed with the series of gears 119.

Between the gear 118 and the gear 119a of the series of gears 119, a transmission switch mechanism 121 which switches transmission of the driving force of the drive motor 40 is provided.

More specifically, the transmission switch mechanism 121 has a substantially rectangular slide plate 122 which is movable in the vertical direction, and a connection lever 123 connected to the slide plate 122, as shown in FIGS. 18, 19, 26A, and 26B.

A pair of guide holes 124a and 124b are cut in the slide plate 122 in the vertical direction. On the other side, a guide pin 125 to be inserted in the guide hole 124a of the side plate 122 is protruded from the side plate 1b, and a stopper ring (not shown) is engaged on a top end of the guide pin 125. Also, a spindle 126 of the gear 119b to be inserted in the guide hole 124b of the slide plate 122 is fixed to the side plate 1b.

The spindle 126 of the gear 119b and the spindle 127 of the gear 119a are connected by a connection member 128. A cam hole 129 in which the spindle 127 of the gear 119a is inserted is cut in the slide plate 122, in a predetermined shape. That is, the cam hole 129 cut in the slide plate 122 is formed in the vertical direction and has a bent shape in which an upper end of the hole is positioned in the rear side of a lower end thereof.

The connection lever 123 is rotatably attached to the side plate 1*b* by a fixed shaft 130 at a center part of the connection lever 123. An end of the connection lever 123 is rotatably installed on a lower end of the slide plate 122 by a pin 131. On the other side, another end of the connection lever 123 has a shape which extends to a position where the another end contacts the pins 17*a* in the front side of the disc elevation table 16, which slide inside the vertical slits 19*a* and 19*b* as described previously.

A spring hook 132 is protruded from a lower end of the slide plate 122, positioned in the side opposite to the pin 131 described above. On the other side, a spring hook 133 corresponding to the spring hook 132 is protruded from the bottom plate 1*a*. A coil spring 134 is tensioned between the spring hook 132 of the slide plate 122 and the spring hook 133 of the bottom plate 1*a*, thereby to energize downward the slide plate 122.

In the transmission switch mechanism 121, when the disc elevation table 16*a* moves down to the lowermost position, said another end of the connection lever 123 is pushed down by the pins 17*a* of the disc elevation table 16, and the other end of the connection lever 123 is pushed up, thereby sliding upward the slide plate 122. As a result, the gear 119*a* toothed with the gear 119*b* moves in the arrow direction in FIG. 19, and is toothed with the gear 118.

In the rotation mechanism 117, as shown in FIGS. 19, 26A, 26B, and 27, the slide bar 120 is made of a long plate member. A pair of guide holes 135*a* and 135*b* are longitudinally cut in both ends of the slide bar. On the other side, a pair of guide pins 136*a* and 136*b* to be inserted in the guide holes 135*a* and 135*b* of the slide bar 120 are protruded from the side plate 1*b*. Stopper rings not shown are engaged on top ends of the pair of guide pins 136*a* and 136*b*. A rack gear 137 to be toothed with the gear 119*h* is formed at an end of the slide bar 120. Therefore, the slide bar 120 slides forward and backward in the arrow direction in FIG. 27, as the gear 119*h* rotates.

Figure 25:
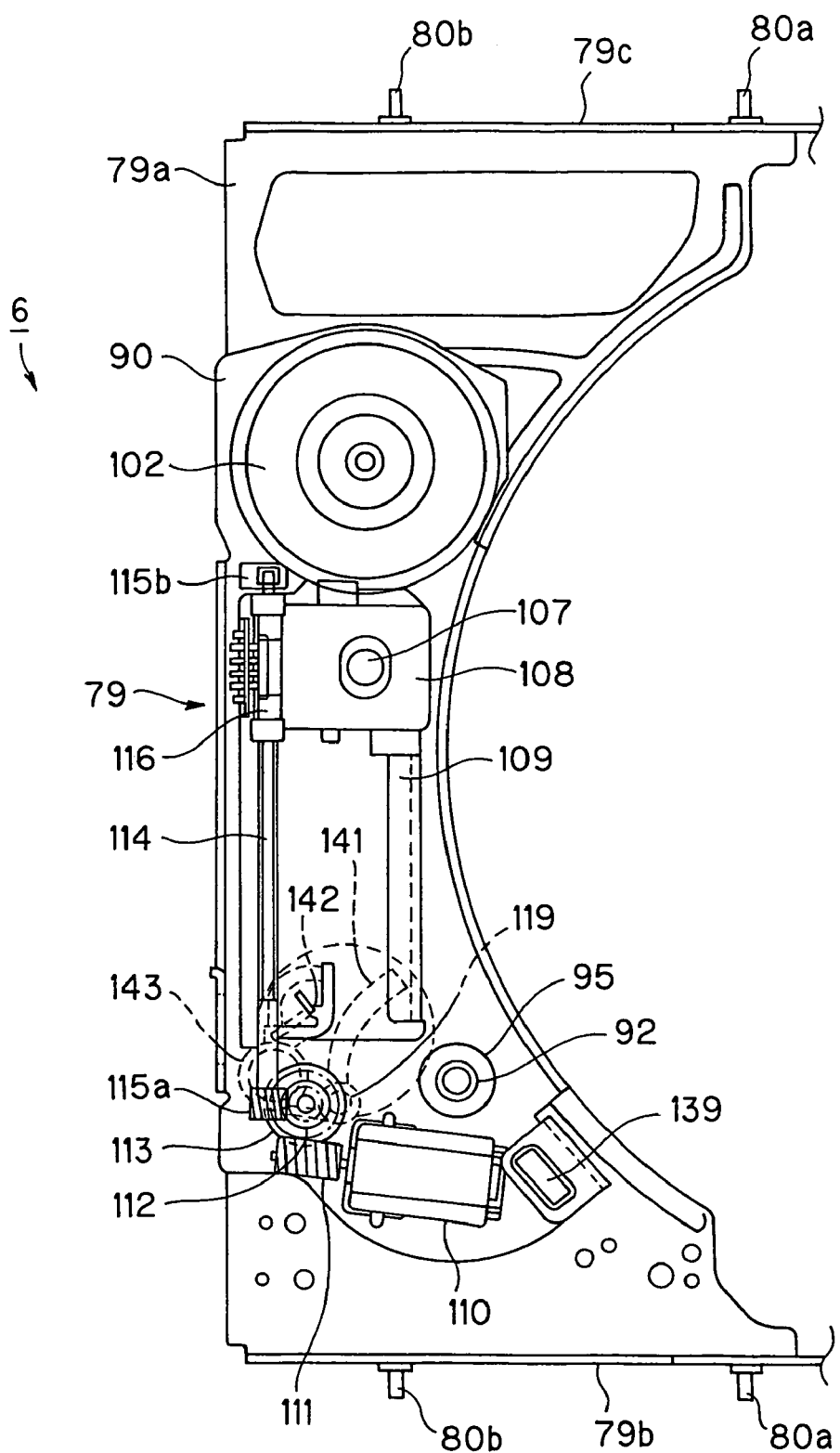
FIG. 25 is a plan view showing the structure of a main part of the pickup device.
Figure 26A:
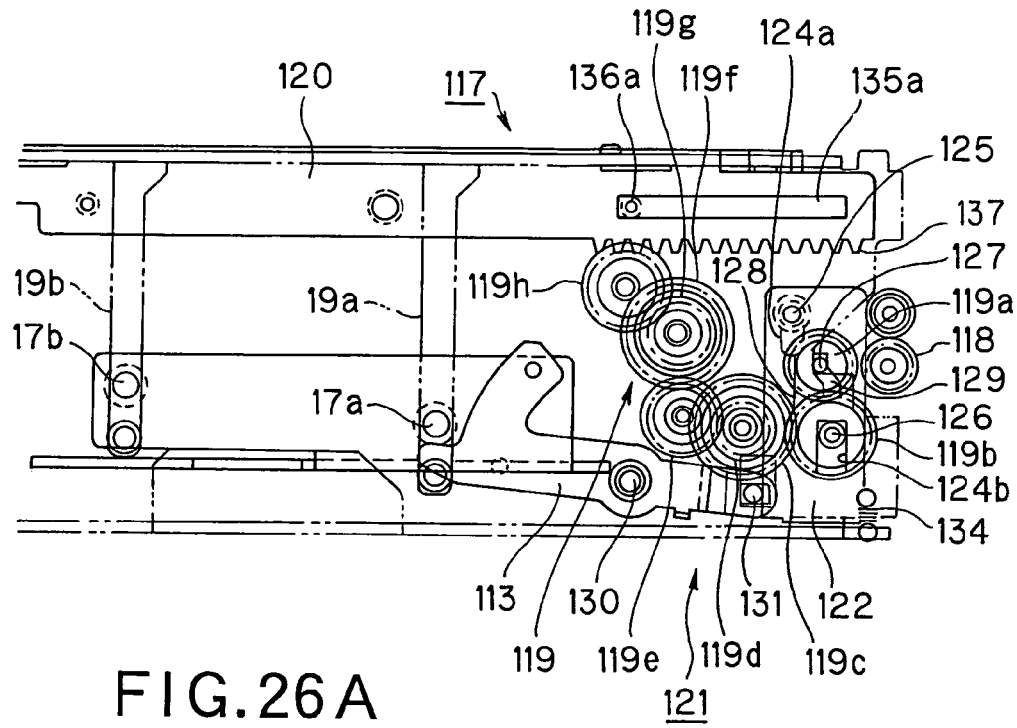
Figure 26B:
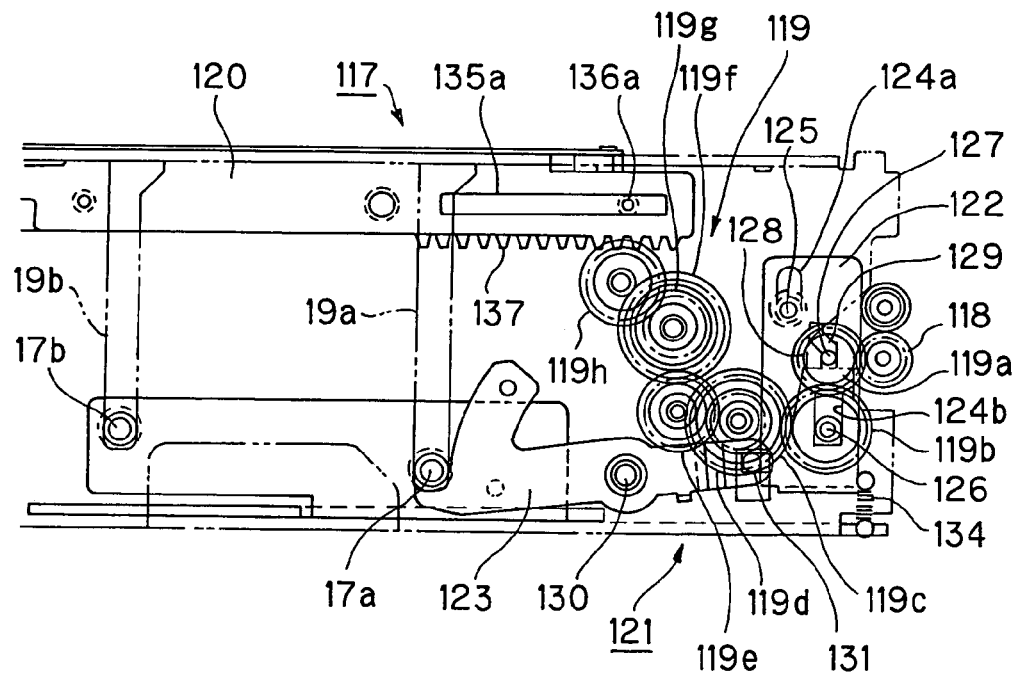
Figure 27:
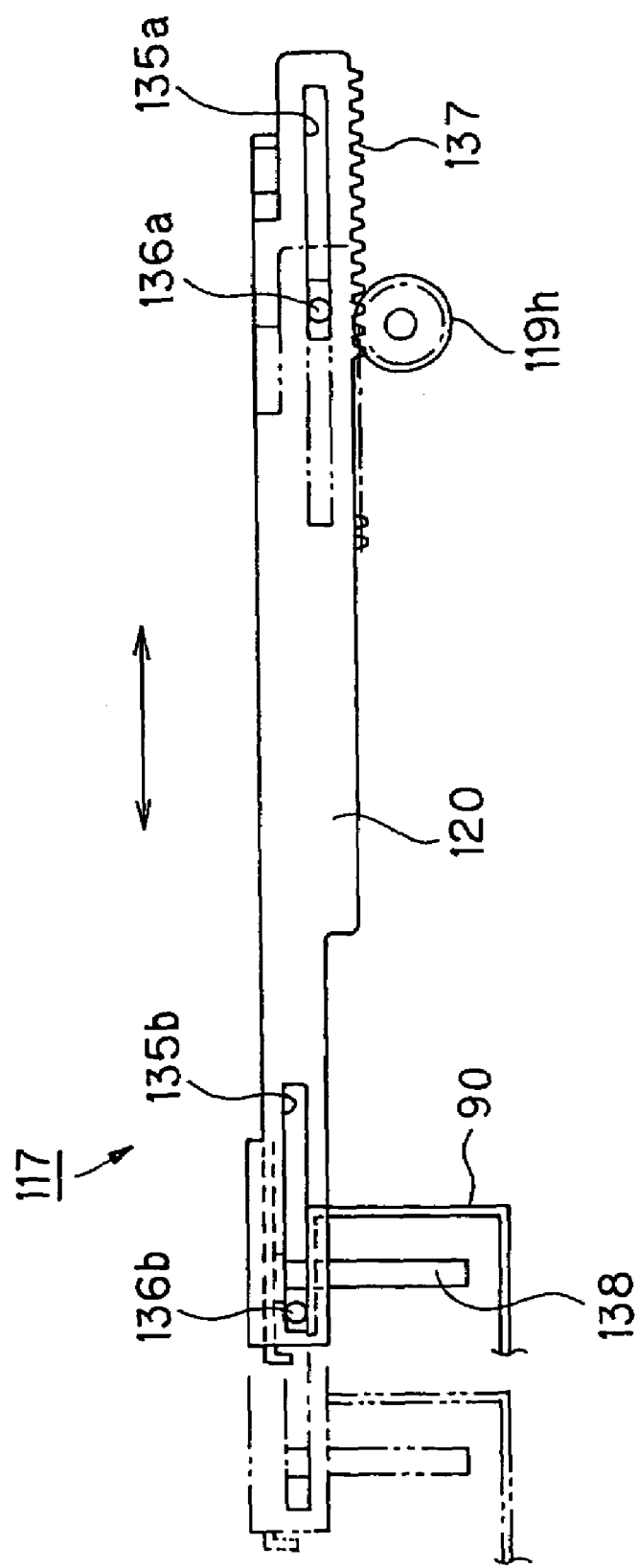
FIG. 27 is a side view showing the structure of a slide bar.

Meanwhile, as shown in FIGS. 13, 19, and 27, another end of the slide bar 120 has a bent part which is bent insides. A pin 138 is protruded downward from the bent part. On the other side, a base end of the lower arm 90 described previously has a horizontal part formed to extend to a height substantially integral to the upper arm 91 as shown in FIGS. 21 and 25. A long hole 139 is protruded from the horizontal part toward the hollow shaft 92 described previously. Further, the pin 138 of the slide bar 120 is engaged, with play, in the long hole 139 of the lower arm 90.

In this rotation mechanism 117, as shown in FIGS. 28 and 29, the slide bar 120 slides forward and backward, thereby to rotate the pair of chuck levers 89 in a radial direction of the disc 2.

FIG. 28 shows the pair of chuck levers 89 at a position in a so-called load/unload mode in which a disc 2 is loaded/unloaded. FIG. 29 shows the pair of chuck levers 89 at another position in a so-called playback mode in which a selected disc 2 is played back.

Also, in the rotation mechanism 117, as shown in FIGS. 28, 29, 30A, and 30B, a positioning pin 140 is protruded downward and positioned near the hollow shaft 92 of the lower arm 90. On the other side, a substantially arc-like guide hole 141 in which the positioning pin 140 is inserted is protruded from the horizontal plate 79*a* of the pickup elevation table 79. Further, a spring hook 142 is provided on the pickup elevation table 79, positioned at an intermediate position of the guide hole 141. A twist coil spring 143 is tensioned between the spring hook 142 and the positioning pin 140.

In the rotation mechanism 117, the positioning pin 140 of the lower arm slides in the guide hole as the pair of chuck levers 89 rotate. More specifically, as shown in FIGS. 28 and 29A, the positioning pin 140 is positioned at an end a of the guide hole 141, when the pair of chuck levers 89 are at the position of the load/unload mode. Otherwise, when the pair of chuck levers 89 are at the position of the playback mode, the positioning pin 140 is positioned at an other end b of the guide hole 141. When the positioning pin 140 passes an intermediate position c of the guide hole 141, the twist coil spring 143 turns into a expansion state from a compression state. The positioning pin 140 then swiftly slides from the intermediate position toward an end in the guide hole 141, by the energizing force of the twist coil spring 143.

Since the rotation mechanism 117 is constructed in the structure as described above, positioning of the center hole 2*a* of a selected disc 2 and the turntable 102 of the lower arm 90 can be performed with high accuracy.

Further, as shown in FIGS. 21, 28, and 29, the pickup device 6 has a hold switch mechanism 144 which switches holding of a selected disc 2 by the pair of chuck levers 89. That is, the hold switch mechanism 144 sets timing of moving up and down of the upper arm 91 in relation to the lower arm 90 when the pair of chuck levers 89 rotate.

More specifically, a guide pin 145 is protruded from the base end of the upper arm 91 toward the separation cam 82. On the other side, a cylindrical plate 146 having a substantially partial cylindrical shape which forms an arc about the hollow shaft 92 as the center is provided and stands on the horizontal plate 79*a* of the pickup elevation table 79, positioned between the pair of chuck levers 89 and the separation cams 82. Further, a guide hole 147 in which the guide pin 145 of the upper arm 91 is inserted is protruded from the cylindrical plate 146.

The guide hole 147 has a substantial L-shape consisting of a horizontal part 147*a* which allows the upper arm 91 to be movable horizontally, and a vertical part 147*b* which allows the upper arm 91 to be movable vertically. On the other side, the guide pin 145 protrudes from the guide hole 147 of the cylindrical plate 146 toward the separation cams 82. The guide pin 145 of the upper arm 91 is inserted in the guide hole 147, thereby to energize downward the upper arm 91 by a coil spring 96 inserted in the outer circumferential groove 95*a* of the sleeve 95 described previously.

A bearing plate 148 substantially parallel to the separation cams 82 is provided and stands on the horizontal plate 79*a* of the pickup elevation table 79, positioned between the cylindrical plate 146 and the separation cams 82. Further, a constraint lever 149 is rotatably attached to the surface of the bearing plate 148 that faces the cylindrical plate 146 of the bearing plate 148.

The constraint lever 149 is bent from the separation cams 82 toward the cylindrical plate 146, and an end in the side of the cylindrical plate 146 is made of a long plate member exposed to the vertical part 147*b* of the guide hole 147 as described above. The constraint lever 149 is pivoted at an intermediate position thereof by a fixed shaft 150, and a pin 151 is protruded toward a separation cams 82 from an end in the side of the separation cam 82. A coil spring 152 which energizes downward an end of the constraint lever 149 in the side of the separation cam 82 is attached to the fixed shaft 150.

On the other side, as shown in FIG. 22B, a cam groove 153 having a predetermined shape in which the guide pin 151 is engaged, with play, is formed on a surface of the separation cams 82 that faces the guide pin 151. The cam groove 153 is formed longitudinally and has a shape in which an end of an inner upper end surface in the rear side widens upward, the end being slidably contacted by the guide pin 151.

With reference to FIGS. 22 and 31, a description will now be made of an operation in which the separation cams 82 holding a selected tray 7 forms spaces above and below the selected tray 7, and an operation in which the pair of chuck levers 89 sandwiches a selected disc 2 set on the selected tray 7 by the hold switch mechanism 144.

Six trays 7 stacked in the disc container part 3 are denoted at numbers 1 to 6 in the order from the top, and it is supposed that the second tray 7 from the top is a selected tray 7. Each pair of pins 10a and 10b are pushed up together along the inclined surfaces 82a and 82b of the separation cams 82 by one identical operation. Therefore, the description will be made of only the operation in which the pins 10b in the rear side is pushed up along the inclined surfaces 82b in the rear side of the separation cams 87 and 88.

At first, at the position A in FIG. 22A, the height of the separation cams 82 is set in advance such that lower ends of the inclined surfaces 82b are positioned between the second selected tray 7 and the third tray 7 among the six trays 7 stacked in the disc container part 3. Further, the separation cams 82 slide forward and moves to the position B in FIG. 22A. Positioning of the separation cams 82 in the height direction is achieved by elevation operation of the pickup elevation table 79 as will be described later.

Next, as the separation cams 82 moves to the position C in FIG. 22A, the pins 10b of the second selected tray 7 are pushed up to the slits 88 of the separation cams 82 along the inclined surfaces 82b. In addition, the pins 10b of the third tray 7 slide along the lower surfaces of the separation cams 82. In this manner, the first tray 7 and the second selected tray 7 rise, and a space is formed between the second selected tray 7 and the third tray 7.

Next, as the separation cams 82 move to the position D in FIG. 22A, the pins 10b of the second selected tray 7 slide inside the first engage/insert parts 88a of slits 88, and the pins 10b of the first tray 7 are pushed up to upper surfaces 82d of the separation cams 82 along the inclined surfaces 82a positioned above the slits 88. In this manner, a space is formed between the first tray 7 and the selected tray 7, spaces large enough to allow the pair of chuck levers 89 to enter are formed above and below the selected tray 7.

Next, as the separation cams 82 move to the position E in FIG. 22A, the pins 10b of the first tray 7 slide along the upper surfaces 82d of the separation cams 82, and the pins 10b of the second selected tray 7 slide inside second engage/insert parts 88b of the slits 88. In this manner, the second selected tray 7 held by the pair of separation cams 82 drops, and the selected disc 2 is set on the turntable 102 of the lower arm 90.

Next, as the separation cams 82 move to the position F in FIG. 22A, the pins 10b of the second tray 7 slide inside third engage/insert parts 88c of the slits 88. In this manner, the second selected tray 7 held by the pair of separation cams 82 further drops, thereby to separate the selected tray 7 from the selected disc 2 set on the turntable 102.

Note that the operation described above can be reversed as the separation cams 82 slide backward.

Figure 31A:
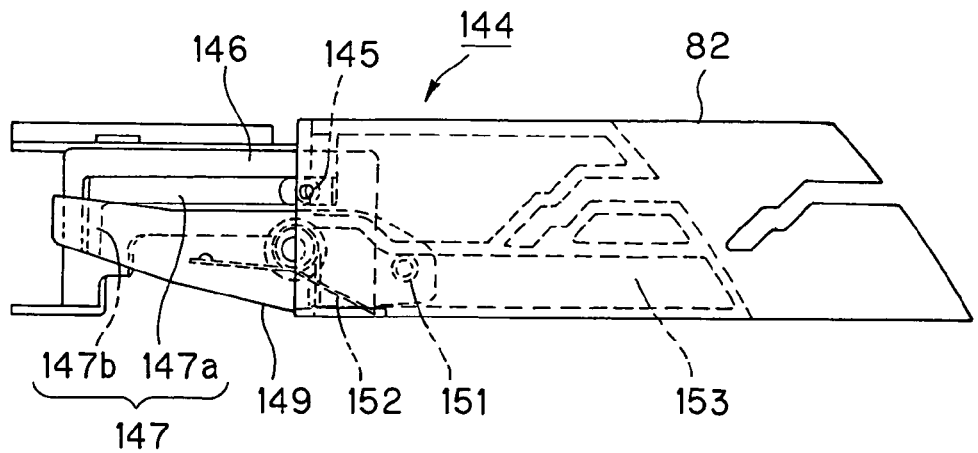
Figure 31B:
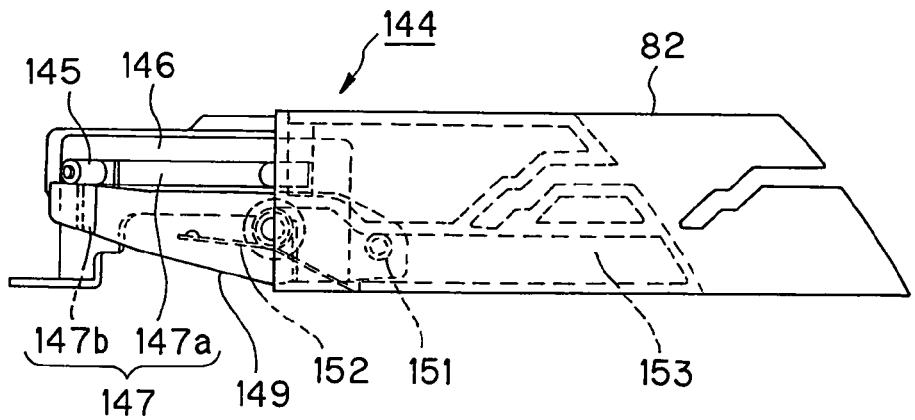

Meanwhile, in the hold switch mechanism 144, the guide pin 151 of the constraint lever 149 slides in the cam groove 153 of a separation cam 82 between the positions A and D in FIG. 22B, in accordance with forward and backward motion of the separation cams 82. Simultaneously, as shown in FIGS. 31A and 31B, the guide pin 145 of the upper arm 91 slides in the horizontal part 147 of the guide hole 147 cut in the cylindrical plate 146. At this time, between the turntable 102 of the lower arm 90 and the chuck plate 104 of the upper arm 91, a space large enough to allow the selected tray 7 to pass is formed.

Figure 31C:
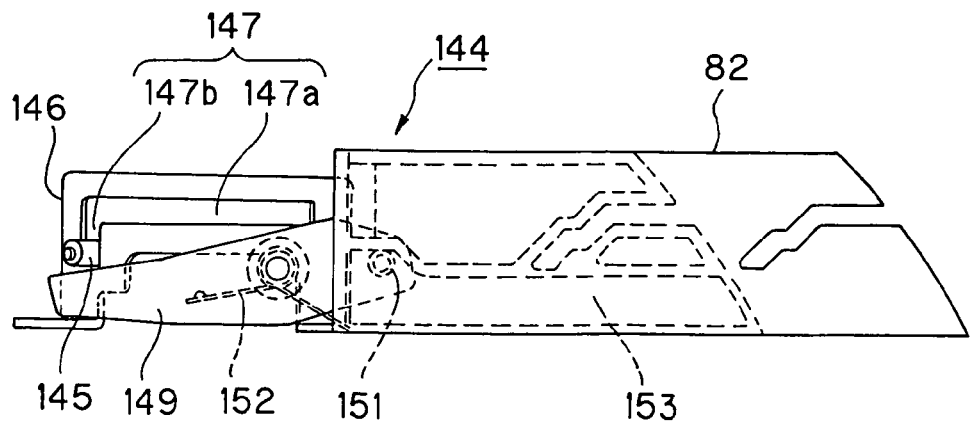

Further, in the hold switch mechanism 144, when the guide pin 151 of the constraint lever 149 slides between the positions D and F shown in FIG. 22B in the cam groove 153 of the separation cam 82, the guide pin 145 of the upper arm 91 slides in the vertical part 147b of the guide hole 147 cut in the cylindrical plate 146, as shown in FIG. 31C. Simultaneously, the guide pin 145 of the upper arm 91 pushes down an end of the constraint lever 149 in the side of the cylindrical plate 146, by the energizing force of the coil spring 96 engaged in the outer circumferential groove 95a of the sleeve 95, against the energizing force of the twist coil spring 152. As a result, the upper arm 91 drops in relation to the lower arm 90, and the center hole 2a of the selected disc 2 is sandwiched between the turntable 102 of the lower arm 90 and the chuck plate 104 of the upper arm 91.

Figure 32A:
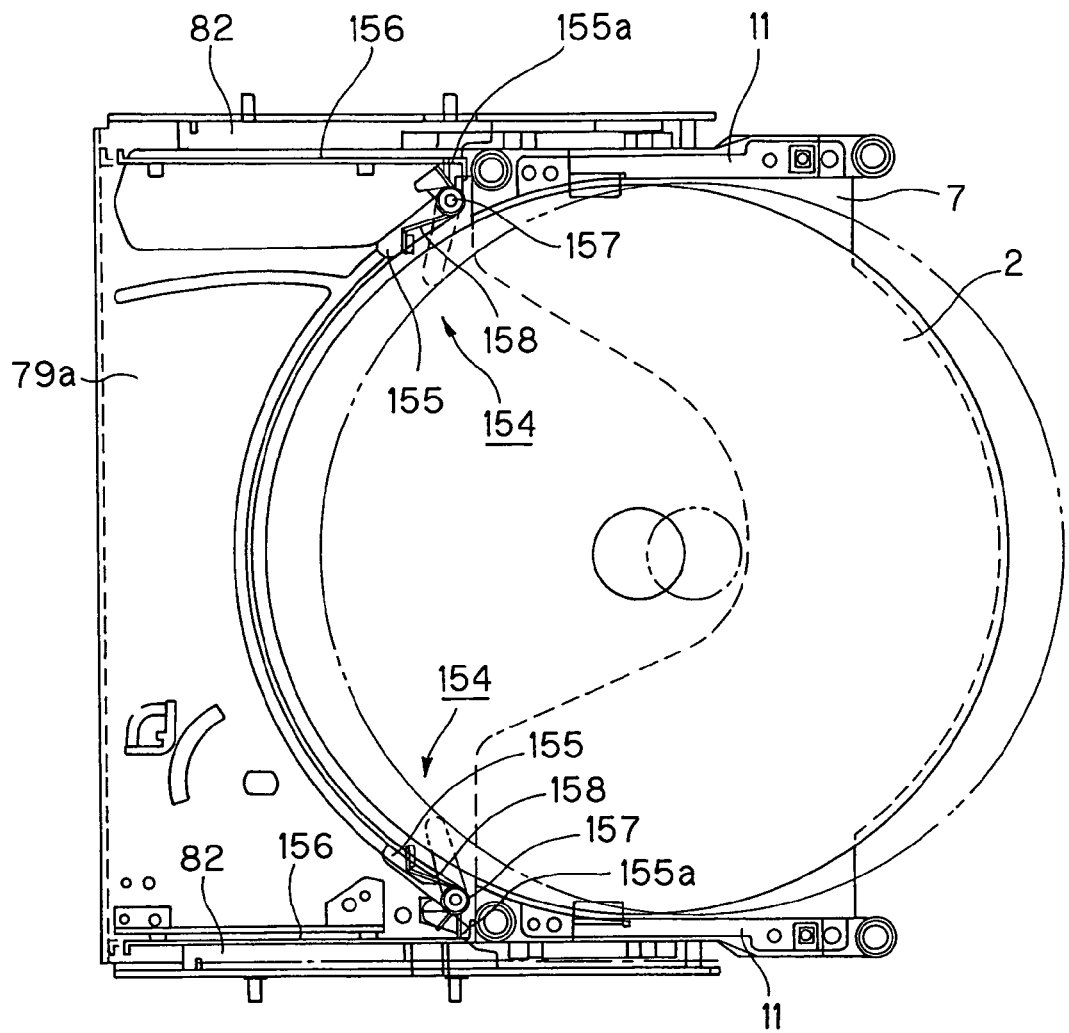
FIG. 32A is a plan view showing the structure of a disc push-out mechanism and FIG. 32B is a side view showing the structure of the disc push-out mechanism.
Figure 32B:
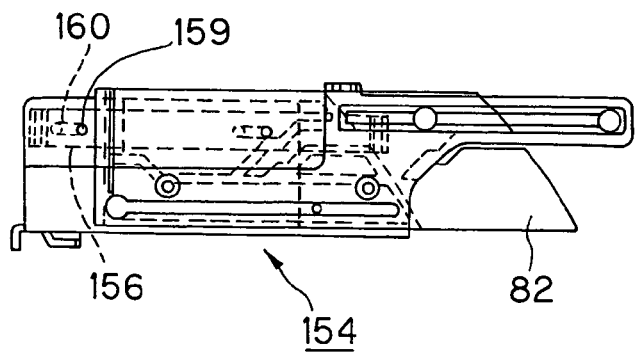

Meanwhile, the disc loader/unloader 5 described above, as shown in FIGS. 21, 32A, and 32B, has a disc push-out mechanism 154 which pushes out a disc 2 by a predetermined amount toward the disc load/unload slot 4 when unloading a disc 2 contained in the disc container part 3 described above from the disc load/unload slot 4.

More specifically, the disc push-out mechanism 154 has a pair of push-out levers 155 which are positioned near both ends in the rear side of the disc 2 set on a tray 7 and are rotatable in a in-plane direction of the disc 2, and a pair of push-out plates 156 which are positioned on a surface of the bearing plate 148 that faces separation cams 82 and rotates the pair of push-out levers 155 to the forward side when the separation cams 82 move to the rear side.

The pair of push-out levers 155 are pivoted by a fixed shaft 157 standing downward from the top plate 1e such that the levers 155 have a height substantially equal to that of the disc load/unload slot 4 described previously. A twist coil spring 158 which energizes top ends of the pair of push-out levers 155 to the rear side is attached to the fixed shaft 157. Engage parts 155a to be engaged with the push-out plates 156 are formed at base ends of the pair of push-out levers 155.

Meanwhile, the pair of push-out plates 156 each are made of a long plate member, and have first bent parts 156a bent insides at ends thereof in the front side, and second bent parts 156b bent outsides at ends thereof in the rear side. The push-out plates 156 are movable in the forward and backward directions. A pair of guide pins 159 are protruded from surfaces thereof facing the bearing plate 148 while a pair of guide holes 160 in which the pair of guide pins 159 are inserted are cut in the bearing plate 148.

In the disc push-out mechanism 154, the engage parts 155a of the push-out levers 155 are engaged with the first bent parts 156a of the push-out plates 156. As the separation cams 82 move backward, the separation cams 82 press the second bent parts 156b of the push-out plates 156, thereby sliding the push-out plates 156. Then, the first bent parts 156a of the push-out plates 156 press the engage parts 155a of the push-out levers 155, thereby rotating top ends of the push-out levers 155 toward the front side against the energizing force of the twist coil spring 158. As a result, the pair of push-out levers 155 push out the disc 2 by a predetermined amount to the side of the disc load/unload slot 4.

As shown in FIGS. 3, 13, 33A, and 33B, the device body 1 has an operation device 161 which moves up and down the pickup elevation table 79 and moves the pair of separation cams 82 in the forward and backward directions.

The operation device 161 has pairs of inner slider 162 and outer sliders 163, which are positioned outside the pair of side plates 1b and 1c and movable in the forward and backward directions.

Figure 33A:
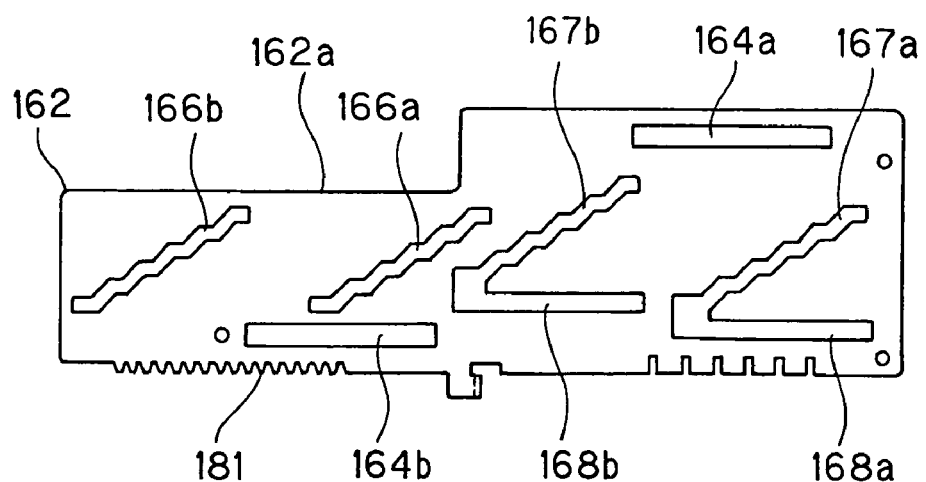
FIG. 33A is a plan view showing the structure of inner sliders and FIG. 33B is a plan view showing the structure of outer sliders.

Of these sliders, as shown in FIGS. 3 13, and 33A, the inner sliders 162 are made of substantially rectangular plate members corresponding the side plates 1b and 1c and are provided between the side plates 1b and 1c and the outer sliders 163, respectively.

In each of the inner sliders 162, a pair of guide holes 164a and 164b are longitudinally cut in and positioned at an upper end in the front side and at a lower end in the rear side. On the other side, guide pins 165a and 165b to be inserted in the guide holes 164a and 164b of the inner sliders 163 are protruded from the side plates 1b and 1c.

Also, a pair of first slits 166a and 166b in which the pair of pins 80a and 80b provided in each of two sides of the pickup elevation table 79 are inserted are cut in each of the inner sliders 162. The first slits 166a and 166b each have a step-like shape whose front end is positioned above a rear end thereof, in order to move the pickup elevation table 79 up and down through six steps.

In addition, a pair of second slits 167a and 167b in which the pairs of pins 17a and 17b provided in each of two sides of the disc elevation table 16 described previously are inserted are cut in each of the inner sliders 162. The second slits 167a and 167b each have a step-like shape whose front end is positioned above a rear end thereof, in order to move the disc elevation table 16 up and down through six steps.

Further, third slits 168a and 168b are cut in each of the inner sliders 162 and extended forward continuously from rear ends of the second slits 167a and 167b, in order to move up and down only the pickup elevation table 16 in the playback mode.

Figure 33B:
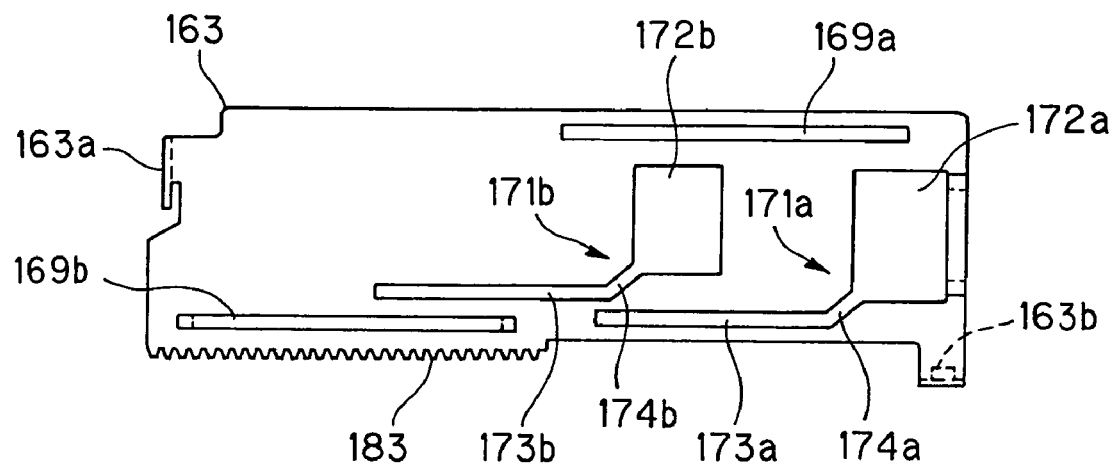

On the other side, as shown in FIGS. 3, 13, and 33B, the outer sliders 163 are made of substantially rectangular plate members corresponding to the inner sliders 162 and are provided outside the inner sliders 162, respectively.

A pair of guide holes 169a and 169b in which the guide pins 165a and 165b of the side plates 1b and 1c are inserted are protruded longitudinally from each of the outer sliders 163, positioned at an upper end thereof in the front side and a lower end thereof in the rear side. Therefore, the pairs of guide pins 165a and 165b are inserted in the pairs of guide holes 164a and 164b of the inner sliders 162 and in the pairs of guide holes 169a and 169b of the outer sliders 162. Stopper rings 170a and 170b are respectively engaged on top ends of the guide pins 165a and 165b.

Further, a pair of slits 171a and 171b in which a pair of pins 17a and 17b provided in each of two sides of the disc elevation table 16 are inserted are protruded from each of the outer sliders 163. Each pair of slits 171a and 171b are constituted by continuously forming first slits 172a and 172b for sliding the pair of pins 17a and 17b inside the second slits 167a and 167b of the inner sliders 162 in the load/unload mode, second slits 173a and 173b for sliding the pair of pins 17a and 17b inside the third slits 168a and 168b of the inner sliders 162 in the playback mode, and third slits 174a and 174b for switching the modes between the first slits 172a and 172b and the second slits 173a and 173b.

Of these slits, the first slits 172a and 172b each are cut in a substantially rectangular shape, and the second slits 173a and 173b each are cut longitudinally. The third slits 174a and 174b are connected to rear lower ends of the first slits 172a and 172b and front ends of the second slits 173a and 173b, and are cut at an angle of about 45°.

The outer sliders 163 have first bent parts 163a bent inside and positioned at rear ends. Corresponding to these first bent parts 163a, notches 162a as shown in FIGS. 13 and 33A are provided longitudinally and relief holes 175 as shown in FIG. 13 are cut in the side plates 1b and 1c in the inner sliders 162. Further, the first bent parts 163a of the outer sliders 163 are engaged in engage grooves 176 formed vertically in the pair of separation cams 82. As a result, the separation cams 82 are capable of moving in forward, backward, and vertical directions as the outer sliders 163 move forward and backward.

The outer sliders 163 have second bent parts 163b which are positioned at front lower ends, as shown in FIGS. 13 and 33B and bent inside. The second bent parts 163b of the outer sliders 163 are engaged with the bent part 78 of the longitudinal slide plate 72 described previously. Further, as the outer sliders 163 slide to the rear side, the second bent parts 163b of the outer sliders 163 press the bent parts 78 of the longitudinal slide plate 72 to the rear side, thereby pushing up the shutter 60 through the connection lever 73. As a result of this the shutter mechanism 59 described previously opens the disc load/unload slot 4.

The operation device 161 has a slider drive mechanism 177 which slides forward and backward the inner sliders 162 and the outer sliders 163, as shown in FIGS. 13, 19, 33A, and 33B.

More specifically, the slider drive mechanism 177 has a first connection shaft 178 which is positioned below the bottom plate 1a and connects the pair of inner sliders 162, and a second connection shaft 179 which is positioned in the front side of the first connection shaft 178 and connects the outer sliders 163.

The first connection shaft 178 is axially supported to be rotatable by a bearing (not shown). A pair of pinion gears 180 are attached to two ends of this shaft 178. On the other side, as shown in FIGS. 13 and 33A, rack gears 181 to be toothed with the pinion gears 180 are formed at rear lower ends of the inner sliders 162.

Similarly, the first connection shaft 178 is axially supported to be rotatable by a bearing (not shown). A pair of pinion gears 180 are attached to two ends of this shaft 178. On the other side, as shown in FIGS. 13 and 33A, rack gears 181 to be toothed with the pinion gears 180 are formed at rear lower ends of the inner sliders 162.

Similarly, the second connection shaft 179 is axially supported to be rotatable by a bearing (not shown). A pair of pinion gears 182 are attached to two ends of this shaft 179. On the other side, as shown in FIGS. 13 and 33B, rack gears 183 to be toothed with the pinion gears 182 are formed at rear lower ends of the outer sliders 163.

The first connection shaft 178 and the second connection shaft 179 are provided with gears 184 and 185, respectively, at predetermined positions in their lengthwise directions. These gears 184 and 185 are respectively toothed with worm gears 190 and 191 attached to spindles of the drive motors 188 and 189 through the series of gears 186 and the series of gears 187 axially supported by the bearing plate 148 described above.

Since the slider drive mechanism 177 is constructed in a structure as described above, the inner sliders 162 and the outer sliders 163 can be independently slid forward and backward by driving the drive motors 188 and 189 to rotate.

Next, a description will be made of an operation of the entire disc changer constructed as described above.

The disc changer has a load/unload mode in which a disc 2 is inserted into the disc container part 3 or a disc 2 is ejected from the disc container part 3, and a playback mode in which any one (selected disc 2) of discs 2 is selected from the discs 2 contained in the disc container part 3 and played back.

Figure 34:
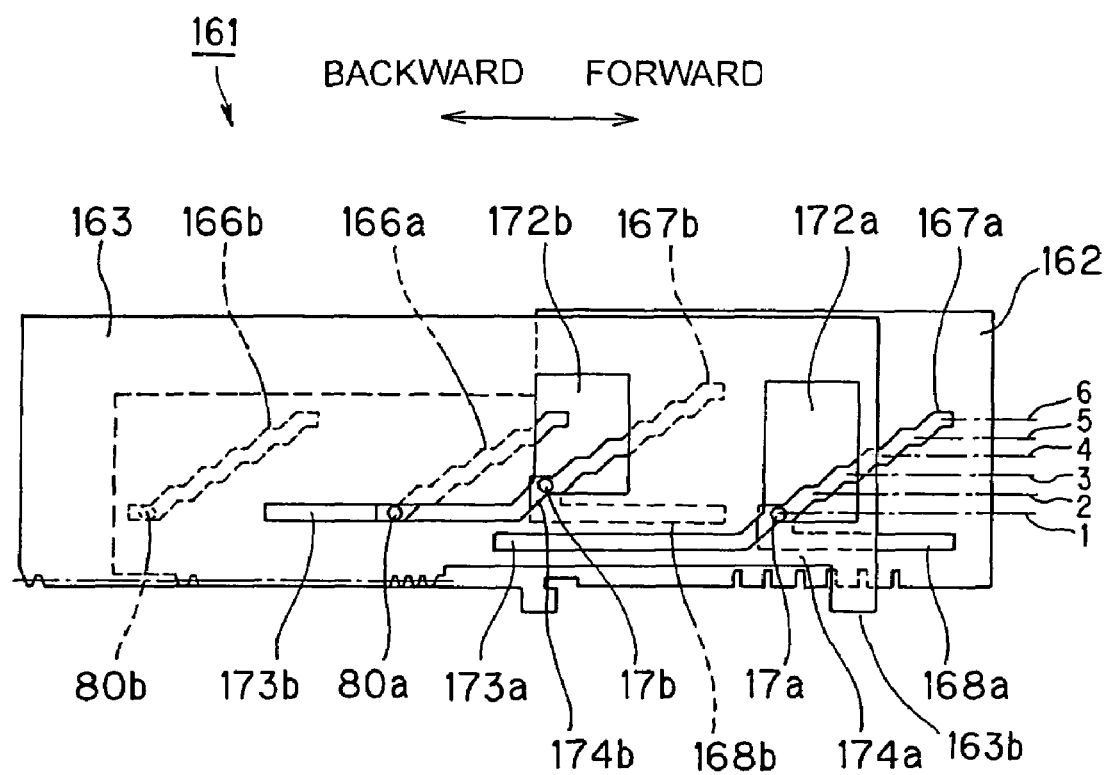
FIG. 34 is a side view showing a mode switching position of the operation device in the load/unload mode.

In the load/unload mode, for example, as shown in FIG. 34, operation is set such that the operation device 161 as described above makes the inner sliders 162 and the outer sliders 163 slide in the forward and backward directions, thereby making pairs of pins 17a and 17b of the disc elevation table 16 slide inside the second slits 167a and 167b of the inner sliders 162 and inside the first slits 172a and 172b of the outer sliders 163. FIG. 27 shows mode switch positions of a pair of pins 17a and 17b in the load/unload mode.

In this load/unload mode, when a disc 2 is inserted into the disc container part 3 (for example, a disc 2 is inserted into the second tray 7), for example, a button "2" is pressed among operation buttons on an operation panel not shown but provided on the front surface of the housing, and thereafter, a button "insertion" is pressed.

Figure 35:
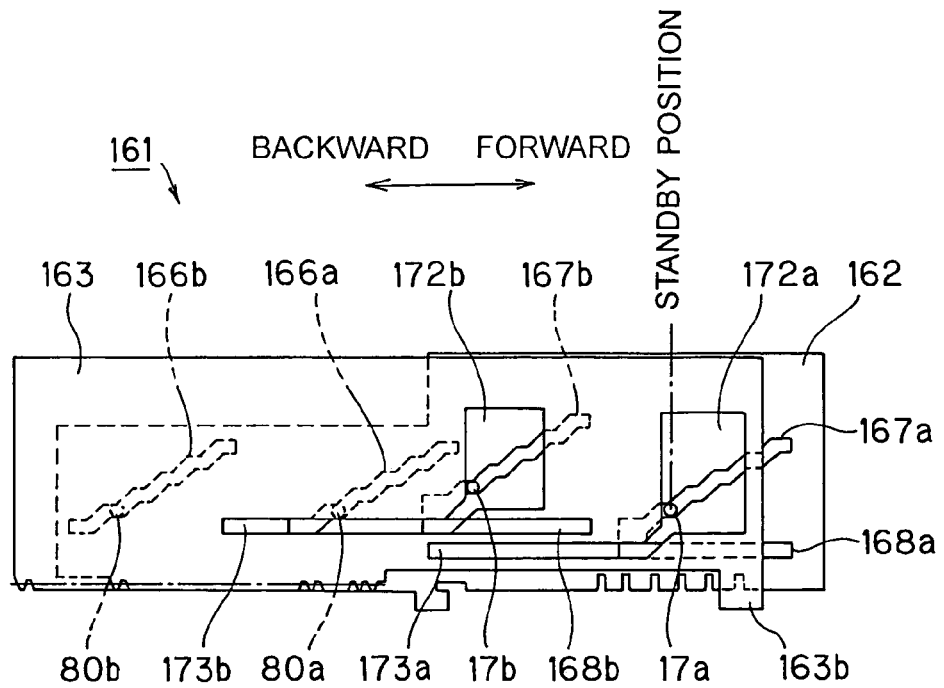
FIG. 35 is a side view showing a standby position of the operation device in case of loading/unloading a second disc.

In this case, at first, as shown in FIG. 35, the inner sliders 162 move backward, thereby pushing up each pair of pins 17a and 17b to the second step position from the bottom in the second slits 167a and 167b. Accordingly, the disc elevation table 16 moves up and the second tray 7 is set to a height substantially corresponding to the disc load/unload slot 4.

Thus, in the load/unload mode, only the inner sliders 162 are slid in the forward and backward directions, with each pair of pins 17a and 17b of the disc elevation table 16 inserted in the second slits 167a and 167b of the inner sliders 162 and in the first slits 172a and 172b of the outer sliders 163. As a result, any arbitrary tray 7 among the six trays 7 stacked on the disc elevation table 16 can be set to a height substantially corresponding to the disc load/unload slot 4.

In this operation, the pickup elevation table 79 is moved up and down together with the disc elevation table 16. This does not cause influences on the load/unload mode.

Figure 36:
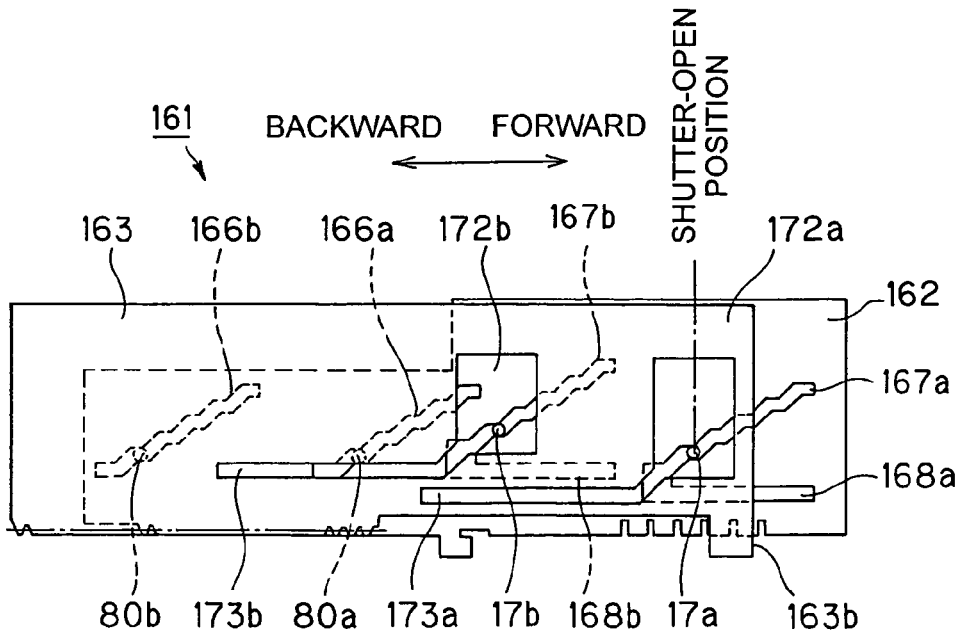
FIG. 36 is a side view showing a shutter open position of the operation device in case of loading/unloading a second disc.

Next, as shown in FIG. 36, the outer sliders 163 move back until each pair of pins 17a and 17b reach the middles of the first slits 172a and 172b. Accordingly, the second bent parts 163b of the outer sliders 163 pushes the bent part 78 of the longitudinal slide plate 72 shown in FIG. 13 to the rear side, thereby pushing up the shutter 60 by the connection lever 73. As a result of this, the disc load/unload slot 4 is opened.

Figure 37A:
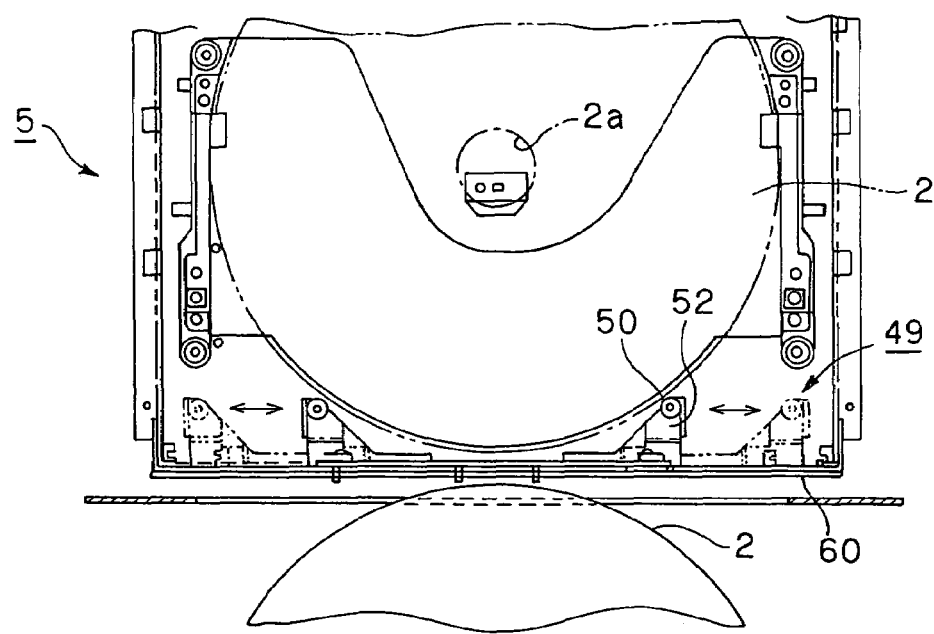
Figure 37B:
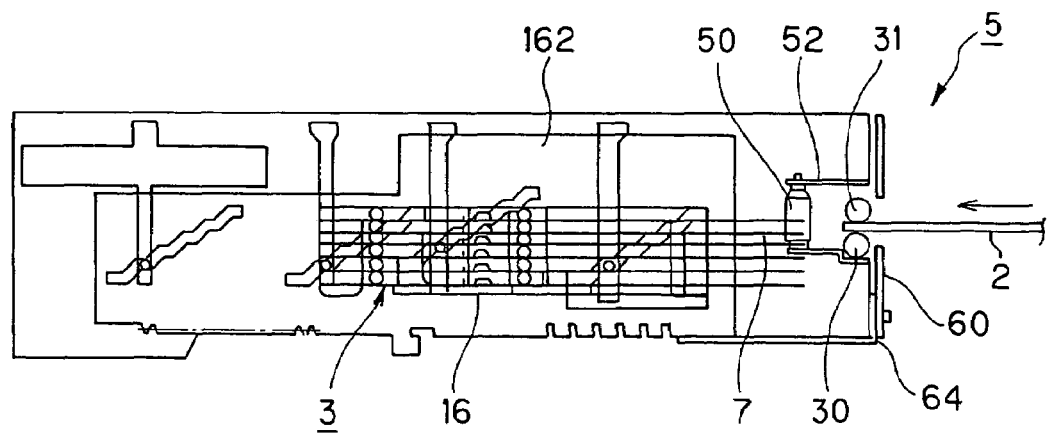

Next, as shown in FIGS. 37A and 37B, a disc 2 is inserted through the opened disc load/unload slot 4. Then, a sensor not shown but provided at a center in front of the shutter 60 senses the entering disc 2, and the drive roller 30 is driven to rotate in the insertion direction by the drive motor 40 of the disc loader/unloader 5 as described above. As a result of this, the disc 2 sandwiched between the pair of drive roller 30 and slave roller 31 is inserted into the disc container part 3.

The disc 2 inserted from the disc load/unload slot 4 is pushed more deeply by a predetermined amount (several millimeters) by the disc push-in mechanism 49 also described previously, from the position to which the disc can be pushed by the pair of drive roller 30 and slave roller 31. Accordingly, the disc 2 is set on the second tray 7 and is held on the tray 7 by the press piece 11a of the plate spring 11.

As the disc 2 moves apart from the pair of drive roller 30 and slave roller 31, a limit switch (not shown) works to stop rotation drive of the drive roller 30, and the outer sliders 163 move forward, thereby returning the each pair of pins 17a and 17b to a standby position shown in FIG. 35. As a result, the bent part 78 of the longitudinal slide plate 72 moves forward together with the second bent parts 163b of the outer sliders 163, and pushes down the shutter 60 by the connection lever 73. As a result, the disc load/unload slot 4 is closed.

Thus, a disc 2 is loaded onto the second tray 7. Any arbitrary disc 2 can be loaded into any other tray 7 than the second tray 7.

Meanwhile, when a disc 2 is ejected from the disc container part 3 in the load/unload mode (for example, a disc 2 is unloaded from the second tray 7), for example, the button "2" is pressed among the operation buttons on the operation panel not shown but provided on the front surface of the housing, and thereafter, a button "eject" is pressed.

In this case, at first, the inner sliders 162 move backward, thereby pushing up each pair of pins 17a and 17b to the second step position from the bottom in the second slits 167a and 167b as shown in FIG. 35, from the mode switch positions as shown in FIG. 34. Accordingly, the disc elevation table 16 moves up and the second tray 7 is set to a height substantially corresponding to the disc load/unload slot 4. The outer sliders 163 move back until each pair of pins 17a and 17b reach the middles of the first slits 172a and 172b, and the disc load/unload slot 4 is opened thereby. The operation as described above is perfectly the same as when inserting a disc.

Figure 38:
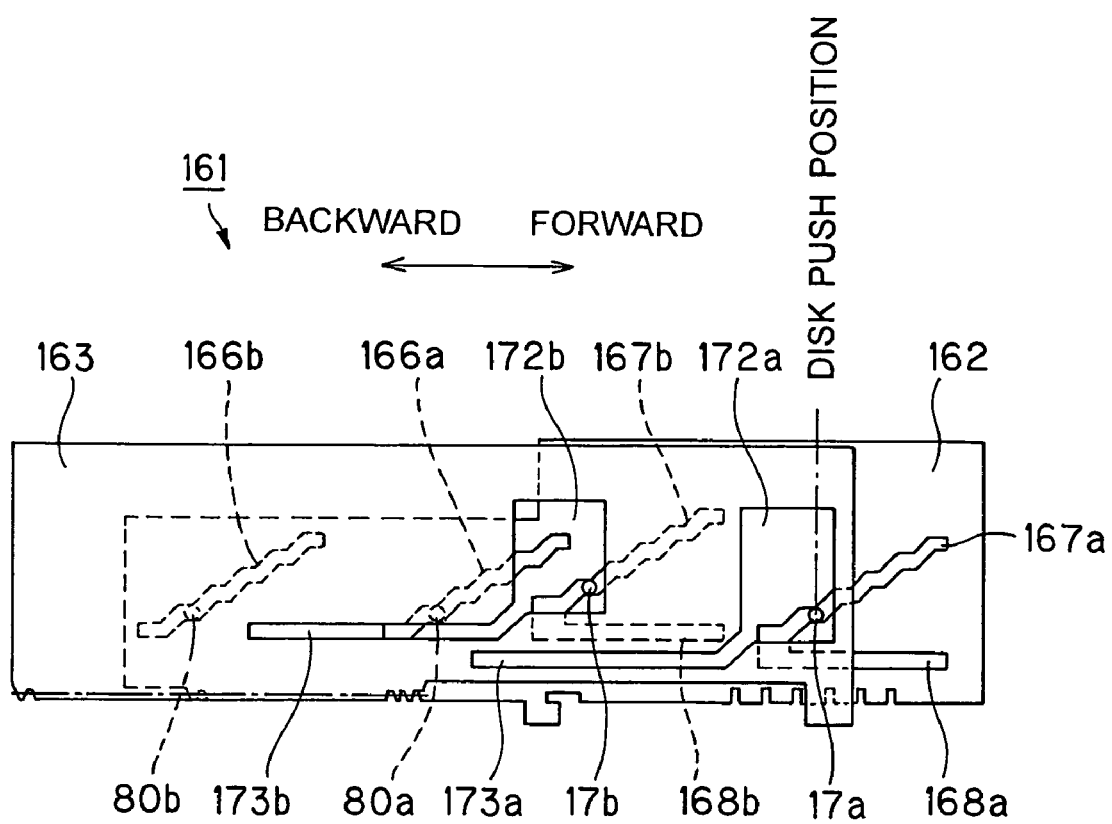
FIG. 38 is a side view showing a disc push-out position of the operation device in case of unloading the second disc.
Figure 39:
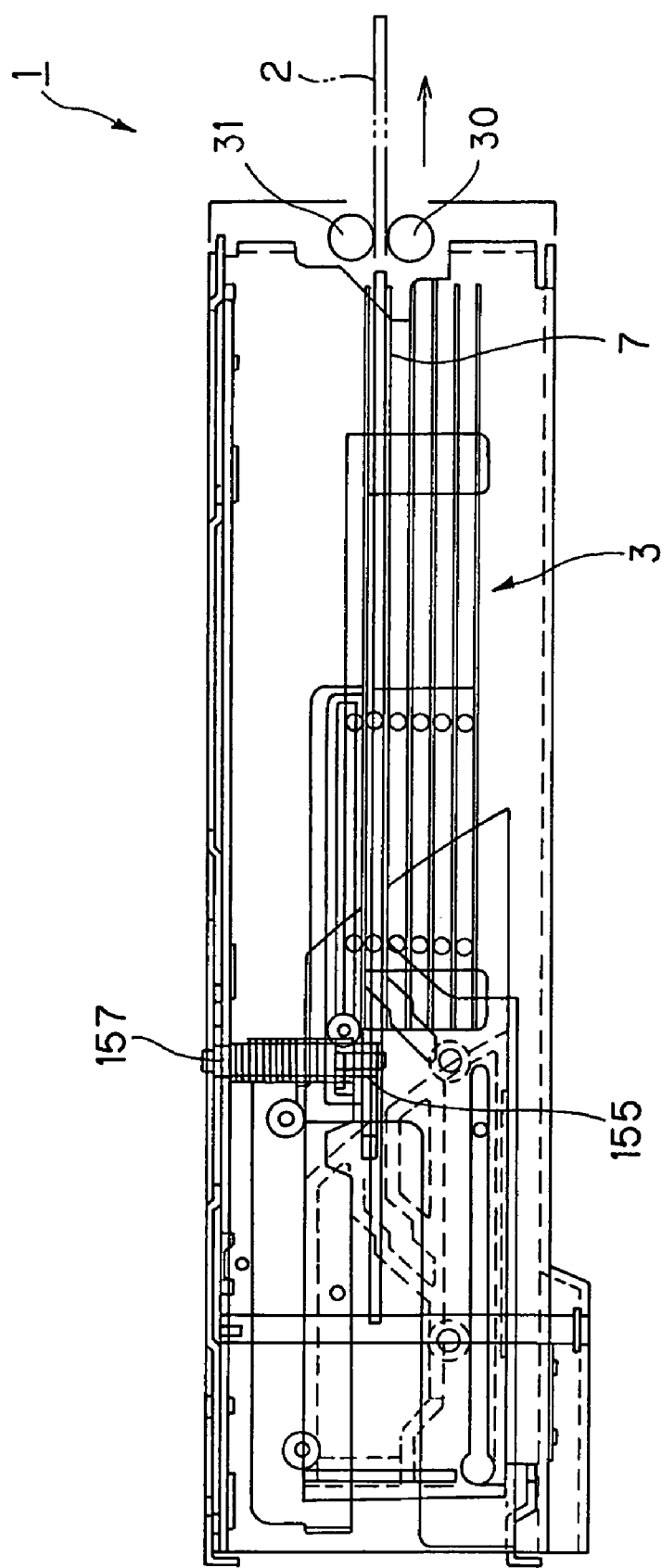
FIG. 39 is a transparent perspective view of the device body showing a state in which a disc is unloaded through the disc load/unload slot.

Next, as shown in FIG. 38, the outer sliders 163 move back until each pair of pins 17a and 17b are positioned respectively in the front sides of the first slits 172a and 172b. Accordingly, the separation cams 82 connected to the outer sliders 163 as shown in FIG. 32 move back. By the disc push-out mechanism 154 as described previously, the disc 2 is pushed out by a predetermined amount toward the disc load/unload slot 4.

The drive roller 30 of the disc loader/unloader 5 has been being driven to rotate in the ejecting direction since the button "ejection" was pressed. As a result of this, the disc 2 sandwiched between the pair of drive roller 30 and slave roller 31 is ejected to the outside of the disc container part 3. Further, when a rear part of the disc 2 is kept held between the pair of drive roller 30 and slave roller 31, the drive roller 30 is stopped by a limit switch (not shown). This prevents a fall of the disc 2 during ejection.

Next, as the disc 2 is manually pulled out through the disc load/unload slot 4, a sensor (not shown) senses completion of ejection of the disc 2. The outer sliders 163 move forward thereby returning back each pair of pins 17a and 17b again to the standby position as shown in FIG. 35 from the position shown in FIG. 38. The disc load/unload slot 4 is thereby closed.

As described above, the disc 2 can be ejected from the second tray 7. From other trays 7 than the second tray 7, an arbitrary disc 2 can be ejected by performing the same operation as described above.

Figure 40A:
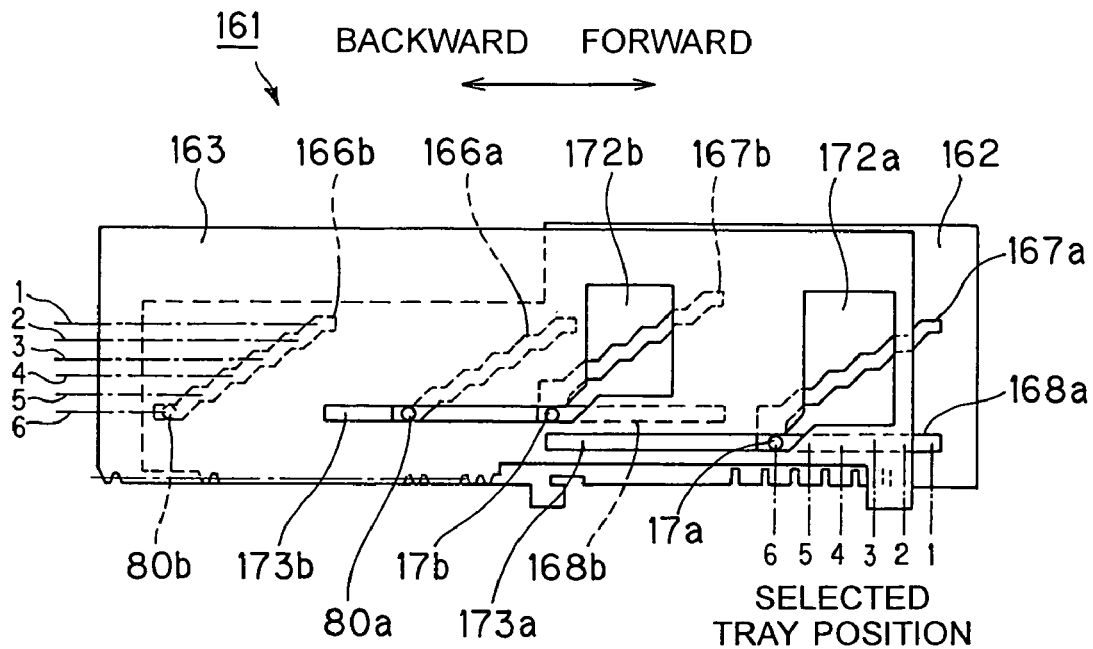

Switching from the load/unload mode to the playback mode is achieved as follows. That is, as the outer sliders 163 move forward, each pair of pins 17a and 17b move from the mode switch positions of the pins 17a and 17b in the load/unload mode as shown in FIG. 34, through the third slits 174a and 174b, into the third slits 168a and 168b of the inner sliders 162 and the second slits 173a and 173b of the outer sliders 163, as shown in FIG. 40A.

Also, in the playback mode, each pair of pins 17a and 17b of the disc elevation table 16 slide inside the third slits 168a and 168b of the inner sliders 162 and the second slits 173a and 173b of the outer sliders 163, so that the disc elevation table 16 is held at the lowermost position. At this time, the transmission switch mechanism 121 as described previously switches, thereby making the rotation mechanism 117 drivable by the drive motor 40.

On the other side, switching from the playback mode to the load/unload mode is achieved as follows. That is, as the outer sliders 163 move backward from the mode switch positions of the pair of pins 17a and 17b in the playback mode as shown in FIG. 40A, each pair of pins 17a and 17b pass by the third slits 174a and 174b of the outer sliders 163, and move inside the second slits 167a and 167b of the inner sliders 162 and the first slits 172a and 172b of the outer sliders 163 as shown in FIG. 34.

When switching these modes, each pair of pins 80a and 80b of the pickup elevation table 79 are kept positioned in the lowermost step of the fist slits 166a and 166b.

Figure 40B:
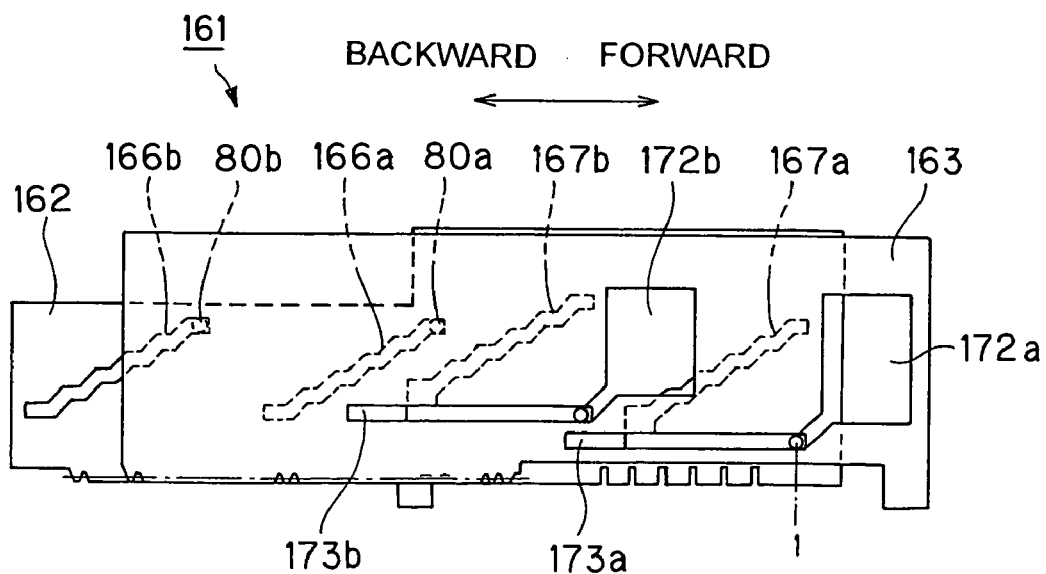

In the playback mode, as shown in FIGS. 40A and 40B, the pickup elevation table 79 can be moved up and down to an arbitrary height by letting only the inner sliders 162 slide in the forward and backward directions, with each pair of pins 80a and 80b of the pickup elevation table 79 being inserted in the first slits 166a and 166b of the inner sliders 162. FIG. 40A shows a position of the pickup elevation table 79 when playing back a disc 2 set on the sixth tray 7. FIG. 40B shows another position of the pickup elevation table 79 when playing back the disc 2 set on the first tray 7.

In this playback mode, when a selected disc 2 set on a selected tray 7 is played back (for example, the disc 2 set on the second tray 7 is played back,) for example, the button "2" is pressed among the operation buttons on the operation panel not shown but provided on the front surface of the housing, and thereafter, a button "playback" is pressed.

Figure 41:
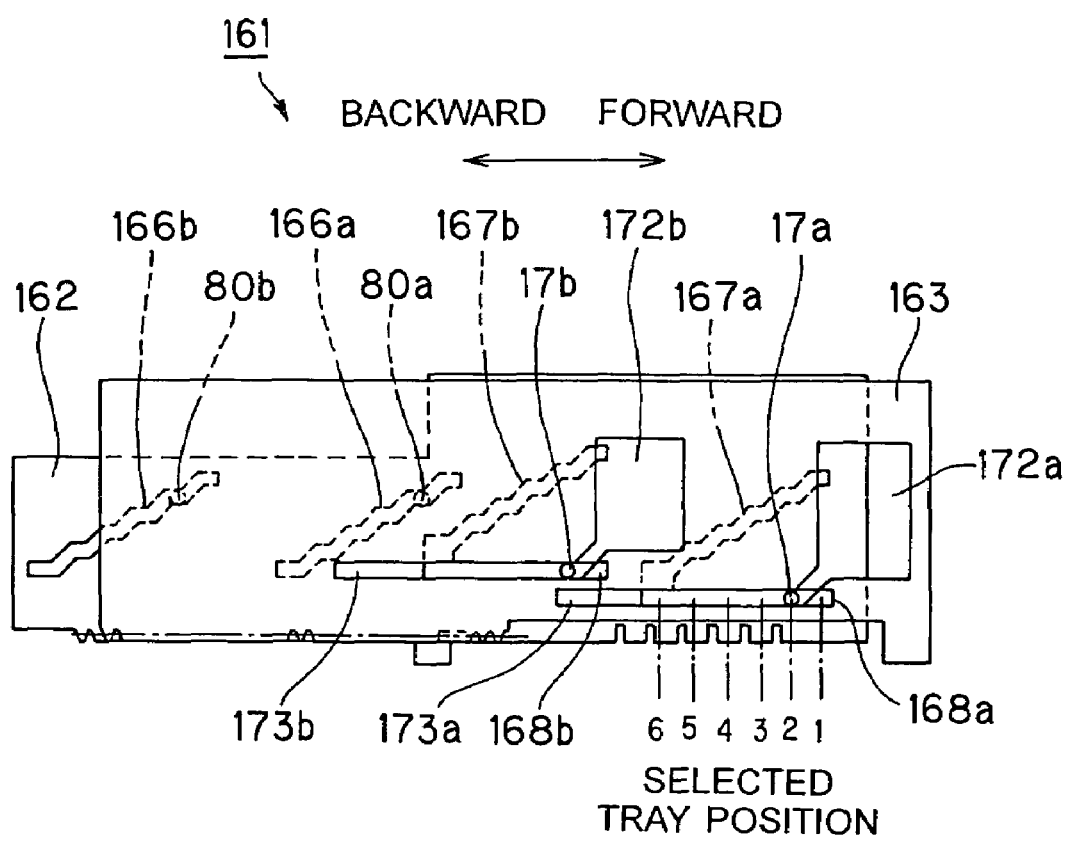
FIG. 41 is a side view showing a standby position of the operation device in case of playing back the second disc.
Figure 42:
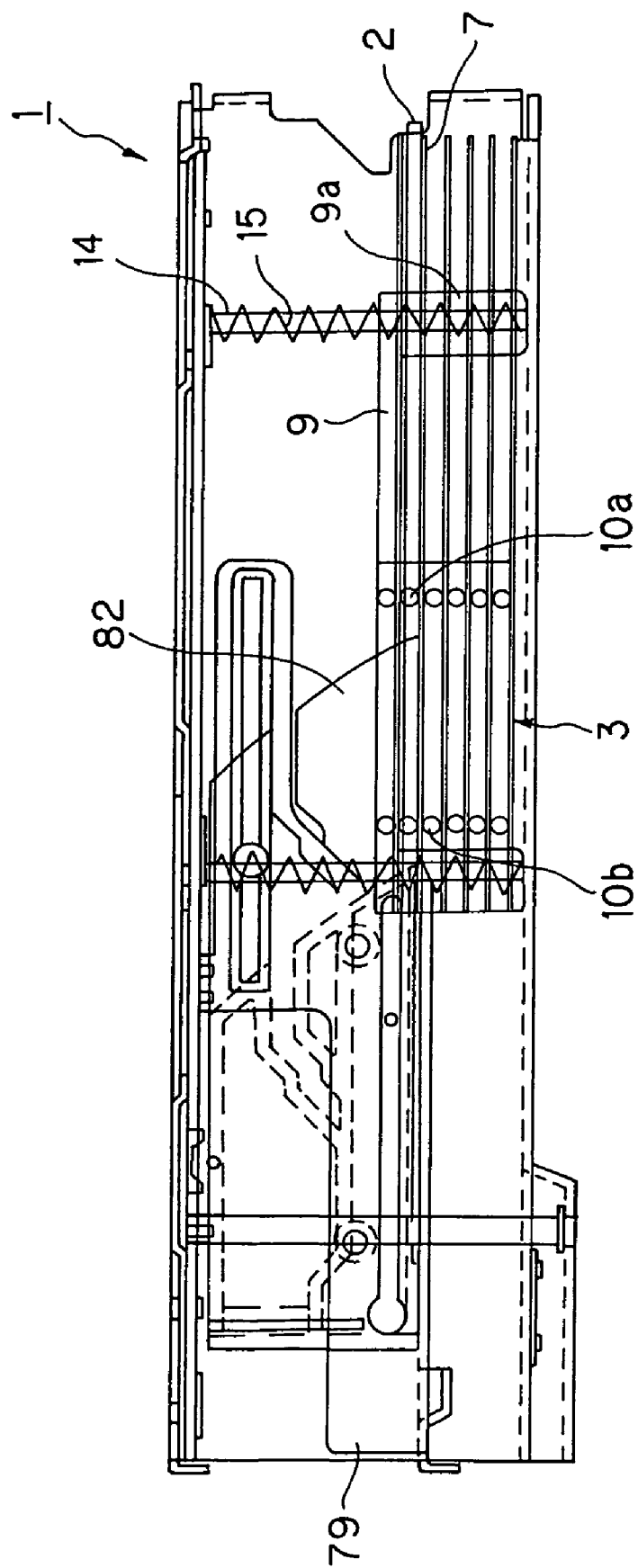
FIG. 42 is a transparent side view of the device body showing a standby position of the separation cams in case of playing back the second disc.

In this case, at first, as shown in FIG. 41, the inner sliders 162 move backward from the mode switch position shown in FIG. 40A, thereby pushing up each pair of pins 17a and 17b to the second step position from the top in the first slits 166a and 166b. Accordingly, as shown in FIG. 42, the pickup elevation table 79 moves up, and the height of the pickup elevation table 79 is set such that lower ends of the inclined surfaces 82b of the separation cams 82 are positioned between the second selected tray 7 and the third tray 7.

Figure 43:
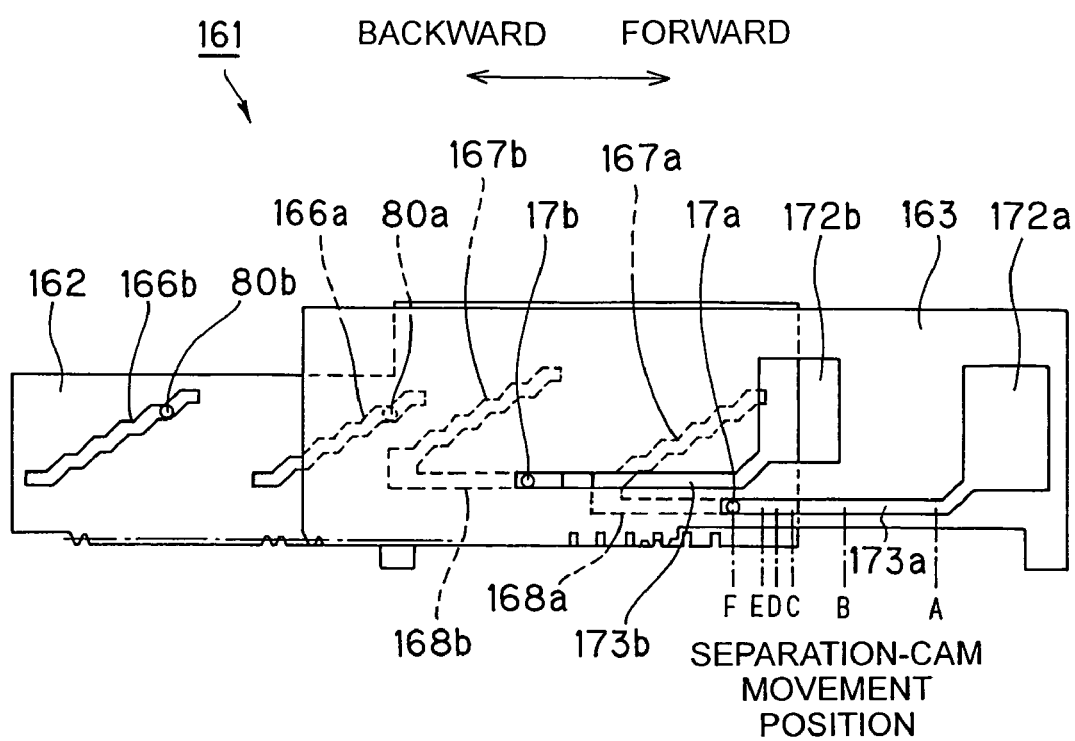
FIG. 43 is a transparent side view showing a playback position of the operation device in case of playing back the second disc.

Next, as shown in FIG. 43, the outer sliders 163 move forward, thereby moving forward the separation cams 82 connected to the outer sliders 163. Accordingly, with the selected tray 7 kept held by the separation cams 82 as described above, operations are carried out: an operation of forming spaces above and below the selected tray 7; an operation of rotating the pair of chuck levers 89 in the radial direction of the disc 2 by the rotation mechanism 117; and an operation of sandwiching the center hole 2a of the selected disc 2 set on the selected tray 7 between the pair of chuck levers 89 by the hold switch mechanism 144.

Figure 44:
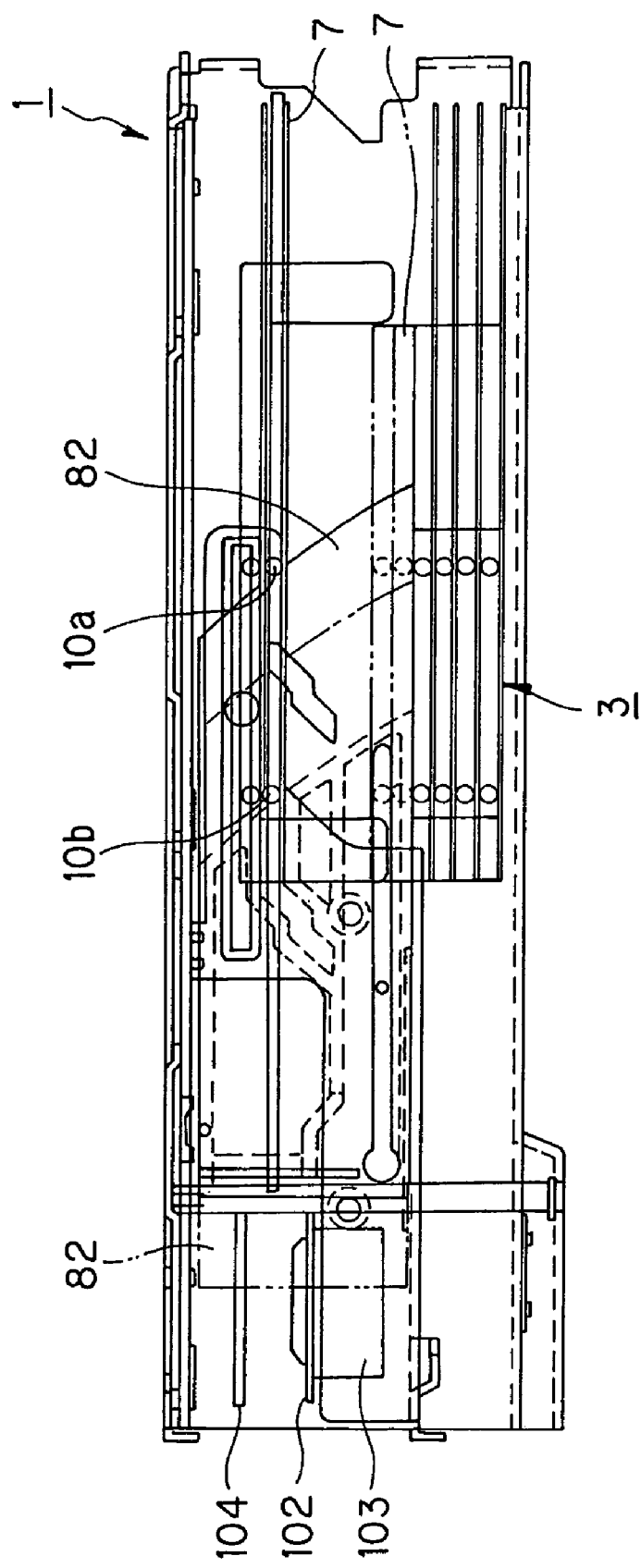
FIG. 44 is a transparent side view showing a state in which the separation cams have moved to a position C in case of playing back the second disc.

More specifically, at first, as shown in FIG. 44, the separation cams 82 move forward to the positions A to C shown in FIG. 22, thereby pushing up the pins 10a and 10b of the second selected tray 7 to the slits 87 and 88 of the separation cams 82 along the inclined surfaces 82a and 82b. Also, the pins 10a and 10b of the third tray 7 slide along the lower surfaces of the separation cams 82. At this time, the bent pieces 11b of the plate springs 11 provided in two sides of the third tray 7 are pressed downward by the lower surfaces of the separation cams 82, so that press pieces 11a of the plate springs 11 press the disc 2. Accordingly, the first tray 7 and the second selected tray 7 rise, and a space is formed between the second selected tray 7 and the third tray 7.

Figure 45:
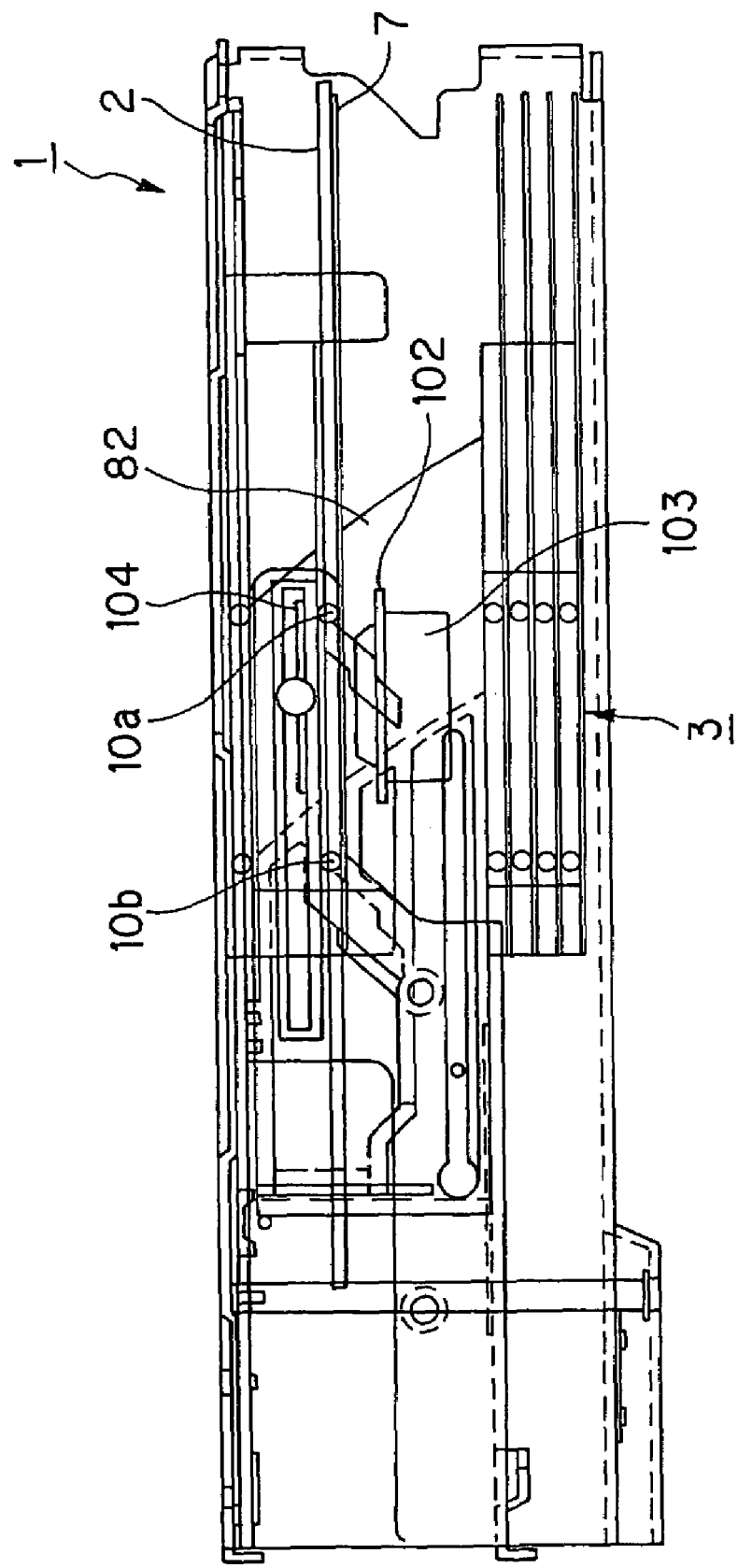
FIG. 45 is a transparent side view showing a state in which the separation cams have moved to a position D in case of playing back the second disc.
Figure 46:
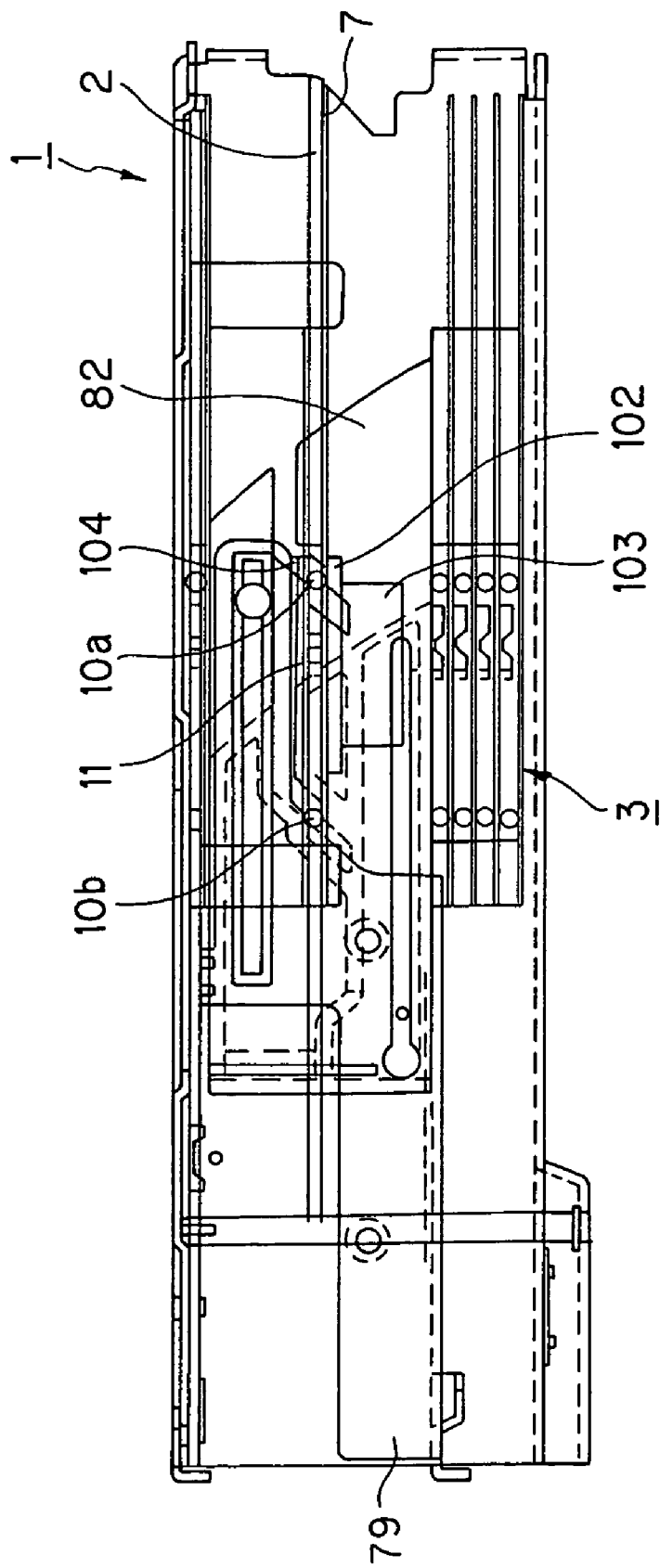
FIG. 46 is a transparent side view showing a state in which the separation cams have moved to a position E in case of playing back the second disc.

Next, as shown in FIG. 45, the separation cams 82 move forward to the position D shown in FIG. 22, the pins 10a and 10b of the second selected tray 7 slide inside the first engage/insert parts 87a and 88a of the slits 87 and 88. Simultaneously, the pins 10a and 10b of the first tray 7 are pushed up to upper surfaces 82d of the separation cams 82 along the inclined surfaces 82a and 82b positioned higher than the slits 87 and 88. As a result of this, a space is formed between the first tray 7 and the second selected tray 7. Thus, spaces large enough to allow the pair of chuck levers 89 to enter are formed above and below the selected tray 7.

The tray 7 positioned in the stage just below the selected tray 7 is pressed by the lower surfaces 82c of the separation cams 82. Another tray 7 positioned in the stage just above the selected tray 7 is energized toward the upper surfaces 82d of the separation cams 82 by the coil springs 15 described above. As a result, the trays 7 are prevented from being influenced by vibrations of the vehicle and the like.

When the separation cams 82 move forward to the position D in FIG. 22, a sensor (not shown) senses the separation cams 82, and the drive motor 40 is driven to rotate. Accordingly, in the rotation mechanism 117, the slide bar 120 shown in FIG. 26 slides backward, thereby rotating the pair of chuck levers 89 from the position of the load/unload mode as shown in FIG. 28 to the position of the playback mode as shown in FIG. 29, i.e., to the position of the center hole 2a of the disc 2. As the pair of chuck levers 89 are rotated to the position of the playback mode, a limit switch (not shown) stops rotation drive of the drive motor 40.

Next, as shown in FIG. 45, the separation cams 82 move forward to the position E in FIG. 22A. Accordingly, the pins 10a and 10b of the first tray 7 slide along the upper surfaces 82d of the separation cams 82, and the pins 10a and 10b of the second selected tray 7 slide inside the second engage/insert parts 87b and 88b of the slits 87 and 88. As a result, the second selected tray 7 held by the pair of separation cams 82 drops, and the selected disc 2 is set on the turntable 102 of the lower arm 90.

In synchronism with this, in the hold switch mechanism 144, the guide pin 145 of the upper arm 91 slides downward inside the vertical part 147b of the guide hole 147 cut in the cylindrical plate 146, thereby pushing down an end of the constraint lever 149 in the side of the cylindrical plate 146. Simultaneously, the guide pin 151 of the constraint lever 149 slides inside a cam groove 153 of a separation cam 82, between the positions E and F in FIG. 22B. As a result, the upper arm 91 drops in relation to the lower arm 90, thereby sandwiching the center hole 2a of the selected disc 2 between the turntable 102 of the lower arm 90 and the chuck plate 104 of the upper arm 91.

The pair of chuck levers 89 are positioned with high accuracy by inserting the hollow shaft 92 as a rotation center of these levers in the pillar 99 standing on the bottom plate 1a. In addition, the turntable 102 of the lower arm 90 and the chuck plate 104 of the upper arm 91 are positioned with high accuracy since the twist coil spring 143 of the rotation mechanism 117 holds the positioning pin 140 with this pin 140 pressed against the pickup elevation table 79. Further, the trays 7 and the pickup elevation table 79 are positioned with high accuracy by the pillar 99 and the guide pillar 13. Therefore, the center hole 2a of the selected disc 2 is positioned with high accuracy and sandwiched securely, between the turntable 102 of the lower arm 90 and the chuck plate 104 of the upper arm 91.

Figure 47:
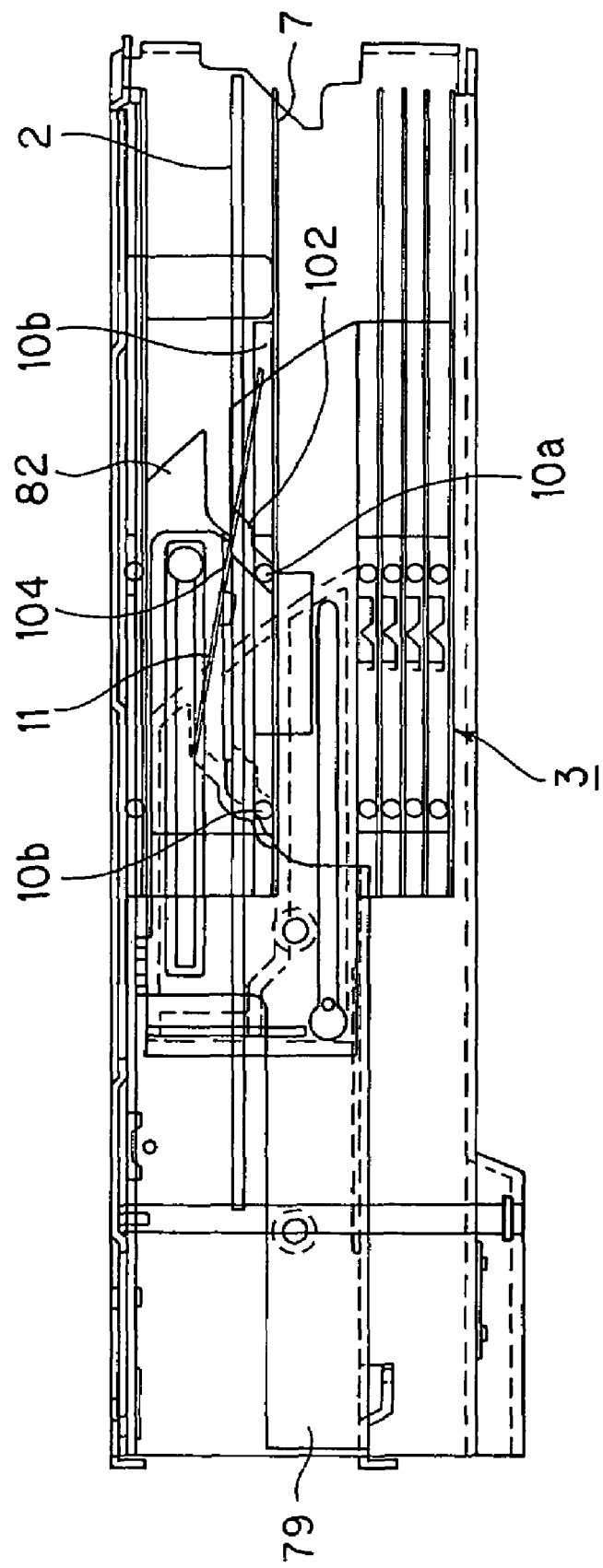
FIG. 47 is a transparent side view showing a state in which the separation cams have moved to a position F in case of playing back the second disc.
Figure 48:
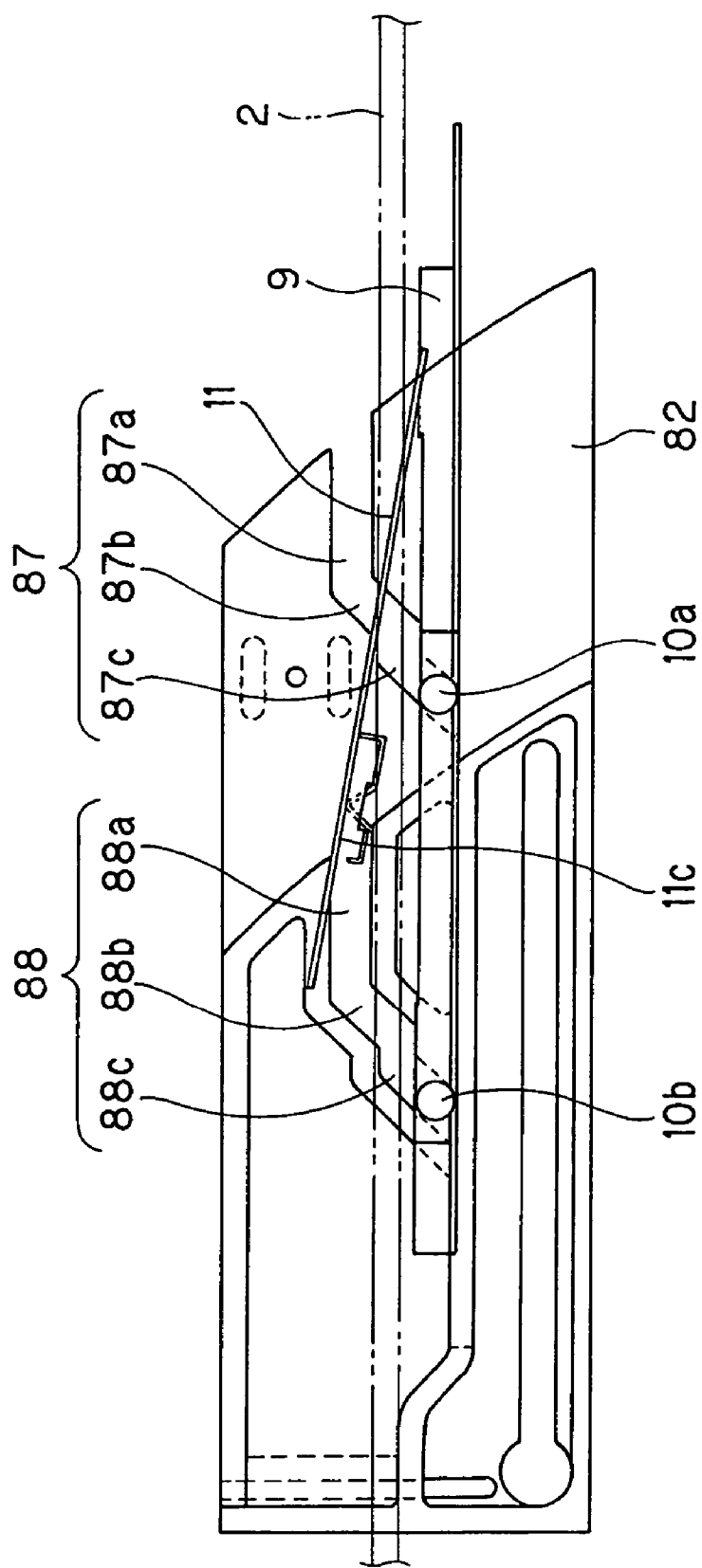
FIG. 48 is a transparent side view showing a state in which the separation cams have moved to the position F.

Next, as shown in FIG. 47, as the separation cams 82 move forward to the position F in FIG. 22A, the pins 10a and 10b of the second tray 7 slide inside the third engage/insert parts 87c and 88c of the slits 87 and 88. Then, the bent pieces 11b of the plate spring 11 which presses the selected disc 2 is pushed up by rear lower surfaces of the third engage/insert parts 87c and 88c of the slits 87 and 88, as shown in FIG. 48. As a result, the second selected tray 7 held by the pair of separation cams 82 drops further, thereby separating the selected tray 7 and the turntable 102 from each other.

Further, signals are reproduced as the optical pickup unit 108 described above moves in the radial direction in relation to the selected disc 2 rotatably held by the pair of chuck levers 89.

On the other side, in the playback mode, the operation of returning to the standby position of each of pins 17 and 17 as shown in FIG. 41 is achieved by a reverse of the procedure described above, i.e., the outer sliders 163 move backward and the separation cams 82 connected to the outer sliders 163 move backward.

More specifically, the separation cams 82 move backward to the positions F to D shown in FIG. 22, thereby setting a selected disc 2 on a selected tray 7. The guide pin 151 of the constraint lever 149 slides inside the cam groove 153 of the separation cams 82 between the positions E and D shown in FIG. 22B. Accordingly, an end of the constraint lever 149 in the side of the cylindrical plate 146 is pushed up, and the guide pin 145 of the upper arm 91 slides upward inside the vertical part 147*b* of the guide hole 147 cut in the cylindrical plate 146. As a result, the upper arm 91 rises in relation to the lower arm 90, thereby moving the lower arm 90 and the upper arm 91 and the selected disc 2 apart from each other.

When the separation cams 82 move backward to the position D in FIG. 22, a sensor (not shown) senses the separation cams 82 and the drive motor 40 is driven to rotate. Accordingly, in the rotation mechanism 117, the slide bar 120 shown in FIG. 27 slides forward, thereby rotating the pair of chuck levers 89 to the position of the load/unload mode as shown in FIG. 28 from the position of the playback mode as shown in FIG. 29. In addition, when the pair of chuck levers 89 are rotated to the position of the load/unload mode, a limit switch (not shown) stops rotation driving of the drive motor 40.

Further, as the separation cams 82 move backward to the positions D to A in FIG. 22, the first to third trays 7 drop, thereby returning each pair of pins 17 to the standby position shown in FIG. 41.

Any other arbitrary disc 2 can also be played back among the discs set on the other trays 7 than the second tray 7, by carrying out the same operation as described above.

The above description has exemplified a case of applying the present invention to the disc changer 200 as described above. However, the present invention can be applied to in-vehicle players of various forms as described previously as far as the in-vehicle players are of a type installed in a dashboard in a passenger room of a vehicle.

Also, the present invention is applicable not only to an in-vehicle player assembled in the mount space 304 in the dashboard 303 as described above but also to a type of in-vehicle player detachable from this mount space 304 and to another type of in-vehicle player which is used drawn out of the mount space 304.

Further, the present invention is applicable not only to in-vehicle players designed to fit in dimensions according to a definite standard such as 1DIN or 2DIN as described previously but also to in-vehicle players designed to be directly assembled in the dashboard 303 in match with the interior design of the passenger room 300.

The present invention is preferably applied to an in-vehicle player to be mounted in a dashboard in a vehicle passenger room as described above, as a vibration-proof structure to suppress influences form external vibrations and impacts transmitted to the device body through the outer housing. In addition to those in-vehicle players, the present invention can be widely applied to various forms of players such as household stationary players or the like. That is, a player to which the present invention is applied has: an outer housing; a device body contained in the outer housing; and a cushion member interposed between the outer housing and two side surfaces of the device body, wherein the cushion member is made of viscous elastic material, the cushion member has an end surface which is substantially parallel to a shearing direction thereof and stuck to a mount surface of the device side by viscosity thereof, and the cushion member has another end surface which is substantially parallel to the shearing direction and stuck to a mount surface of the outer housing by viscosity thereof, so that the cushion member is attached to be elastically deformable in the shearing direction between the outer housing and the two side surfaces of the device body. In this case, a suspension mechanism provided between the device body and the outer housing should desirably support (float) the device body on the two side surfaces of the device body, floated and suspended from the outer housing by springs such as coil springs or the like inside the outer housing.

In the player constructed as described above, elastic deformation of the cushion members inserted between the outer housing and the two side surfaces of the device body can be utilized to damp appropriately vibrations and impacts transmitted from the outer housing to the device body. Since the viscous elastic material forming the cushion members can be stuck directly to the mount surfaces of the device body and the outer housing, assembly work to attach the cushion members between the outer housing and the two side surfaces of the device body is easy. In addition, since the viscosity of the cushion members can be maintained for a long period, the cushion members can be stably maintained between the outer housing and the two side surfaces of the device body. Further, the cushion members can be downsized.

Accordingly, in players of various forms to which the present invention is applied, influences of vibrations and impacts transmitted from the outside are suppressed so that operational reliability is improved greatly and further downsizing and cost reduction are achieved.

It should be understood by those skilled in the art that various modifications, combinations sub-combinations and alterations may occur depending on design requirements and other factors insofar as they are within the scope of the appended claims or the equivalents thereof.

What is claimed is:

1. An in-vehicle player to be mounted in a dashboard in a passenger room of a vehicle, comprising:

an outer housing to be assembled in a mount space provided in the dashboard;

a device body contained in the outer housing;

a suspension mechanism attached to a side surface of the outer housing and a side surface of the device body and configured to suspend the device body from the outer housing such that a top surface and a bottom surface of the device body are not connected to the outer housing; and a solid cushion member comprising viscous elastic material interposed between the side surface of the outer housing and the side surface of the device body, the cushion member having an end surface which is substantially parallel to a shearing direction thereof and stuck to a mount surface of the device body by viscosity thereof, and having another end surface which is substantially parallel to the shearing direction and stuck to a mount surface of the outer housing by viscosity thereof, thereby to attach the cushion member to be elastically deformable in the shearing direction between the side surface of the outer housing and the side surface of the device body.

2. The in-vehicle player according to claim 1, wherein the cushion member damps a vibration having a frequency which causes the device body to resonate among vibrations transmitted from the vehicle.

3. The in-vehicle player according to claim 1, wherein the viscous elastic material has viscosity of 5 to 1000 $gf/cm^2$.

4. The in-vehicle player according to claim 1, wherein the suspension mechanism is a spring.

5. The in-vehicle player according to claim 1, wherein
the cushion member is a rectangle,
the end surface of the cushion member that is stuck to the mount surface of the device body is a first long side of the rectangle, and
the another end surface of the cushion member that is stuck to the mount surface of the outer housing is a second long side of the rectangle.

6. The in-vehicle player according to claim 1, wherein the cushion member is a single solid material.

7. The in-vehicle player according to claim 1, further comprising:
a lock mechanism configured to fix the outer housing directly to the device body during a loading or unloading operation of a disc such that the device body does not move with respect to the outer housing.

8. An in-vehicle player, comprising:
an outer housing configured to be attached to a vehicle;
a device body positioned within the outer housing and comprising a disc player;
a suspension mechanism attached to a side surface of the outer housing and a side surface of the device body and configured to suspend the device body from the outer housing such that a top surface and a bottom surface of the device body are not connected to the outer housing; and
a solid cushion member comprising viscous elastic material, the cushion member having an end surface which is substantially parallel to a shearing direction thereof and stuck to a mount surface of the device body by viscosity thereof, and having another end surface which is substantially parallel to the shearing direction and stuck to a mount surface of the outer housing by viscosity thereof, thereby attaching the cushion member to be elastically deformable in the shearing direction between the side surface of the outer housing and the side surface of the device body.

9. The in-vehicle player according to claim 8, wherein the cushion member damps a vibration having a frequency which causes the device body to resonate among vibrations transmitted from the vehicle.

10. The in-vehicle player according to claim 8, wherein the viscous elastic material has viscosity of 5 to 1000 gf/cm$^2$.

11. The in-vehicle player according to claim 8, wherein the suspension mechanism is a spring.

12. The in-vehicle player according to claim 8, wherein
the cushion member is a rectangle,
the end surface of the cushion member that is stuck to the mount surface of the device body is a first long side of the rectangle, and
the another end surface of the cushion member that is stuck to the mount surface of the outer housing is a second long side of the rectangle.

13. The in-vehicle player according to claim 8, wherein the solid cushion member is a single solid material.

14. The in-vehicle player according to claim 8, further comprising:
a lock mechanism configured to fix the outer housing directly to the device body during a loading or unloading operation of a disc such that the device body does not move with respect to the outer housing.

* * * * *